(12) United States Patent
Vangell et al.

(10) Patent No.: US 10,817,816 B2
(45) Date of Patent: Oct. 27, 2020

(54) SALES ROTATION SYSTEM AND SALES ROTATION QUEUE PROCESSES

(71) Applicants: Ronald M Vangell, San Clemente, CA (US); Chris Daden, Aliso Viejo, CA (US)

(72) Inventors: Ronald M Vangell, San Clemente, CA (US); Chris Daden, Aliso Viejo, CA (US)

(73) Assignee: NcompassTrac, LLC, Laguna Hills, CA (US)

( * ) Notice: Subject to any disclaimer, the term of this patent is extended or adjusted under 35 U.S.C. 154(b) by 0 days.

(21) Appl. No.: 16/513,099

(22) Filed: Jul. 16, 2019

(65) Prior Publication Data

US 2020/0219039 A1 Jul. 9, 2020

Related U.S. Application Data

(60) Provisional application No. 62/789,422, filed on Jan. 7, 2019.

(51) Int. Cl.
  *G06Q 10/06* (2012.01)
  *G01S 19/51* (2010.01)
  *G01S 1/68* (2006.01)
  *G06Q 10/00* (2012.01)

(52) U.S. Cl.
  CPC ........ *G06Q 10/063118* (2013.01); *G01S 1/68* (2013.01); *G01S 19/51* (2013.01)

(58) Field of Classification Search
  CPC .... G06Q 10/063118; G01S 1/68; G01S 19/51
  USPC ...................................................... 705/7.17
  See application file for complete search history.

(56) References Cited

U.S. PATENT DOCUMENTS

| | | | |
|---|---|---|---|
| 4,398,257 A * | 8/1983 | Paganini | G07C 11/00 340/286.06 |
| 9,123,009 B1 * | 9/2015 | Etter | G06Q 10/063116 |
| 9,628,956 B1 * | 4/2017 | Kim | G06Q 10/1091 |
| 9,948,783 B1 * | 4/2018 | Farrell | H04M 3/5191 |
| 2007/0219816 A1 * | 9/2007 | Van Luchene | G06Q 10/06 705/80 |

(Continued)

OTHER PUBLICATIONS

Rodney B. Wallace, Ward Whitt, A Staffing Algorithm for Call Centers with Skill-Based Routing Manufacturing & Service Operations Management vol. 7, No. 4, Fall 2005, pp. 276-294 issn 1523-4614 eissn 1526-5498 / 05 / 0704 / 0276 (Year: 2005).*

*Primary Examiner* — Rutao Wu
*Assistant Examiner* — Abdallah A El-Hage Hassan
(74) *Attorney, Agent, or Firm* — Stephen Hallberg

(57) ABSTRACT

A sales rotation system is disclosed that increases walk-up sales. The sales rotation system creates an equitable and efficient management of sales personnel on the dealership floor. The sales rotation system corrects one or more business issues with handling of walk-up sales including sales personnel bickering over who is up next in the rotation, track lead collection and close ratios, creating an automated way to notify a sales person when the sales person is up, digitally fence an "up area" and provide a notification when sales personnel who are up wander from the showroom entry, setting up a count to be flexible based on dealership volume and size, and improving customer experience by managing the number of sales personnel on the dealership floor and equitably rotating them.

5 Claims, 24 Drawing Sheets

(56) References Cited

U.S. PATENT DOCUMENTS

| | | | |
|---|---|---|---|
| 2009/0089136 A1* | 4/2009 | Minert | G06Q 10/0639 |
| | | | 705/7.13 |
| 2009/0310774 A1* | 12/2009 | Hendricks | H04M 3/5183 |
| | | | 379/265.13 |
| 2009/0313121 A1* | 12/2009 | Post | G06Q 30/02 |
| | | | 705/14.53 |
| 2013/0262167 A1* | 10/2013 | Masood | G06Q 10/1091 |
| | | | 705/7.13 |
| 2013/0263008 A1* | 10/2013 | Bylahalli | G06Q 30/06 |
| | | | 715/739 |
| 2013/0297352 A1* | 11/2013 | Noe | G06Q 10/02 |
| | | | 705/4 |
| 2014/0135042 A1* | 5/2014 | Buchheim | H04W 4/023 |
| | | | 455/456.6 |
| 2016/0104097 A1* | 4/2016 | Larrinaga | G06Q 10/063114 |
| | | | 705/7.15 |
| 2016/0119246 A1* | 4/2016 | Wang | G06F 9/5027 |
| | | | 709/226 |
| 2016/0180412 A1* | 6/2016 | DuLeone | G06Q 30/0281 |
| | | | 705/346 |
| 2017/0154340 A1* | 6/2017 | Ballepu | G06Q 10/063112 |
| 2018/0124207 A1* | 5/2018 | Marueli | G06Q 50/30 |
| 2018/0129984 A1* | 5/2018 | Polk | A63G 31/00 |
| 2019/0166464 A1* | 5/2019 | Quitoriano | H04W 4/02 |

* cited by examiner

SALES ROTATION SYSTEM AND SALES ROTATION QUEUE PROCESSES

CLAIM OF BENEFIT TO PRIOR APPLICATION

This application claims benefit to U.S. Provisional Patent Application 62/789,422, entitled "SALES ROTATION SYSTEM," filed Jan. 7, 2019. The U.S. Provisional Patent Application 62/789,422 is incorporated herein by reference.

BACKGROUND

Embodiments of the invention described in this specification relate generally to a sales rotation system and to sales rotation queue processes.

Walk-ups (also known as "ups") account for approximately 25-50% of vehicle purchases. The close ratio is closely tied to the equitable and efficient management of sales personnel on a dealership's floor. In standard practice, dealerships use a conventional "manual round robin" method of rotating sales personnel with ups. However, the manual round robin method is plagued with problems and issues because it is usually paper-based, but in some cases is based on sales personnel attempting to verbally agree on who is up next. Examples of the problems and issues include, without limitation, sales personnel bickering over who is up next in the conventional manual round robin rotation, lead collection and close ratios can be skewed due to sales representatives not wanting to expose lost ups and, therefore, are reluctant to track or report lost ups accurately, lead collection and close ratios can also be skewed because sales management does not want to disclose them, sales personnel who are up tend to wander from the showroom entry, thereby missing active prospects or giving the dealership the appearance that no one is there to greet prospective walk-up customers, no way to carry out effective group messaging or streamline communication to sales personnel, and dealerships that do not use the manual round robin rotation method have nearly all sales personnel on the dealership floor and it is then a game of who gets to the walk-up customer first, which then projects onto customers who can become intimidated by the "vulture-like" approach.

Many of the same or similar problems exist in other walk-up sales arenas, such as furniture sales to walk-up customers in furniture store showrooms, boat and marine vehicle sales to walk-up customers in boat and marine vehicle showrooms, durable goods sales to walk-up customer in kitchen and bath showrooms, etc.

Therefore, what is needed is a way to solve the problems and issues associated with the conventional manual round robin sales rotation method and provide an effective solution for dealerships and sales teams in many other commercial showroom-oriented arenas to efficiently and fairly handle walk-ups in a way that increases walk-up sales (closed walk-up sales).

BRIEF DESCRIPTION

A novel sales rotation system and novel sales rotation queue processes are disclosed. In some embodiments, the sales rotation system combines spatial area wireless coverage technologies, mobile device technologies, data tracking and aggregation, data collection repositories, data analysis and metrics visualization, and cloud-based administration to increase walk-up sales (or "closed walk-up sales") by way of a digital round robin queuing system that identifies and presents actionable insights to sales personnel and management for equitable and efficient handling in the back office or on a dealership floor, in a showroom, in a dealership lot, and/or at any other area of a dealership (hereinafter referred to individually or collectively as any or all of the aforementioned terms, or as the "product display and sales engagement area") in which sales personnel interact with customers. In some embodiments, the spatial area wireless coverage technologies comprise one or more of beacon devices, methods, systems and technologies and geofence devices, methods, systems, and technologies. The sales rotation system improves and corrects business issues including, without limitation, the problem of sales personnel bickering over who is up next in conventional round robin sales rotation, issues in tracking and collecting leads and improving close ratios, creating an automated way to notify a sales person when the sales person is "up" to engage a customer in a product display and sales engagement area, digitally fencing or wirelessly covering an "up area" (i.e., a product display and sales engagement area) which triggers actions, such as notifications and queue management when sales personnel who are "up" wander from the product display and sales engagement area, setting up a count to be flexible based on dealership volume and size, and improving customer experience by managing the number of sales personnel in each product display and sales engagement area and equitably rotating them.

In some embodiments, the sales rotation system creates an environment for equitable and efficient management of sales personnel in a product display and sales engagement area by deploying wireless technology devices and systems in and around the product display and sales engagement area for use with mobile devices and other computing devices that perform realtime sales activity information processing which transforms conventional round robin sales rotation practices commonly used in dealerships into an efficient and manageable digital sales rotation queue for each product display and sales engagement area. In some embodiments, one or more mobile applications ("mobile app" or "mobile apps") implement business logic of one or more processes to rotate sales personnel in a product display and sales engagement area.

In some embodiments, the sales rotation system is a sales rotation cloud-computing system that provides a software-as-a-service (SaaS) multi-tenant cloud computing platform. In some embodiments, the sales rotation cloud-computing system comprises a sales rotation management cloud server, a sales rotation cloud database, a management software application that runs on a management computing device, and a sales representative user software application that runs on a sales representative user computing device. In some embodiments, the management software application is a management mobile app and the management computing device is a management mobile device. In some embodiments, the management mobile app configures a product display and sales engagement area as one of a geofence-enabled product display and sales engagement area and a beacon-enabled product display and sales engagement area. In some embodiments, the sales representative user software application is a sales representative user mobile app and the sales representative user computing device is a sales representative user mobile device.

In some embodiments, the sales rotation queue processes comprise (i) a process for adding a sales representative to a sales rotation queue, (ii) a process for requesting a sales representative to join a sales rotation queue, (iii) a process for rotating sales representatives in a sales rotation queue, and (iv) a temporary queue departure process for managing sales rotation queue order when a sale representative temporarily exits a product display and sales engagement area associated with the sales rotation queue.

In some embodiments, the process for adding a sales representative to a sales rotation queue comprises (i) detecting when a sales representative enters a product display and sales engagement area, (ii) triggering a request to add the sales representative to a sales rotation queue associated with the product display and sales engagement area, (iii) determining whether the sales representative is a member of any dealership sales team, (iv) assigning the sales representative to a particular dealership sales team when the sales representative is not a member of any dealership sales team, and (v) adding the sales representative to the sales rotation queue associated with the product display and sales engagement area.

In some embodiments, the process for adding a sales representative to a sales rotation queue comprises triggering a request to add the sales representative to a sales rotation queue. In some embodiments, triggering the request to add the sales representative to the sales rotation queue comprises a plurality of steps. In some embodiments, the plurality of steps in triggering the request to add the sales representative to the sales rotation queue are performed by the process for requesting a sales representative to join a sales rotation queue. In some embodiments, the process for requesting a sales representative to join a sales rotation queue comprises (i) capturing, by a mobile device, a beacon signal from a beacon device that sends a unique beacon ID ("beacon UID"), (ii) activating a sale rotation system mobile app installed on the mobile device in response to capturing the beacon UID, (iii) sending, by the sales rotation system mobile app and mobile device, the beacon UID to a sales rotation network server, and (iv) requesting, in response to receiving a notification from the sales rotation network server, to add the sales representative to the sales rotation queue.

In some embodiments, the process for rotating sales representatives in a sales rotation queue comprises (i) identifying a sales representative who is next up in the sales rotation queue associated with a product display and sales engagement area, (ii) determining whether the identified sales representative is engaged in sales activities with the non-served customer in a product display and sales engagement area, (iii) removing the identified sales representative from the top of the sales rotation queue when the identified sales representative is engaged in sales activities with the non-served customer, (iv) and increasing the position of the remaining sales representatives in the sales rotation queue in response to removing the identified sales representative from the top of the sales rotation queue.

In some embodiments, the temporary queue departure process for managing sales rotation queue order when a sale representative temporarily exits a product display and sales engagement area associated with the sales rotation queue comprises (i) capturing beacon UID data packets, (ii) transmitting the beacon UID to the server, (iii) determining whether the sales representative is in the sales rotation queue, (iv) requesting the sales representative to join the sales rotation queue when not already in the sales rotation queue, (v) maintaining "enqueued" status of the sales representative when affirmatively determined to be in the sales rotation queue, (vi) setting a temporary exit timer when the mobile device stops receiving beacon UID signals, (vii) counting down the time of the temporary exit timer while listening for beacon UID signals, (viii) determining whether any beacon UID signals are received before time expires, (ix) setting a queue status of the sales representative to de-queued when time expires without receiving any beacon UID signals, and (x) removing the sales representative from the sales rotation queue associated with the beacon UID when the sales representative is de-queued.

In some embodiments, the temporary queue departure process for managing sales rotation queue order when a sale representative temporarily exits a product display and sales engagement area associated with the sales rotation queue is performed when at a facility with a plurality of separate product display and sales engagement areas. When a facility has a plurality of separate product display and sales engagement areas, the temporary queue departure process is a multi-zone temporary queue departure process comprising (i) detecting when a mobile device receives different beacon UID signals, (ii) determining, in response to receiving different beacon UID signals, whether a sales representative using the mobile device joins a different sales rotation queue associated with a different product display and sales engagement area, (iii) setting a temporary exit timer when the mobile device stops receiving beacon UID signals and has not joined the different sales rotation queue associated with the different product display and sales engagement area, (iv) counting down the time of the temporary exit timer while listening for beacon UID signals, (v) determining whether any beacon UID signals are received before time expires, (vi) setting a queue status of the sales representative to de-queued when one of a new sales rotation queue is joined by the sales representative and time expires without receiving any beacon UID signals, and (vii) removing the sales representative from the sales rotation queue associated with the beacon UID when the sales representative is de-queued.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
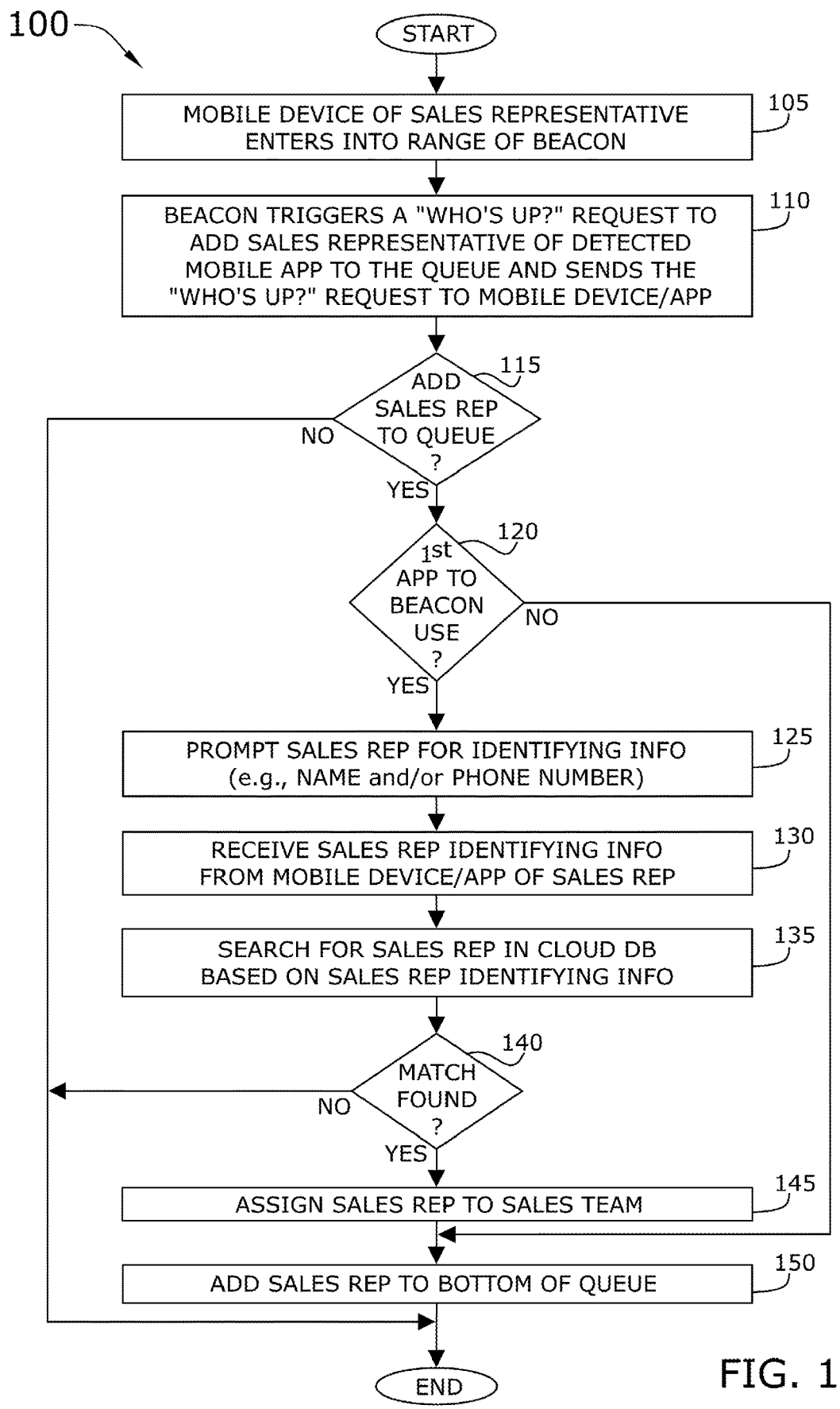
FIG. 1 conceptually illustrates a process for adding a sales representative to a sales rotation queue in some embodiments.

In the following detailed description of the invention, numerous details, examples, and embodiments of the invention are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention include a novel sales rotation system that combines spatial area wireless coverage technologies, mobile device technologies, data tracking and aggregation, data collection repositories, data analysis and metrics visualization, and cloud-based administration to increase walk-up sales (or "closed walk-up sales") for automobile dealerships, furniture dealerships, and other such commercial dealerships with product presentation showrooms or floors, by way of a digital round robin queuing system that identifies and presents actionable insights to sales personnel and management for equitable and efficient handling in the back office or on the dealership floor, in the showroom, in a dealership lot, and/or at any other area of the dealership (hereinafter referred to individually or collectively as any or all of the aforementioned terms, or as the "product display and sales engagement area") in which sales personnel interact with customers. In some embodiments, the spatial area wireless coverage technologies comprise one or more of beacon devices, methods, systems, and technologies and geofence devices, methods, systems, and technologies. The sales rotation system improves and corrects business issues including, without limitation, the problem of sales personnel bickering over who is up next in conventional round robin sales rotation, issues in tracking and collecting leads and improving close ratios, creating an automated way to notify a sales person when the sales person is "up" to engage a customer in a product display and sales engagement area, digitally fencing or wirelessly covering an "up area" (i.e., a product display and sales engagement area) which triggers actions, such as notifications and queue management when sales personnel who are "up next" or enqueued in a sales rotation queue wander from the product display and sales engagement area, setting up a count to be flexible based on dealership volume and size, and improving customer experience by managing the number of sales personnel in each product display and sales engagement area and equitably rotating them.

In some embodiments, the sales rotation system creates an environment for equitable and efficient management of sales personnel in a product display and sales engagement area by deploying wireless technology devices and systems in and around the product display and sales engagement area for use with mobile devices and other computing devices that perform realtime sales activity information processing which transforms conventional round robin sales rotation practices commonly used in dealerships into an efficient and manageable digital sales rotation queue for each product display and sales engagement area. In some embodiments, one or more mobile applications ("mobile app" or "mobile apps") implement business logic of one or more processes to rotate sales personnel in a product display and sales engagement area. In some embodiments, a mobile application is installed on a mobile device. In some embodiments, a mobile application is installed on a wearable device.

In some embodiments, the sales rotation system is a sales rotation cloud-computing system that provides a software-as-a-service (SaaS) multi-tenant cloud computing platform. In some embodiments, the sales rotation cloud-computing system comprises a sales rotation management cloud server, a sales rotation cloud database, a management software application that runs on a management computing device, and a sales representative user software application that runs on a sales representative user computing device. In some embodiments, the management software application is a management mobile app and the management computing device is a management mobile device. In some embodiments, the management mobile app configures a product display and sales engagement area as one of a geofence-enabled product display and sales engagement area and a beacon-enabled product display and sales engagement area. In some embodiments, the sales representative user software application is a sales representative user mobile app and the sales representative user computing device is a sales representative user mobile device.

As stated above, walk-up customers (or simply, "walk-ups") account for approximately 25-50% of vehicle purchases. The close ratio for walk-ups is closely tied to the equitable and efficient management of sales personnel on a dealership's floor. In standard practice, dealerships use a conventional "manual round robin" method of rotating sales personnel with walk-ups. However, the manual round robin method is plagued with problems and issues because it is usually paper-based, but in some cases is based on sales personnel attempting to verbally agree on who is up next. Examples of the problems and issues include, without limitation, sales personnel bickering over who is up next in the conventional manual round robin rotation, lead collection and close ratios can be skewed due to sales representatives not wanting to expose lost walk-ups and, therefore, are reluctant to track or report lost walk-ups accurately, lead collection and close ratios can also be skewed because sales management does not want to disclose them, sales personnel who are up tend to wander from the showroom entry, thereby missing active prospects or giving the dealership the appearance that no one is there to greet prospective walk-up customers, inability to carry out effective group messaging or streamline communication to sales personnel, and dealerships that do not use the manual round robin rotation method have nearly all sales personnel on the dealership floor and it is then a game of who gets to the walk-up customer first, which then projects onto customers who can become intimidated by the "vulture-like" approach.

Embodiments of the sales rotation system described in this specification solve such problems by a sales rotation system that increases walk-up sales, creates an equitable and efficient management of sales personnel on the dealership floor, emulates conventional round robin practices but employs beacon technologies, mobile device(s) and mobile app(s), cloud-based administration and data collection and persistence, and business logic to rotate sales personnel, and reduces sales personnel bickering, while positively tracking lead collection and close ratios and creating an automated way to notify sales personnel who is up next in a digitally fenced off "up area" and provide notifications to sales personnel who wander away from the dealership floor.

Embodiments of the sales rotation system described in this specification differ from and improve upon currently existing options. In particular, some embodiments differ from the conventional manual round robin rotation method used in many existing dealerships by a novel sales rotation system that encourages customer walk-up engagement without sales personnel bickering or under-reporting or non-tracking of lost walk-ups. Specifically, the sales rotation system of the present disclosure provides solutions to the problems and issues encountered by use of the conventional manual round robin rotation method employed by typical dealerships. In this way, the sales rotation system of the present specification increases walk-up sales, creates an equitable and efficient management of sales personnel on the dealership floor, emulates conventional round robin practices but employs mobile app(s) and business logic to rotate sales personnel, and reduces sales personnel bickering, while positively tracking lead collection and close ratios and creating an automated way to notify sales personnel who is up next in a digitally fenced off "up area" and provide notifications to sales personnel who wander away from the dealership floor.

The sales rotation system of the present disclosure may be comprised of the following elements. This list of possible constituent elements is intended to be exemplary only and it is not intended that this list be used to limit the sales rotation system of the present application to just these elements. Persons having ordinary skill in the art relevant to the present disclosure may understand there to be equivalent elements that may be substituted within the present disclosure without changing the essential function or operation of the sales rotation system.

1. Management cloud
2. Management software application that runs on a management computing device and provides sales management features.
3. Sales personnel user software application that runs on a sales personnel user computing device and provides sale personnel user features.
4. A designated area that is confined by a plurality of beacon devices to draw a perimeter about the designated area. The designated area can be, for example, a dealership showroom "fenced off up area" or a dealership showroom entry, or some other area for who's up next.

The various elements of the sales rotation system of the present disclosure may be related in the following exemplary fashion. It is not intended to limit the scope or nature of the relationships between the various elements and the following examples are presented as illustrative examples only. The management cloud supports the sales rotation cloud-computing system to provide a software-as-a-service (SaaS) multi-tenant cloud computing sales rotation management platform. In some embodiments, the sales rotation cloud-computing system comprises a sales rotation management cloud server and a sales rotation cloud database. In combination with the sales rotation management cloud server, the management software application that runs on a management computing device provides management features that allows a sales manager to manage the rotation of sales personnel. Also in combination with the sales rotation management cloud server, the sales personnel user software application (also referred to as the "sales representative user software application") that runs on the sales personnel user computing device (also referred to as the "sales representative user computing device") provides sales personnel user features that allows a sales personnel representative to generate requests for active and inactive status based on proximity to the fenced off "up area", receive notifications of when they are up, and be directed to the fenced off "up area" to wait for the next walk-up customer. In some embodiments, the management software application is a management mobile app and the management computing device is a management mobile device. In some embodiments, the sales personnel user software application is a sales personnel user mobile app and the sales personnel user computing device is a sales personnel user mobile device.

The management cloud of the sales rotation system of the present disclosure generally works by setting a system timer for a "Who's Up" rotation, with intervals and a countdown per interval for sales personnel outside of an area that is designated by one or more beacon devices. In some embodiments, interval duration of the system timer is configured by a manager and a default interval duration is sixty seconds. In some embodiments, a sales manager uses the management software application to configure a dealership in a multi-tenant cloud, set up a dealership-specific cloud database, set manager(s) password(s), configure dynamic status list(s) including a test drive list, a "with customer" list, an offsite list, an "in F&I" list, and an "at service" list. In some embodiments, the management cloud of the sales rotation system supports uploading of test drive waiver forms and storage of completed (executed and signed) test drive waiver forms. In some embodiments, the management cloud of the sales rotation system allows a manager to set client ID of the dealership for rewards card activation and links to market. In some embodiments, the management cloud of the sales rotation system supports basic reporting for daily walk-up reports, weekly walk-up reports, monthly walk-up reports, and year-to-date (YTD) walk-up reports. In some embodiments, the management cloud of the sales rotation system provides intelligent data analysis that generates visual output for demographics data and heat map data. In some embodiments, the management cloud of the sales rotation system allows a manager to set a rotation time for a sales personnel representative user. In some embodiments, the management cloud of the sales rotation system allows a sales personnel user or a manager user to set information for a sales personnel representative, including a name of the sales representative, a phone number for texting and calling, a team name, a hardware ID (e.g., MAC address) of a computing device of the sales representative, an IP address associated with the sales representative, and other such identifying information about the sales representative.

By way of example, a dealership that deploys the sales rotation system of the present disclosure may work in the following manner. Sales management (a "management user") inputs or enters sales personnel details of each sales representative of each sales shift team into the sales rotation system by way of a mobile app with cloud administration management interface or panels, or via a software application (e.g., a desktop app or a browser) that connects to a website for cloud-based administration. After entering the sales personnel details of the sales representatives via the cloud admin management interface/panels, each sales representative user then downloads a mobile app on his/her mobile device (e.g., an iOS phone, an Android phone, a mobile tablet computing device, etc.). An electronic communicative beacon (e.g., an Eddystone/iBeacon) is placed within a desired location of the dealership showroom floor or where customers would naturally approach the dealership and a range is set for the beacon. In some embodiments, the beacon deploys with a default range of 35 feet when not actively set or changed to a different range setting.

After initial set-up, a digital round robin sales rotation process is performed by the sales rotation system of the present disclosure. The digital round robin sales rotation process starts when a sales representative user (with mobile app installed on mobile device) is in range of the beacon. The digital round robin sales rotation process includes the following steps. First, the beacon detects the mobile app on the mobile device of the sales representative user who is in range of the beacon. Second, the beacon triggers a "Who's Up?" request that is transmitted/communicated to the mobile app on the sales representative user's mobile device. Upon receiving the "Who's Up?" request in the mobile app, the sales representative user either accepts the request or declines the request to be added to the queue, as the third step of the digital round robin sales rotation process.

In some embodiments, the digital round robin sales rotation process continues to the fourth step of determining whether the mobile app running on the sales representative user's mobile device is the first time being used in connection with the beacon at the dealership. When the digital round robin sales rotation process determines affirmatively that it is the first time the mobile app running on the sales representative user's mobile device is being used in connection with the beacon at the dealership, then the digital round robin sales rotation process prompts the sales representative user for his/her name and phone number is search in a cloud data repository that stores sales representative user details. Once a positive match is identified during the cloud data search, the digital round robin sales rotation process then assigns the sales representative user to the team.

Whether or not it is the first time the sales representative user is active in the range of the beacon, as long as the sales representative user has accepted the request to be added to the queue, then the digital round robin sales rotation process of some embodiments prompts the sales representative user with a request to add the sales representative user to the bottom of the queue. Then the sales representative user either accepts the request to be added to the bottom of the queue or rejects the request. When the sales representative user rejects the request to be added to the bottom of the queue, the digital round robin sales rotation process of some embodiments leaves the sales representative user out of the queue. On the other hand, when the sales representative user accepts the request to be added to the bottom of the queue, the digital round robin sales rotation process then adds the sale representative to the bottom of the queue.

In some embodiments, the digital round robin sales rotation process continues through these steps continuously, in parallel and asynchronously, as each sales representative enters or exists the beacon range area, is assigned to the queue, or is removed from the top of the queue after handling the next walk up at the appropriate time.

In some embodiments, the mobile app shows each team member who is handling the present walk up customer (i.e., who's up now), who is assigned in the queue to handle the next walk up (i.e., who is "on-deck"), and who is assigned in the queue to handle the immediate subsequent walk up (i.e., who is on "double deck"), as well as the order of the entire queue of sales representative users, and their relative positions in the queue. Once a customer approaches the dealership, the then current (top of the queue) sales representative user engages with that prospect. If the prospect is a legitimately interested buyer, the sales representative user then taps a tool in the mobile interface of the mobile app (e.g., an "Accept Up" button) and the sales representative user is then removed from the number one Up slot of the queue and moved to bottom of queue; all other sales representative users are accordingly moved up one slot position in the ordered queue. There are also other options to choose that are configurable in the cloud by the admin or sales management users. For example, when a customer is looking for parts or the service department associated with the dealership, other options can be selected in the mobile app interface or cloud admin panels/interface. By selecting another option, for example, the current sales representative user would remain in the first Up position in the ordered queue until a valid new walk-up customer is accepted. In some embodiments, the sales rotation system also provides an automated way to notify when a sales person is up, or is up next, in the queue. In this way, a sales representative can carry out other activities while waiting. For example, the sales representative can sit in on meetings away from the showroom floor, can crunch numbers for closing out other sales is existing or call-back customers, etc.

In some embodiments, the management features of the management software application that runs on the management computing device of the sales rotation system of the present disclosure generally works by providing a user interface (UI) with a settings area for management tools and menus that support removal, reordering, or overriding of one or more sales personnel users in the "Who's Up" queue/list. When toggled "on", a password prompt appears in some embodiments. When a manager user enters a correct password (or other user credentials that are valid for the manager), the UI of the management software application turns on a management feature to reorder, remove, override, etc., one or more sales personnel users.

In some embodiments, the sales personnel user features of the sales personnel user software application that runs on the sales personnel user computing device of the sales rotation system of the present disclosure generally works by providing a sales personnel UI with a set of sales personnel user features. When near a beacon, the sales personnel user software application automatically requests that the sales personnel user be enrolled in the sales rotation system as a new sales person or as a known sales person to be added to the active rotation queue/list. In some embodiments, the request is answered by entering the sales personnel user in a round robin rotation list that employs a first-in, first-out (FIFO) ordered queue. In some embodiments, the mechanism for prompting initially determines if the user is beyond a long range beacon, and if so, prompts the user if they are leaving. A short beacon, in some embodiments, is for an up-front desk and response sub-system in which the user has sixty (60) seconds to respond to a request, while a long non-response is kicked out of the system and a short non-response gets moved to the bottom of the FIFO queue of the round robin rotation list. In some embodiments, the sales personnel user software application generates requests for active (Up) and inactive (non Up) user lists based on proximity to one or more beacon(s) and a range (long or short range) with accompanied timer for response or out-of-range feedback/prompts. In some embodiments, the first sales personnel user and the second sales personnel user in the "Who's Up" queue/list must remain in a designated area to remain in the queue/list. However, when the first sales personnel user or the second sales personnel user leaves the designated area, the sales personnel user software application generates a message to notify the user that the sales rotation system is removing them from the queue/list in the set time duration (default of 60 seconds) for response, with countdown displayed on the sales personnel user computing device screen. In some embodiments, the sales personnel user software application displays a simple interface for texting a peer (or other sales personnel, or manager) in a peer-to-peer short messaging format and wireless architecture (send and reply).

I. Adding a Sales Representative to a Sales Rotation Queue

As described above, sales representatives join sales rotation queues by entering into product display and sales engagement areas, which are physical areas within the range of beacons or defined by geofence areas. Not only to sales representatives join sales rotation queues, but they also leave sales rotation queues. Leaving a sales rotation queue can be done as a temporary departure, such as when needed to speak with a manager in a different area, use restroom facilities, or otherwise depart only momentarily from the queue. On the other hand, a sales representative in a particular sales rotation queue may depart the product display and sales engagement area associated with the particular sales rotation queue in order to join a different sales rotation queue that is related to a different product display and sales engagement area. Therefore, to work effectively, the sales rotation system handles such varied sales representative activities in ways that maintain efficiency and fairness in the round robin rotation so that sales representatives can focus on helping prospective customers instead of concentrating on upstaging other sales representatives to interact with customers. Accordingly, the sales rotation system of the present disclosure involves several sales rotation processes which enable the sales rotation system to handle all the various scenarios, including, adding and removing sales representatives to and from various sales rotation queues associated with various product display and sales engagement areas, managing temporary departures from sales rotation queues, and so on.

The next several examples set forth details of several such sales rotation processes, which are described below by reference to FIGS. 1-4. Specifically, the sales rotation queue processes described by reference to FIGS. 1-4 include (i) a process for adding a sales representative to a sales rotation queue, (ii) a beacon-enabled product display and sales engagement area served by a sales rotation queue, (iii) a geofence-enabled product display and sales engagement area served by a sales rotation queue, (iv) a process for requesting a sales representative to join a sales rotation queue, (iii) a process for rotating sales representatives in a sales rotation queue, and (iv) a temporary queue departure process for managing sales rotation queue order when a sale representative temporarily exits a product display and sales engagement area associated with the sales rotation queue.

In some embodiments, the process for adding a sales representative to a sales rotation queue comprises (i) detecting when a sales representative enters a product display and sales engagement area, (ii) triggering a request to add the sales representative to a sales rotation queue associated with the product display and sales engagement area, (iii) determining whether the sales representative is a member of any dealership sales team, (iv) assigning the sales representative to a particular dealership sales team when the sales representative is not a member of any dealership sales team, and (v) adding the sales representative to the sales rotation queue associated with the product display and sales engagement area.

By way of example, FIG. 1 conceptually illustrates a process for adding a sales representative to a sales rotation queue 100. As shown in this figure, the process for adding a sales representative to a sales rotation queue 100 starts in response to a mobile device of a sales representative entering a product display and sales engagement area that is associated with a sales rotation queue. For example, the product display and sales engagement area can be the physical area of a dealership floor or showroom that is within the wireless signal range of a beacon device.

An example product display and sales engagement area is described by reference to FIG. 2, which conceptually illustrates a beacon-enabled product display and sales engagement area 200 served by a sales rotation queue. The beacon-enabled product display and sales engagement area 200 shown in this figure is a dealership floor or a showroom. Also shown in this figure is a beacon device 202, a beacon range boundary 204, a plurality of active showroom sales representatives 206a, a plurality of non-active showroom sales representatives 206b, a sales rotation queue 210 with a plurality of queued sales representatives 208, a plurality of customers 212, and a sales rotation system server 214. While not shown in this figure, each active showroom sales representative 206a and queued sales representative 208 (and possibly some or all of the non-active showroom sales representatives 206b) has a mobile device with a sales rotation system mobile app installed that facilitates operation of the sales rotation queue 210 via the sales rotation system. A mobile device in this example can be a smart phone, a tablet computing device, or a custom mobile computing device that is capable of running the sales rotation system mobile app and includes one or both of a Bluetooth device/module and a GPS device/module. The sales rotation system server 214 shown in this figure is configured to interact with the sales rotation system mobile apps running on the mobile devices of the sales representatives.

Now turning back to FIG. 1, the process for adding a sales representative to a sales rotation queue 100 starts in response to a sales representative with a mobile device entering (at 105) the range of the beacon. In some embodiments, the mobile device of the sales representative includes a Bluetooth module and/or other wireless technology that is able to detect data packets transmitted periodically by the beacon device. In particular, the beacon device periodically transmits data packets that include beacon identification data. The beacon identification data includes at least a unique beacon identifier ("beacon UID") that is distinguishable from any other beacon device which may be present at a particular dealership or anywhere else outside of the dealership. As such, an administrator of the sales rotation system can configure a one-to-one (1:1) relationship that links each product display and sales engagement area (e.g., showroom, dealership floor area, dealership lot, etc.) to a particular beacon with a unique identifier (i.e., the beacon UID). In conjunction with the 1:1 relationship between each beacon and product display and sales engagement area, a sales rotation queue can be configured to manage sales representatives awaiting prospective customers in a particular product display and sales engagement area. By linking each product display and sales engagement area with a particular beacon and configuring a particular sales rotation queue in connection with the particular beacon and associated product display and sales engagement area, a networked sales rotation server of the sales rotation system can manage the round robin rotation of sales representatives efficiently and fairly.

In some embodiments, the sales rotation system configures geofence areas that outline perimeter boundaries of product display and sales engagement areas. By way of example, FIG. 3 conceptually illustrates a geofence-enabled product display and sales engagement area 300 served by the sales rotation queue 210. In contrast to the beacon-enabled product display and sales engagement area 200 described by reference to FIG. 2, the geofence-enabled product display and sales engagement area 300 has a geofence boundary 316 instead of the beacon range boundary 204 that relates to the beacon device 202. In some embodiments, a geofence boundary is configured by an administrator who defines a perimeter around the product display and sales engagement area and which the GPS device onboard the mobile device of each sales representative is able to determine based on realtime location information obtained from multiple satellites of a global positioning system. While this example of a geofence boundary 316 for the geofence-enabled product display and sales engagement area 300 is shown in a showroom or dealership floor, it is typically common to deploy geofencing for outdoor installments, such as would be common for dealership lots. However, this introduction of geofencing is provided at a conceptually level so that it is clear that embodiments described herein are not limited to one or another wireless fencing strategy. With that being said, more details of geofencing and geofence product display and sales engagement areas are described below, by reference to FIGS. 14, 19, and 20.

Figure 2:
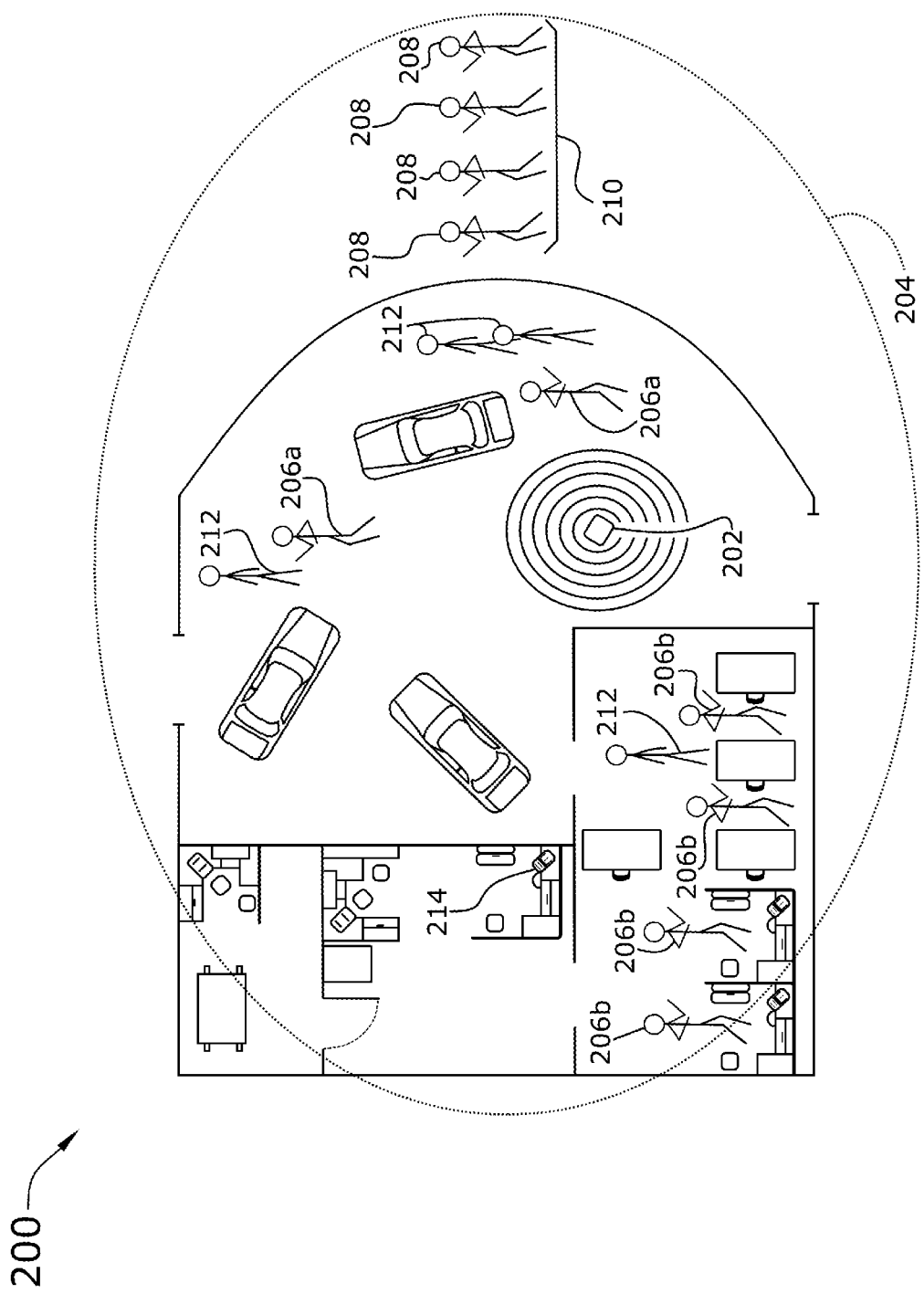
FIG. 2 conceptually illustrates a beacon-enabled product display and sales engagement area of an automobile dealership served by a sales rotation queue in some embodiments.
Figure 3:
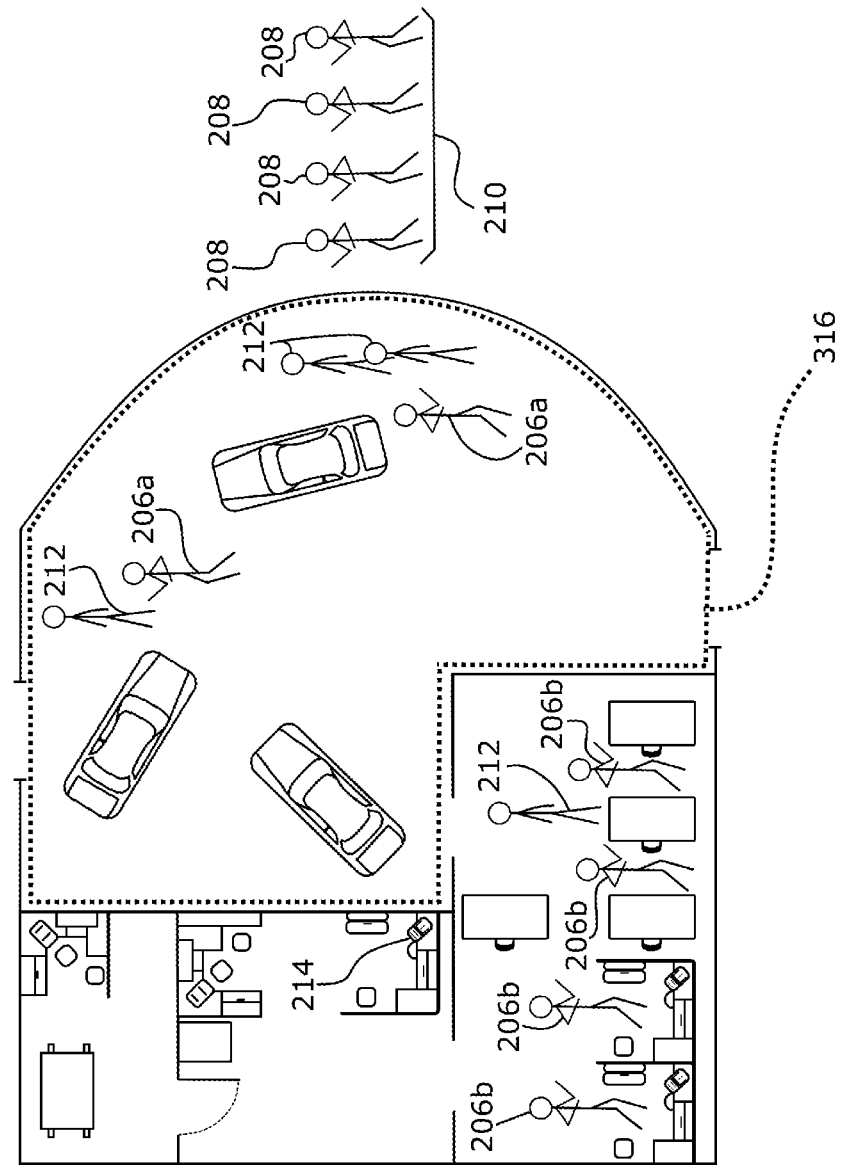
FIG. 3 conceptually illustrates a geofenced product display and sales engagement area of an automobile dealership served by a sales rotation queue in some embodiments.

Additionally, while the beacon-enabled product display and sales engagement area 200 and the geofence-enabled product display and sales engagement area 300 are shown separately in FIG. 2 and FIG. 3, respectively, it is also feasible to combine beacon devices with geofencing. Specifically, any geofence product display and sales engagement area of the sales rotation system can be configured in conjunction with a beacon device that is exclusively associated an overlapping part of the same product display and sales engagement area (via 1:1 relationship between the beacon UID and the beacon product display and sales engagement area defined by the beacon signal range). The overlapping part of the beacon product display and sales engagement area can be overlapping an entirety of the geofence product display and sales engagement area or a lesser part of the geofence product display and sales engagement area.

Now, turning back to FIG. 1, the process for adding a sales representative to a sales rotation queue 100 continues to the next step in which the beacon device triggers a request to add the sales representative (at 110), who is associated with the mobile device detected entering in the range of the beacon device, to the sales rotation queue. The request (otherwise known as a "Who's Up?" request) is sent to the mobile app on the mobile device by way of the sales rotation system server. More details concerning the manner of detecting when a sales representative enters the range of the beacon and how the "Who's Up?" request gets transmitted to the mobile device or wearable device of the sales representative are described in greater detail below, by reference to FIG. 4.

After sending the "Who's Up?" request to the mobile device of the sales representative, the process for adding a sales representative to a sales rotation queue 100 of some embodiments determines (at 115) whether to add the sales representative to the sales rotation queue that is associated with the product display and sales engagement area. In some embodiments, the process for adding a sales representative to a sales rotation queue 100 makes the determination based on a response input provided by the sales representative when the "Who's Up?" request is sent to the mobile device of the sales representative. For example, the "Who's Up?" request may be received at the mobile device of the sales representative and cause the mobile app to activate ("awaken", "wake up", etc.) and may thereafter prompt the sales representative with a graphical display, such as a window or a banner, which asks the sales representative whether he or she would like to join the sales rotation queue related to the product display and sales engagement area.

In some embodiments, when the sales representative does not want to be added to the sales rotation queue, then the process for adding a sales representative to a sales rotation queue 100 ends. For example, the sales representative may have entered the product display and sales engagement area (within the beacon range or within the geofence area) for a purpose other than to engage with prospective customers, and therefore, may not wish to be added to the sales rotation queue.

On the other hand, when the sales representative wishes to join the sales rotation queue associated with the present product display and sales engagement area, then the process for adding a sales representative to a sales rotation queue 100 determines (at 120) whether this is the first time the sales representative is using the mobile app on the mobile device in connection with the beacon device (or GPS-based geofence area). In some embodiments, when a first use of the mobile app is detected in connection with a beacon device or geofencing, then it is possible that the sales representative needs to be added to a sales team. However, when this is not the first time use, then it is only a matter of adding the sales representative to the sales rotation queue. Thus, the process for adding a sales representative to a sales rotation queue 100 adds the sales representative to the bottom of the sales rotation queue (at 150) when the mobile app is not determined to be used the first time. Then the process for adding a sales representative to a sales rotation queue 100 ends.

On the other hand, when a first-time use is determined, then the process for adding a sales representative to a sales rotation queue 100 prompts the sales representative (at 125) to input identifying information. Examples of identifying information include, without limitation, name of the sales representative, phone number of the sales representative's mobile device, or both name and phone number.

Next, the process for adding a sales representative to a sales rotation queue 100 receives, from the mobile app on the mobile device, the identifying information entered by the sales representative (at 130). Then the process for adding a sales representative to a sales rotation queue 100 searches (at 135) for the sales representative in a database of known sales representatives on active sales teams. The search is based on the identifying information provided by the sales representative. In some embodiments, the database is a cloud database and the search is performed by a cloud server over the Internet.

After performing the search, the process for adding a sales representative to a sales rotation queue 100 determines (at 140) whether a match is found. In some embodiments, when a sales representative is a member of a sales team, but gets a new mobile device, the search allows for the old sales team information to be associated with the sales representative's new mobile device. Thus, searching the database to find the sales representative reduces redundant information storage and unnecessary assignments or re-assignments of sales representatives to sales teams. When no match is found, then the process for adding a sales representative to a sales rotation queue 100 ends. For example, a former sales representative who no longer is associated with the dealership, may somehow end up at the dealership with his or her mobile device, and if the mobile app is still installed on the mobile device, it is possible to trigger the actions of adding the sales representative to the sales rotation queue. However, when the database reveals that the sales representative is not a member of any sales team for the dealership, then the process 100 ends before adding the former sales representative to the sales rotation queue.

On the other hand, when a match is found, then the process for adding a sales representative to a sales rotation queue 100 assigns (at 145) the sales representative to the sales team. The process for adding a sales representative to a sales rotation queue 100 shortly thereafter adds (at 150) the sales representative to the bottom of the sales rotation queue. Then the process for adding a sales representative to a sales rotation queue 100 ends.

As noted above, in the process for adding a sales representative to a sales rotation queue 100 described above by reference to FIG. 1, the steps for detecting a mobile device entering into a product display and sales engagement area (at 105) associated with a beacon device (or a geofence area) and then triggering a "Who's Up?" request (at 110) to join the sales rotation queue for that product display and sales engagement area includes a plurality of more detailed steps. In some embodiments, the plurality of steps in triggering the request to add the sales representative to the sales rotation queue are performed by the process for requesting a sales representative to join a sales rotation queue. In some embodiments, the process for requesting a sales representative to join a sales rotation queue comprises (i) capturing, by a mobile device, a beacon signal from a beacon device that sends a unique beacon ID ("beacon UID"), (ii) activating a sale rotation system mobile app installed on the mobile device in response to capturing the beacon UID, (iii) sending, by the sales rotation system mobile app and mobile device, the beacon UID to a sales rotation network server, and (iv) requesting, in response to receiving a notification from the sales rotation network server, to add the sales representative to the sales rotation queue.

Figure 4:
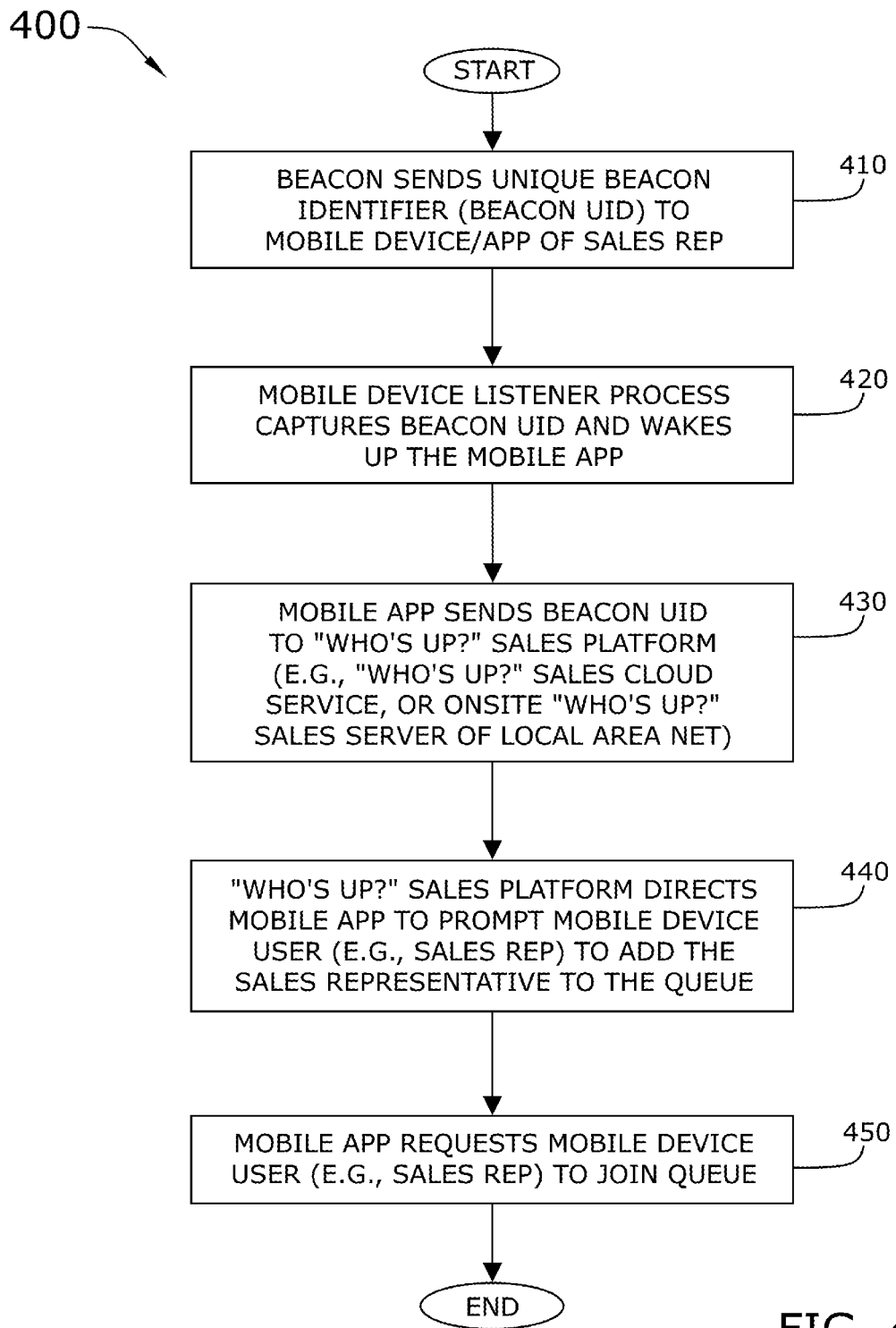
FIG. 4 conceptually illustrates a process for requesting a sales representative to join a sales rotation queue in some embodiments.

By way of example, FIG. 4 conceptually illustrates a process for requesting a sales representative to join a sales rotation queue 400. The process for requesting a sales representative to join a sales rotation queue 400 is based on beacon technology in which a beacon device located in and defining a range of a product display and sales engagement area continuously and periodically broadcasts beacon data packets with a unique beacon identifier ("beacon UID"). However, in a broader perspective, the process for requesting a sales representative to join a sales rotation queue 400 occurs when a mobile device of the sales representative enters into a product display and sales engagement area with any geospatial identification technology deployed, including a wireless beacon zone, such as the beacon zone 204 described above by reference to FIG. 2, or a defined geofenced area, such as the geofenced area 316 described above by reference to FIG. 3. Nevertheless, since the process for requesting a sales representative to join a sales rotation queue 400 described in this figure includes a detailed description of the steps involved in triggering a "Who's Up?" request to add the sales representative to the sales rotation queue, such as at step 110 described above by reference to FIG. 1, much of the description that follows is based on an example using beacon technology.

In some embodiments, the process for requesting a sales representative to join a sales rotation queue 400 starts with the beacon sending (at 410) the beacon UID to the mobile device or wearable device of the sales representative. The beacon sends the beacon UID by radio frequency (RF) transmission or Bluetooth transmission and can be said to "broadcast" the beacon UID. Furthermore, the beacon sends the beacon UID periodically. For example, the beacon device may broadcast transmit a beacon UID data packet every second, such that any mobile device or wearable device with an RF antenna or Bluetooth-enabled mobile or wearable device can receive the beacon UID data packet.

Next, the process for requesting a sales representative to join a sales rotation queue 400 continues to a step in which a listener process running on the mobile device or wearable device of the sales representative captures (at 420) the beacon UID data packet and wakes up the mobile app. In some embodiments, the process for requesting a sales representative to join a sales rotation queue 400 then proceeds to the next step in which the mobile app on the mobile device/wearable device of the sales representative sends (at 430) the beacon UID to the sales rotation system server. For example, the sales rotation system server may be a cloud server that hosts a "Who's Up?" sales rotation platform as a cloud service or may be a server-hosted platform on a local area network (LAN) or personal area network (PAN) that is centrally positioned onsite at the dealership, such as in a server room of the dealership, with WiFi enabled for the mobile devices and/or wearable devices of the sales representatives to be able to communicate wirelessly with the sales rotation system server.

In some embodiments, the process for requesting a sales representative to join a sales rotation queue 400 continues to a step in which the "Who's Up?" sales rotation platform (whether being a cloud-based service or a local server-enabled server application) directs the mobile app (at 440) on the mobile/wearable device to prompt (or request) the user of the mobile/wearable device (e.g., the sales representative) to add the sales representative to the sales rotation queue. Then the process for requesting a sales representative to join a sales rotation queue 400 continues to a step in which the mobile app running on the mobile device or wearable device requests (at 450) the user (e.g., the sales representative) to join the sales rotation queue. Then the process for requesting a sales representative to join a sales rotation queue 400 ends, continuing forward with additional steps as described above by reference to FIG. 1.

Figure 5:
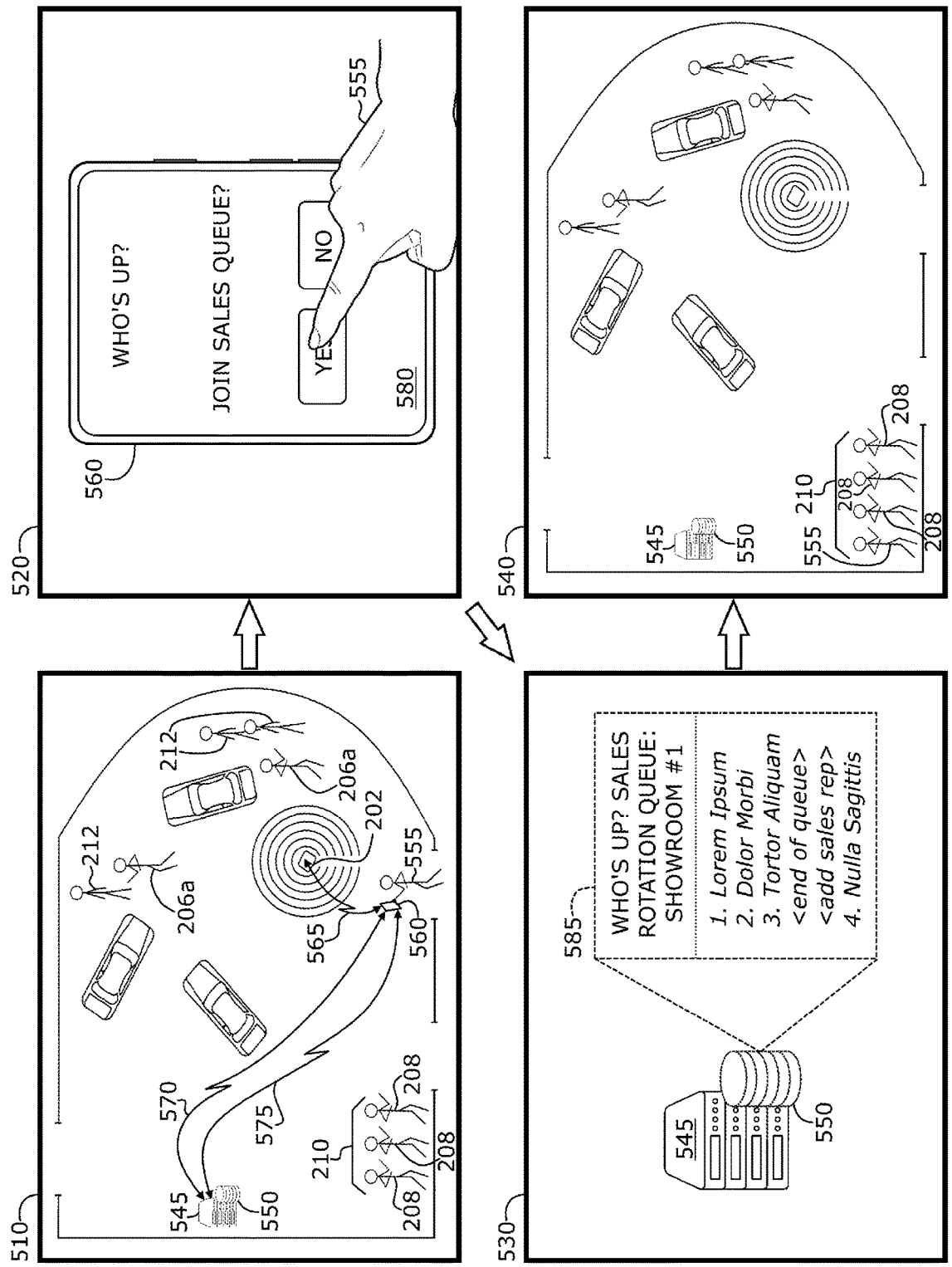
FIG. 5 conceptually illustrates a phase diagram with several stages that demonstrate adding a sales representative to a sales rotation queue associated with a beacon-enabled product display and sales engagement area in some embodiments.

Turning to another example, FIG. 5 conceptually illustrates a phase diagram with several stages that demonstrate adding a sales representative to a sales rotation queue associated with a beacon-enabled product display and sales engagement area. As shown in this figure, the stages of adding a sales representative to a sales rotation queue include a first stage 510 in which a sales representative enters a beacon-enabled product display and sales engagement area, a second stage 520 in which the sales representative selects to join the sales rotation queue associated with the beacon-enabled product display and sales engagement area, a third stage 530 in which the sales representative is added to the bottom of an ordered sales rotation queue list, and a fourth stage 540 in which the sales representative waits at the back of the sales rotation queue.

Specifically, the first stage 510 demonstrates a dealership floor or showroom in which a beacon device 202 is present. There are sales representatives and customers present in the showroom, including a plurality of active showroom sales representatives 206a who are interacting with a plurality of customers 212, a plurality of queued sales representatives 208 who are waiting in a sales rotation queue 210 to help any other walk-up customers, and a particular sales representative 555 with a mobile device 560. In addition, a server 545 and database 550 are shown in the first stage 510. While the server 545 and database 550 are shown in this example as being physically present in the showroom, in some embodiments, the server 545 and database 550 are placed outside of the showroom (perhaps in a server room, or other such nearby location). In some other embodiments, the server 545 and database 550 are cloud-based computing resources that are not physically present at the dealership, but are communicably connected to the dealership over the Internet. In some embodiments, each sales representative has a mobile device which is communicably connected via WiFi to the server 545 and database 550, whether the server 545 and database 550 are nearby or cloud-based resources. Additionally, the mobile device of each sales representative includes an RF antenna or Bluetooth device that allows beacon signals, such as RF beacon data packet transmission signals to be captured.

As shown during the first stage 510, the particular sales representative 555 demonstrates how wireless connectivity between the mobile device 560 and the server 550 and database 545, as well as the beacon device 202, enable the sales rotation system to efficiently manage the addition of a sales representative to an existing sales rotation queue. In this example, the particular sales representative 555 appears to be entering the dealership floor from another area. When the particular sales representative 555 enters the beacon-enabled product display and sales engagement area, the mobile device 560 detects a broadcast signal 565 from the beacon device 202. The broadcast signal includes data packet(s) with the beacon UID. The mobile device 560 then transmits the broadcast UID 570 to the server 545. Upon receiving the beacon UID 570 signal from the mobile device 560, the server 545 then sends data 575 to the mobile device 560. The data transmission 575 from the server 545 to the mobile device 560 includes data instructing the mobile device 560 to wake up the mobile app and prompt the particular sales representative 555 to join the sales rotation queue 210.

During the second stage 520, the mobile device 560 of the particular sales representative 555 displays a request to join sales rotation queue user interface (UI) 580. The request to join sales rotation queue UI 580 includes a "YES" button and a "NO" button. Upon selection of the "YES" button by the particular sales representative 555, the mobile device 560 sends the selection back to the server 545.

In the third stage 530, the server 545 is shown accessing the database 550 to retrieve an ordered sales rotation queue list 585 associated with the beacon device 202 and showroom. The ordered sales rotation queue list 585 in this example already includes several names of the plurality of queued sales representatives 208 in their respective ordered positions in the sales rotation queue (i.e., "1. Lorem Ipsum", "2. Dolor Morbi", and "3. Tortor Aliquam"). Furthermore, a new entry is made in the ordered sales rotation queue list 585 to add the particular sales representative 555 to the bottom of the ordered sales rotation queue list 585 (i.e., "4. Nulla Sagittis").

Finally, as shown in the fourth stage 540, the particular sales representative 555 files into the last position in the sales rotation queue 210, in accordance with the ordered sales rotation queue list 585. Although the sales rotation queue 210 in this and other examples is illustrated with sales representatives waiting in single-file fashion, a person of ordinary skill in the art would appreciate that this is only intended for demonstration, and that sales representatives in the sales rotation queue 210 are generally free to congregate in less formal manner. However, there are limitations imposed on the informal manner of waiting in the sales rotation queue. Specifically, when a sales representative in the sales rotation queue leaves the product display and sales engagement area (e.g., the area defined by the beacon signal range or the geofence perimeter area), then the sales rotation system of some embodiments sets a temporary exit timer for permissible time-limited departure. When a sales representative departs from the sales rotation queue by leaving the product display and sales engagement area for longer than the temporary exit timer period, then the sales rotation system de-queues the sales representative from the sales rotation queue. The reason for removing the sales representative from the sales rotation queue when the departure exceeds the temporary exit timer period is because the sales rotation system needs to ensure efficient and effective management of the sales rotation queue in view of walk-up customers who may be sparse at times and plentiful at other times. While details of departures from the sales rotation queue are described further below, the efficient and effective management of the sales rotation queue starts with realtime processing by the sales rotation system, which is described next.

II. Realtime Sales Rotation Queue Shuffling

In some embodiments, the process for rotating sales representatives in a sales rotation queue comprises (i) identifying a sales representative who is next up in the sales rotation queue associated with a product display and sales engagement area, (ii) determining whether the identified sales representative is engaged in sales activities with the non-served customer in a product display and sales engagement area, (iii) removing the identified sales representative from the top of the sales rotation queue when the identified sales representative is engaged in sales activities with the non-served customer, (iv) and increasing the position of the remaining sales representatives in the sales rotation queue in response to removing the identified sales representative from the top of the sales rotation queue.

Figure 6:
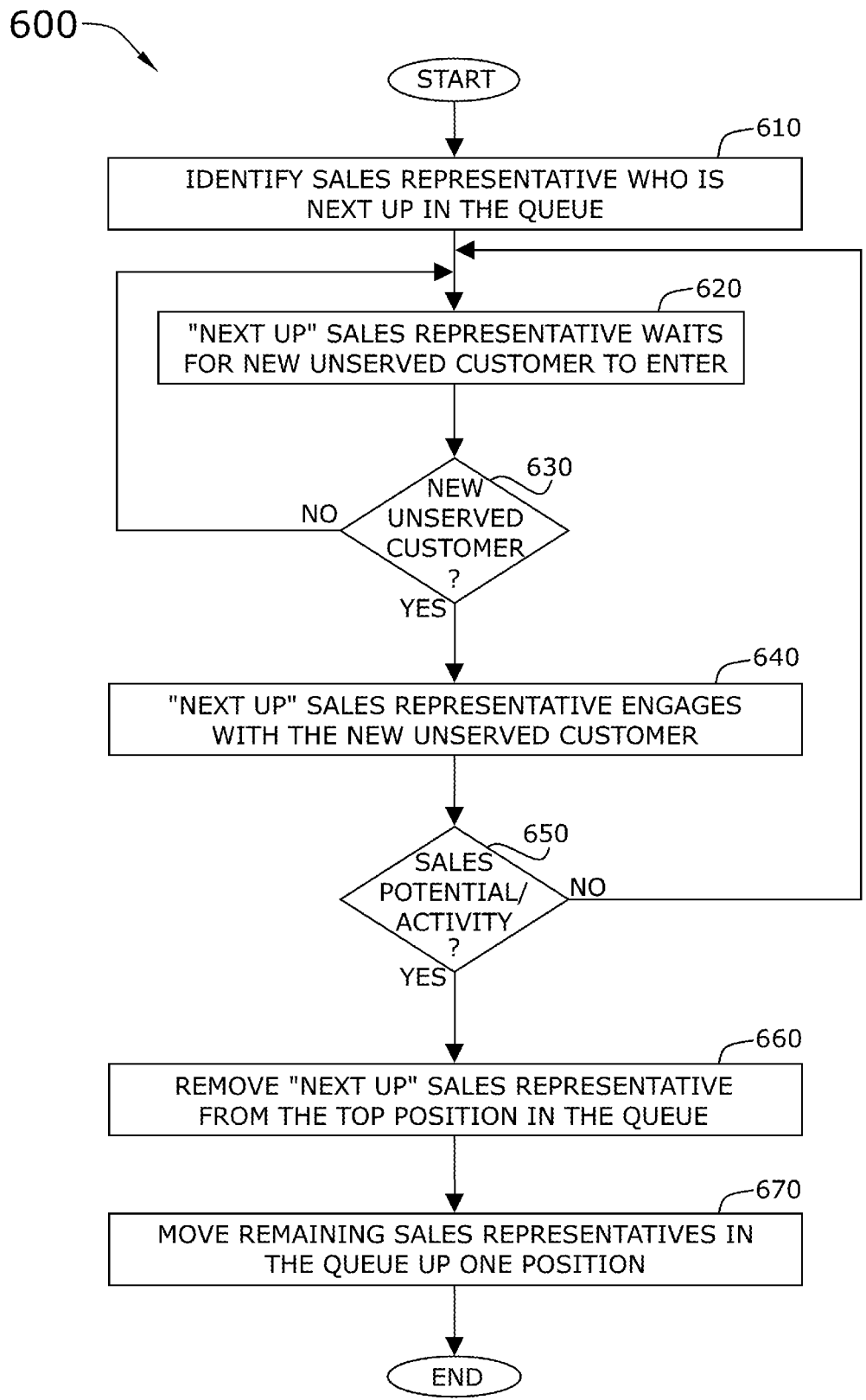
FIG. 6 conceptually illustrates a realtime sales representative rotating process for rotating sales representatives in a sales rotation queue in some embodiments.

By way of example, FIG. 6 conceptually illustrates a realtime sales representative rotating process for rotating sales representatives in a sales rotation queue 600. As shown in this figure, the realtime sales representative rotating process for rotating sales representatives in a sales rotation queue 600 is performed in connection with prospective walk-up customers entering a product display and sales engagement area that is associated with a sales rotation queue managed by the sales rotation system. In particular, the realtime sales representative rotating process for rotating sales representatives in a sales rotation queue 600 first identifies (at 610) a sales representative who is next up in the sales rotation queue. In some embodiments, the sales representative who is next up in the sales rotation queue is identified in an ordered sales rotation queue list, such as the ordered sales rotation queue list 585 that is stored in the database 550 described above by reference to FIG. 5. In some embodiments, the mobile apps running on the mobile devices or wearable devices of the sales representatives in the sales rotation queue display a position number in a user interface that is visual output onto the screens of their mobile devices or wearable devices. Therefore, most of the sales representatives already know their order in the sales rotation queue. Nevertheless, the sales rotation system keeps track of the sales rotation queue order and, while rotating through sales representatives in the sales rotation queue in response to new prospective walk-up customers entering the product display and sales engagement area, sends push notifications of updated sales rotation queue positions to the mobile apps running on the mobile devices or wearable devices of the sales representatives that are in the sales rotation queue.

The next step of the realtime sales representative rotating process for rotating sales representatives in a sales rotation queue 600 involves the identified next up sales representative in the sales rotation queue waiting (at 620) for a new prospective walk-up customer to enter the product display and sales engagement area. While waiting, the realtime sales representative rotating process for rotating sales representatives in a sales rotation queue 600 determines (at 630) whether a new prospective walk-up customer has entered the product display and sales engagement area. When no customer has entered, the realtime sales representative rotating process for rotating sales representatives in a sales rotation queue 600 returns to the prior steps in which the next up sales representative waits for a new prospective walk-up customer to enter the product display and sales engagement area. In some embodiments, the realtime sales representative rotating process for rotating sales representatives in a sales rotation queue 600 periodically determines (at 630) whether a new prospective walk-up customer has entered the product display and sales engagement area until a new prospective walk-up customer actually has entered the product display and sales engagement area. In that case, when a new prospective walk-up customer actually has entered the product display and sales engagement area, the realtime sales representative rotating process for rotating sales representatives in a sales rotation queue 600 involves the next up sales representative engaging (at 640) with the new prospective walk-up customer.

In some embodiments, the realtime sales representative rotating process for rotating sales representatives in a sales rotation queue 600 then determines (at 650) whether there is sales potential or sales-related engagement underway between the sales representative and the new prospective walk-up customer. In some embodiments, the determination is made by a push notification and prompt to the mobile app running on the mobile/wearable device of the sales representative who is engaging with the new prospective walk-up customer. The push notification and prompt may request input from the sales representative as to whether or not the new prospective walk-up customer is engaged in sales-related activities or not. For example, it is possible that the new prospective walk-up customer is simply inquiring about another, non-sales matter, such as where he or she might find a restroom, or where to get service on a previously purchased vehicle, etc. In such case, when the new prospective walk-up customer is not interested in sales-related activities, the sales representative returns to the sales rotation queue and the realtime sales representative rotating process for rotating sales representatives in a sales rotation queue 600 maintains the order of the sales rotation queue and returns to the prior steps of waiting for a new prospective walk-up customer (at 620), and so forth.

On the other hand, when the new prospective walk-up customer is interested in sales-related activities, then the realtime sales representative rotating process for rotating sales representatives in a sales rotation queue 600 removes (at 660) the next up sales representative from the top position in the ordered sales rotation queue list and summarily moves (at 670) the remaining sales representatives in the sales rotation queue up one position in the ordered sales rotation queue list. Then the realtime sales representative rotating process for rotating sales representatives in a sales rotation queue 600 ends.

Figure 7:
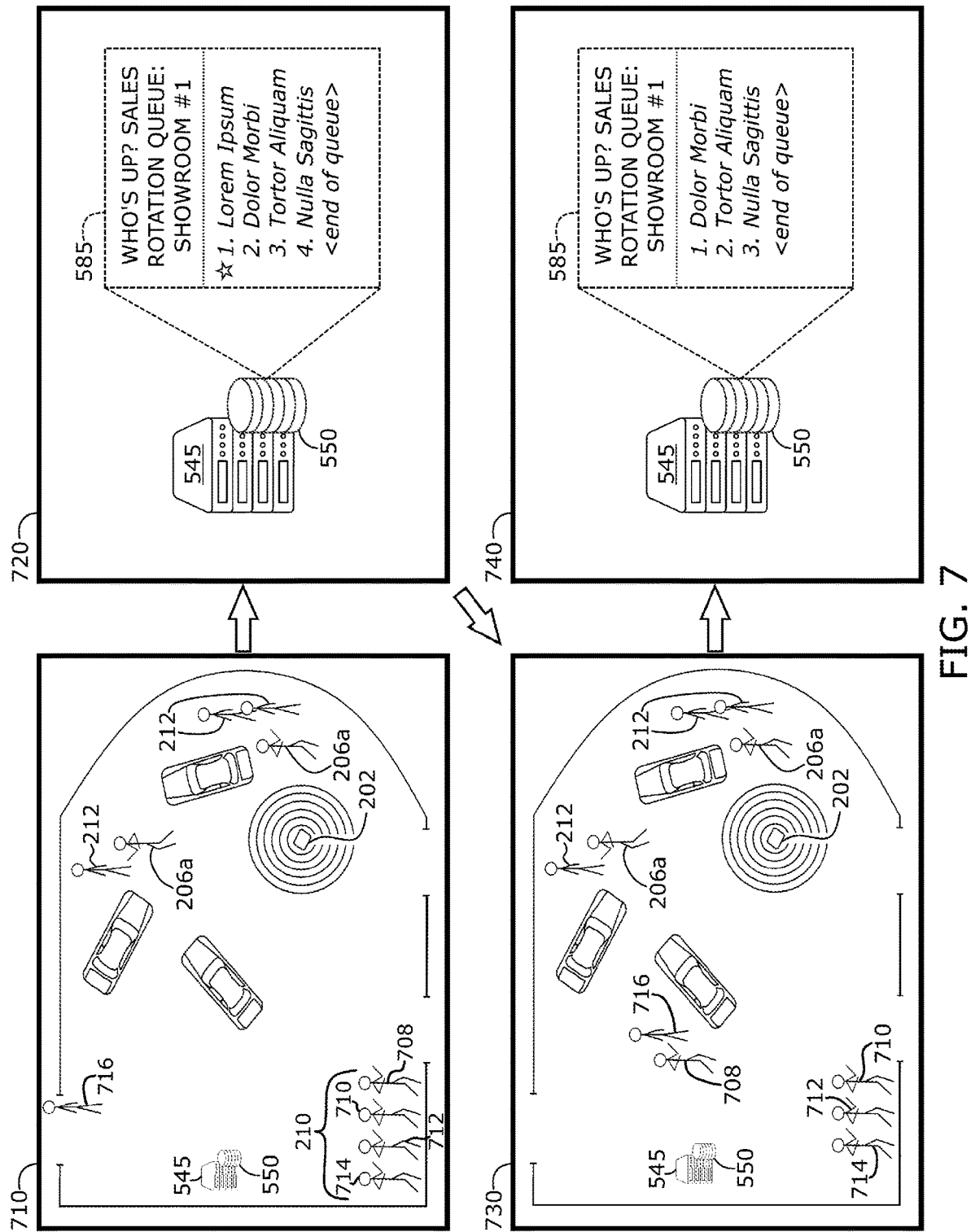
FIG. 7 conceptually illustrates a phase diagram with several stages that demonstrate rotating sales representatives in a sales rotation queue associated with a beacon-enabled product display and sales engagement area in some embodiments.

Now turning to another realtime sales rotation queue sales representative rotating example, FIG. 7 conceptually illustrates a phase diagram with several stages that demonstrate rotating sales representatives in a sales rotation queue associated with a beacon-enabled product display and sales engagement area. As shown in this figure, the stages that demonstrate rotating sales representatives in a sales rotation queue include a first stage 710 in which sales representatives in a sales rotation queue await new prospective walk-up customers to enter a beacon-enabled product display and sales engagement area, a second stage 720 in which the "next up" sales representative in the sales rotation queue is identified, a third stage 730 in which the identified "next up" sales representative engages a new prospective walk-up customer who has entered the product display and sales engagement area, and a fourth stage 740 in which the "next up" sales representative is removed from the ordered sales rotation queue list and the remaining sales representatives in the sales rotation queue are moved up one position in the list.

Specifically, the first stage 710 demonstrates a dealership floor or showroom (or simply, the "product display and sales engagement area") in which a beacon device 202 is present. There are sales representatives and customers present in the product display and sales engagement area, including a plurality of active showroom sales representatives 206a who are interacting with a plurality of customers 212, a sales rotation queue 210, a first queued sales representative 708, a second queued sales representative 710, a third queued sales representative 712, a fourth queued sales representative 714, and a new prospective walk-up customer 716. During the first stage 710, the first queued sales representative 708, the second queued sales representative 710, the third queued sales representative 712, and the fourth queued sales representative 714 are awaiting new prospective walk-up customers in the sales rotation queue 210. In addition, a server 545 and database 550 are shown in the first stage 510. While the server 545 and database 550 are shown in this example as being physically present in the product display and sales engagement area, as noted previously, the server 545 and database 550 can be positioned elsewhere, such as in a server room or remotely (offsite) as a cloud-based computing resource (e.g., a cloud server that hosts a sales rotation cloud service in connection with a cloud-based database) which is communicably connected to the dealership over the Internet.

As shown during the first stage 710, the first queued sales representative 708, the second queued sales representative 710, the third queued sales representative 712, and the fourth queued sales representative 714 wait in the sales rotation queue 210 as the new prospective walk-up customer 716 enters the product display and sales engagement area.

During the second stage 720, the server 545 accesses the database 550 to retrieve the ordered sales rotation queue list 585 in order to determine who is "next up" in the sales rotation queue 210. As shown in the ordered sales rotation queue list 585, a sales representative by the name of "Lorem Ipsum" is next up (first position) in the sales rotation queue 210. The sales representative by the name of "Lorem Ipsum" in this example is the first queued sales representative 708. Similarly, the second queued sales representative 710 is listed in the second position as "Dolor Morbi" in the ordered sales rotation queue list 585, the third queued sales representative 712 is listed in the third position as "Tortor Aliquam" in the ordered sales rotation queue list 585, and the fourth queued sales representative 714 is listed in the fourth position as "Nulla Sagittis" in the ordered sales rotation queue list 585.

Moving forward to the third stage 730, the first queued sales representative 708 ("Lorem Ipsum") approaches and engages with the new prospective walk-up customer 716, who has fully entered the product display and sales engagement area. Meanwhile, the second queued sales representative 710, the third queued sales representative 712, and the fourth queued sales representative 714 have moved ahead in the sales rotation queue 210. As noted above, in actual practice, the sales representatives in the sales rotation queue 210 are not required to form a single-file line or otherwise order themselves in any kind of line-up, but are generally allowed to remain grouped or ungrouped so long as they remain within the product display and sales engagement area.

The natural repositioning of the second queued sales representative 710, the third queued sales representative 712, and the fourth queued sales representative 714 in response to the first queued sales representative 708 interacting with the new prospective walk-up customer 716 is mirrored by the actions of the sales rotation system, as shown in the fourth stage 740, during which the ordered sales rotation queue list 585 is updated with the newly re-ordered list of sales representatives in the sales rotation queue 210. Specifically, the entry for "Lorem Ipsum" is removed from the ordered sales rotation queue list 585 due to the first queued sales representative 708 interacting with the new prospective walk-up customer 716 in sales-related activities. Thus, the top position is now occupied by "Dolor Morbi" (i.e., the second queued sales representative 710), while the second position is now occupied by "Tortor Aliquam" (i.e., the third queued sales representative 712), and the bottom position of the ordered sales rotation queue list 585 is updated to list "Nulla Sagittis" (i.e., the fourth queued sales representative 714).

III. Temporary Departures from the Sales Rotation Queue

In some embodiments, the temporary queue departure process for managing sales rotation queue order when a sale representative temporarily exits a product display and sales engagement area associated with the sales rotation queue comprises (i) capturing beacon UID data packets, (ii) transmitting the beacon UID to the server, (iii) determining whether the sales representative is in the sales rotation queue, (iv) requesting the sales representative to join the sales rotation queue when not already in the sales rotation queue, (v) maintaining "enqueued" status of the sales representative when affirmatively determined to be in the sales rotation queue, (vi) setting a temporary exit timer when the mobile device stops receiving beacon UID signals, (vii) counting down the time of the temporary exit timer while listening for beacon UID signals, (viii) determining whether any beacon UID signals are received before time expires, (ix) setting a queue status of the sales representative to de-queued when time expires without receiving any beacon UID signals, and (x) removing the sales representative from the sales rotation queue associated with the beacon UID when the sales representative is de-queued.

Figure 8:
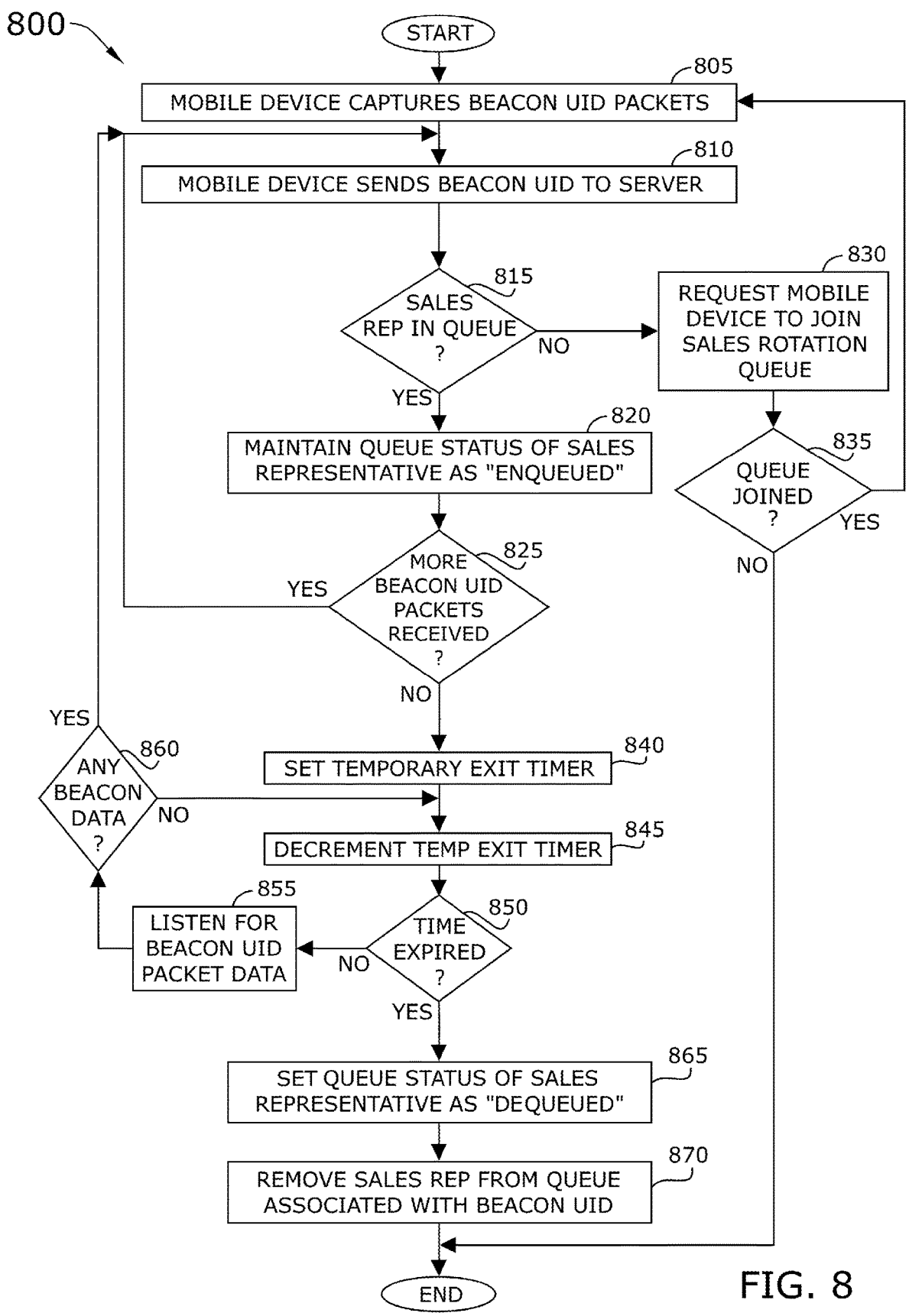
FIG. 8 conceptually illustrates a temporary queue departure process for managing sales rotation queue order when a sale representative temporarily exits a physical area associated with the sales rotation queue in some embodiments.

By way of example, FIG. 8 conceptually illustrates a temporary queue departure process 800 for managing sales rotation queue order when a sale representative temporarily exits a physical area associated with the sales rotation queue. In some embodiments, the physical area associated with the sales rotation queue is limited by beacon wireless range. In some embodiments, the physical area associated with the sales rotation queue is defined by a geofence perimeter. In some embodiments, the physical area associated with the sales rotation queue entirely encapsulates the product display and sales engagement area associated with the sales rotation queue. In some embodiments, the physical area associated with the sales rotation question covers less than an entirety of the product display and sales engagement area associated with the sales rotation queue.

As shown in this figure, the temporary queue departure process 800 starts with a mobile device or wearable device of a sales representative detecting a broadcast signal from a beacon device in a product display and sales engagement area and capturing (at 805) the beacon UID packet data from the detected broadcast signal. In some embodiments, mobile devices and wearable devices with Bluetooth or a suitable RF antenna will receive broadcast signals from beacon devices that continuously broadcast their UIDs for any device in the area to capture. Next, the temporary queue departure process 800 continues to the next step in which the mobile device or wearable device sends the beacon UID to the server (at 810). Whether the mobile app on the mobile device or wearable device is a member of a sales rotation queue associated with the present product display and sales engagement area or not (e.g., just entered the product display and sales engagement area with the beacon device), the mobile app running on the mobile device or wearable device sends the beacon UID to the server of the sales rotation system to either confirm the sales representative's continued presence in the product display and sales engagement area or to join the sales rotation queue when entering the product display and sales engagement area fresh.

In some embodiments, the temporary queue departure process 800 then determines (at 815) whether the sales representative associated with the mobile/wearable device and mobile app sending the beacon UID data to the server is in the sales rotation queue or not. When the sales representative is not in the sales rotation queue of the present product display and sales engagement area, the temporary queue departure process 800 requests (at 830) the sales representative to join the sales rotation queue via pushing a prompt request to the mobile device or wearable device by the server. Then the temporary queue departure process 800 determines (at 835) whether the sales representative has joined the sales rotation queue. When the sales representative has not joined the sales rotation queue, then the temporary queue departure process 800 ends. On the other hand, when the sales representative joins the sales rotation queue, then the temporary queue departure process 800 returns to the steps for capturing (at 805) the beacon UID data from the broadcast signal of the beacon device, and proceeds accordingly.

Turning back to the determination (at 815) of whether the sales representative is in the sales rotation queue, when the sales representative is affirmatively in the sales rotation queue, as checked and confirmed by the server, then the temporary queue departure process 800 continues forward to maintain (at 820) the queue status of the sales representative as "enqueued". Next, the temporary queue departure process 800 determines (at 825) whether more beacon UID data packets are received by the mobile device of the sales representative. When the mobile device of the sales representative receives more beacon UID data, then the temporary queue departure process 800 returns to the step at which the mobile device or wearable device sends (at 810) the beacon UID to the server, and proceeds accordingly.

On the other hand, when more beacon UID data packets are not received, then the temporary queue departure process 800 sets a temporary exit timer (at 840). In some embodiments, when there is a gap in time in which no beacon UID data is received by the mobile device and forwarded to the server to confirm the sales representative's continued presence in the product display and sales engagement area associated with the sales rotation queue which the sales representative is presently enqueued, then a timer or countdown clock is set to allow the sales representative to make a temporary departure from the sales rotation queue without getting removed from the queue.

After setting the temporary exit timer, the temporary queue departure process 800 starts decrementing (at 845) the duration of time set for the temporary exit timer. For example, the duration of time can be decremented by counting down toward zero. Next, the temporary queue departure process 800 determines (at 850) whether the duration of time set for the temporary exit timer has expired. In some embodiments, the position of the sales representative in the sales rotation queue is maintained by the server so long as the temporary departure by the sales representative is less than an amount of time set for the timer or countdown clock. For example, if the temporary departure timer is set to a time duration of three minutes, then the mobile device of the sales representative would need to capture beacon UID data and forward the beacon UID data to the server within the three minute time duration in order to ensure that the position of the sales representative in the sales rotation queue is maintained. Thus, when the duration of time has not expired, then the temporary queue departure process 800 listens for the broadcast signal of the beacon device (at 855) to detect the beacon UID data. If the beacon UID data is detected in connection with a broadcast signal, then the mobile device of the sales representative would be affirmatively within the product display and sales engagement area of the corresponding sales rotation queue. Note that the mobile device of the sales representative could listen for and receive a broadcast signal from a different beacon device. For example, if the sales representative makes a temporary departure from the product display and sales engagement area of beacon device associated with the present sales rotation queue (in which the sales representative is enqueued), it is possible that the sales representative may wander through a different product display and sales engagement area that is related to a different beacon device that is broadcasting its own beacon UID data signal and is related to a different sales rotation queue. Further details of facilities that include multiple beacon devices or provide multiple geofenced configurations are described below, by reference to at least FIGS. 14, 19, and 20. Nevertheless, in such case, the beacon UID data needs to match the known beacon UID of the beacon device associated with the product display and sales engagement area of the corresponding sales rotation queue in which the sales representative is enqueued.

Thus, in some embodiments, the temporary queue departure process 800 determines (at 860) whether any matching beacon UID data is captured from any broadcast signals received by the mobile device or wearable device of the sales representative. When matching beacon UID data is not captured, then the temporary queue departure process 800 returns to the step for decrementing the temporary exit timer (at 845). On the other hand, when matching beacon UID data is affirmatively captured, then the temporary queue departure process 800 continues to the step at which the mobile device or wearable device sends the beacon UID data to the server (at 810) for checking to confirm that the sent beacon UID data matches the known beacon UID data associated with the beacon device located in the product display and sales engagement area that corresponds to the sales rotation queue in which the sales representative is enqueued.

Turning back to the determination (at 850) of whether the duration of time set for the temporary exit timer has expired, when the duration of time has been completely counted down to zero and the temporary exit timer has affirmatively expired, then the temporary queue departure process 800 sets (at 865) the queue status of the sales representative to "dequeued" and removes (at 870) the sales representative from the sales rotation queue related to the beacon device with the associated beacon UID. Then the temporary queue departure process 800 ends.

While not described in the temporary queue departure process 800, when a sales representative is removed from a sales rotation queue due to lapsed time on a temporary exit timer, the server re-organizes the sales rotation queue accordingly, moving each remaining sales representative below the position of the "dequeued" sales representative in the sales rotation queue up one position. In this way, the sales rotation queue is managed efficiently and effectively in ways that allow sales representatives some freedom to move about to and from the product display and sales engagement area of the corresponding sales rotation queue in which the sales representative is enqueued.

Figure 9:
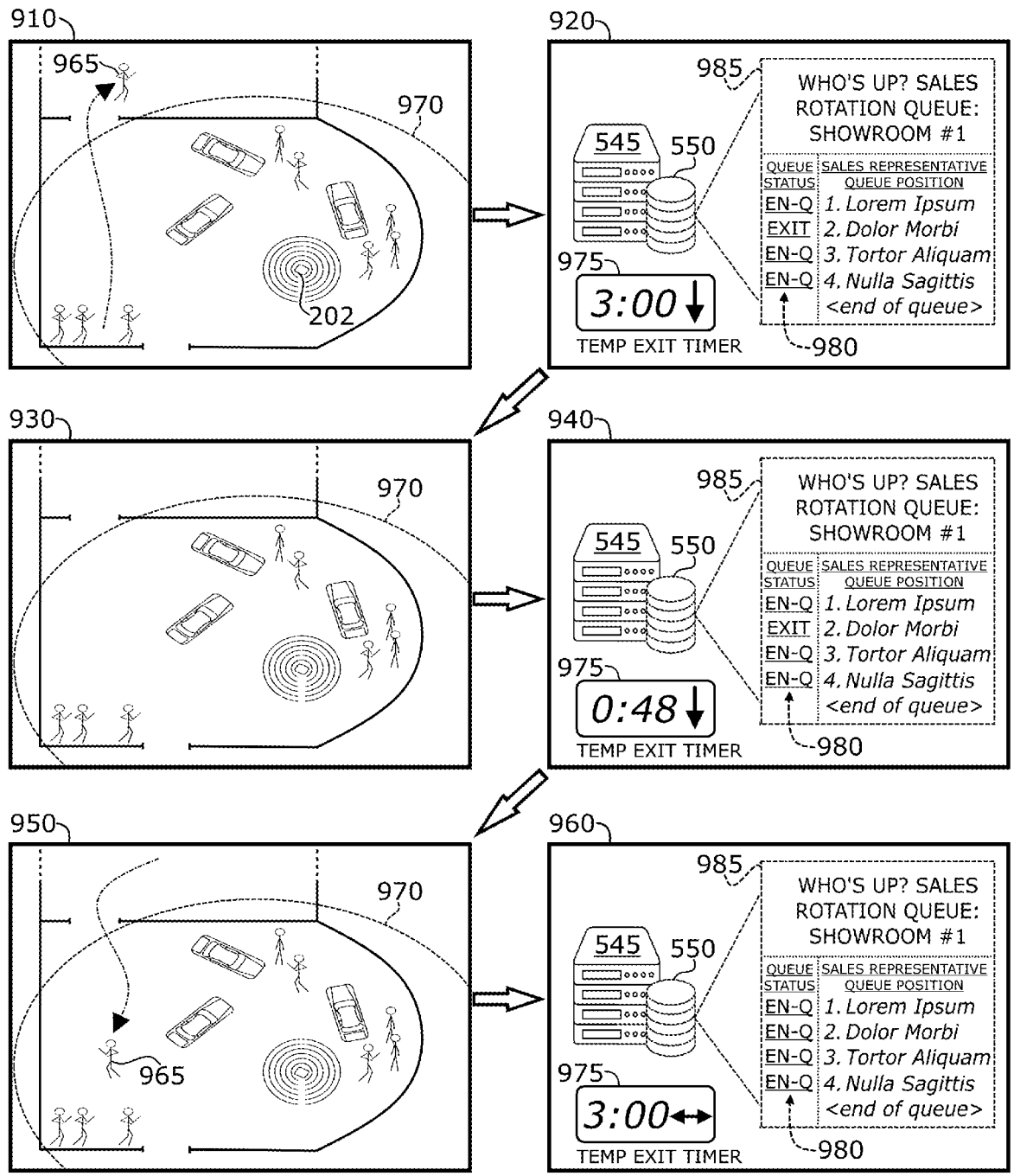
FIG. 9 conceptually illustrates a phase diagram with several temporary queue departure stages that demonstrate management of sales rotation queue order when a sales representative temporarily exits a wireless range of a beacon-enabled product display and sales engagement area associated with a sales rotation queue in some embodiments.

By way of another temporary departure example, FIG. 9 conceptually illustrates a phase diagram with several temporary queue departure stages that demonstrate management of sales rotation queue order when a sales representative temporarily exits a wireless range of a beacon-enabled product display and sales engagement area associated with a sales rotation queue.

As shown in this figure, the temporary queue departure stages that demonstrate management of sales rotation queue order when a sales representative temporarily exits a beacon-enabled product display and sales engagement area associated with a sales rotation queue include a first stage 910 in which a particular sales representative in a sales rotation queue walks past the range of the beacon-enabled product display and sales engagement area, a second stage 920 in which a temporary exit timer is started and a queue status of the particular sales representative in an ordered sales rotation queue list is set to "exit", a third stage 930 in which the particular sales representative has not returned to the product display and sales engagement area, a fourth stage 940 in which the temporary exit timer continues to count down the available time for the temporary departure and the queue status of the particular sales representative remains set to "exit", a fifth stage 950 in which the particular sales representative returns to the product display and sales engagement area, and a sixth stage 960 in which the temporary exit timer is stopped and reset and the queue status of the particular sales representative is set back to "enqueued".

Specifically, during the first stage 910, a particular sales representative 965 walks past the range of a beacon-enabled product display and sales engagement area 970. The particular sales representative 965 may be walking to another showroom or a back lot of the dealership, in which there may or may not be another beacon device or geofencing established for a second product display and sales engagement area of the dealership, or the particular sales representative 965 may be leaving the entire dealership facility to go to lunch or otherwise exit the premises. Whatever the reason for the particular sales representative 965 leaving the beacon-enabled product display and sales engagement area 970, the sales rotation system neither knows nor cares. At this first stage 910, at least, all the matters is that the departure of the particular sales representative 965 from the beacon-enabled product display and sales engagement area 970 is detected.

Next, as shown in the second stage 920, the departure of the particular sales representative 965 from the beacon-enabled product display and sales engagement area 970 is affirmatively detected, as demonstrated by the temporary exit timer 975 set with three minutes to allow the particular sales representative 965 to return to the beacon-enabled product display and sales engagement area 970 without losing his or her queue position. The particular sales representative 965 currently is listed as being in the second position of the sales rotation queue, as shown in the status ordered sales rotation queue list 985 (as retrieved by the server 545 by accessing the database 550), with a status indicator 980 provided in the details.

During the third stage 930, the particular sales representative 965 does not return to the beacon-enabled product display and sales engagement area 970.

As shown in the fourth stage 940, the temporary exit timer 975 continues to count down the time (only 48 second remaining for the particular sales representative 965 to return to the beacon-enabled product display and sales engagement area 970).

In the fifth stage 950, the particular sales representative 965 has returned to the beacon-enabled product display and sales engagement area 970. With 48 seconds remaining on the temporary exit timer 975, the particular sales representative 965 will be able to return to the sales rotation queue in the second position.

This is shown in the sixth stage 960, in which the temporary exit timer 975 is stopped and reset and the status indicator 980 in the status ordered sales rotation queue list 985 is updated to "enqueued" status for the particular sales representative 965 at the second position in the sales rotation queue.

Figure 10:
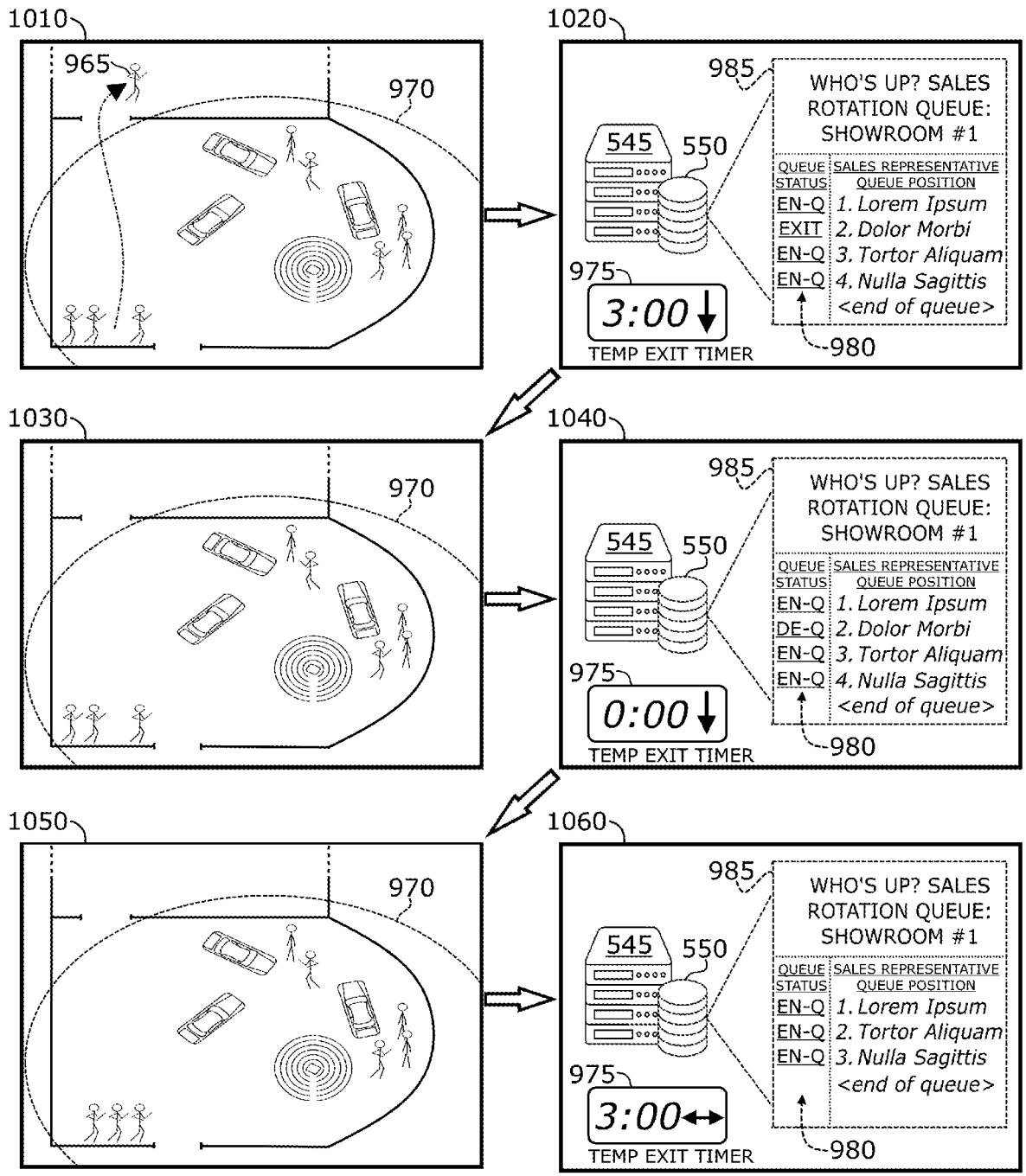
FIG. 10 conceptually illustrates another phase diagram with several queue departure stages that demonstrate management of sales rotation queue order when a sales representative exits a wireless range of a beacon-enabled product display and sales engagement area associated with a sales rotation queue for a duration of time that exceeds a threshold time for temporary exit in some embodiments.

Now turning to another exit timer example, FIG. 10 conceptually illustrates another phase diagram with several queue departure stages that demonstrate management of sales rotation queue order when a sales representative exits a wireless range of a beacon-enabled product display and sales engagement area associated with a sales rotation queue for a duration of time that exceeds a threshold time for temporary exit.

As shown in this figure, the queue departure stages that demonstrate management of sales rotation queue order when a sales representative exits a beacon-enabled product display and sales engagement area associated with a sales rotation queue for a duration of time that exceeds a threshold time for temporary exit include a first stage 1010 in which a particular sales representative in a sales rotation queue walks past the range of the beacon-enabled product display and sales engagement area, a second stage 1020 in which a temporary exit timer is started and a queue status of the particular sales representative in an ordered sales rotation queue list is set to "exit", a third stage 1030 in which the particular sales representative has not returned to the product display and sales engagement area, a fourth stage 1040 in which the temporary exit timer has counted down all of the allocated time for the temporary departure and the queue status of the particular sales representative is changed to "dequeued", a fifth stage 1050 in which the particular sales representative remains absent from the product display and sales engagement area, and a sixth stage 1060 in which the temporary exit timer is stopped and reset and the particular sales representative is removed entirely from the ordered sales rotation queue list.

As shown in the first stage 1010, the particular sales representative 965 walks past the range of a beacon-enabled product display and sales engagement area 970. While the product display and sales engagement area 970 in this figure and as described above by reference to FIG. 9 is associated with a beacon device, it shall be understood that a geofencing configuration would allow for the same functionality in terms of temporary departures, with the only difference being that the mobile device or the wearable device of the particular sales representative would send a notification to the server when the particular sales representative 965 walks beyond the defined geofence area, as is possible via GPS being enabled on the mobile device or the wearable device of the particular sales representative 965.

In the second stage 1020 and upon detecting the departure by the particular sales representative 965 from the product display and sales engagement area 970, the server would summarily set and start the temporary exit timer 975. In this example, the permissible amount of time to depart the product display and sales engagement area 970 is set for three minutes. However, the amount of time is configurable such that an administrator can change the time for the temporary exit timer 975 to a greater or lesser amount of time.

In the third stage 1030, the particular sales representative 965 has not returned to the beacon-enabled product display and sales engagement area 970. Accordingly, the amount of time available on the temporary exit timer 975 continues to decrease.

Now in the fourth stage 1040, the amount of remaining time for the temporary exit timer 975 has expired. Since the particular sales representative 965 has not returned to the beacon-enabled product display and sales engagement area 970 during the permissible time for temporary departure, the queue status 980 of the particular sales representative 965 is set to "dequeued" in the status ordered sales rotation queue list 985.

As shown in the fifth stage 1050, the particular sales representative 965 has not returned to the product display and sales engagement area 970. As such, the other sales representatives in the sales rotation queue file in line to take the position of the particular sales representative 965, who loses his or her position in the sales rotation queue due to the time lapse.

During the sixth stage 1060, the temporary exit timer 975 is stopped and reset and the status ordered sales rotation queue list 985 is updated with a new order for the remaining sales representatives in the sales rotation queue, and with the particular sales representative 965 removed entirely from the list.

IV. Multiple Product Display and Sales Engagement Areas with Beacon Devices and/or Geofencing In each example described above, a single product display and sales engagement area (e.g., showroom, dealership floor, dealership lot, etc.) is indicated to demonstrate one or more features of the sales rotation system and associated processes. However, it is possible, if not likely, that many dealerships and other entities deploying a sales rotation system will have multiple product display and sales engagement areas in which multiple sales rotation queues are formed and need efficient and effective management. The embodiments of the sales rotation system and processes described in this specification fully support configurations with multiple product display and sales engagement areas. In some embodiments, additional functions and features are provided to more effectively and efficiently manage customer engagement with a plurality of sales representatives that are spread over multiple sales rotation queues in product display and sales engagement areas that are defined by the wireless ranges of beacon devices or are defined by geofencing, or which include both beacon and geofence-based perimeter-defined product display and sales engagement areas.

An example of a dealership that supports two product display and sales engagement areas is described next by reference to FIG. 11. Specifically, FIG. 11 conceptually illustrates a top plan view of an automobile dealership 1100 with a plurality of beacon-enabled product display and sales engagement areas served by two separate sales rotation queues. As a preliminary note, many of the elements shown in this figure are similar to like elements shown in and described by reference to FIGS. 2 and 3. Therefore, for the sake of clarity and so as to not obscure features present in this figure, many reference characters are not included, but are referred back to those reference characters used in relation to FIG. 2 or 3, as well as other such figures described in this specification.

Figure 11:
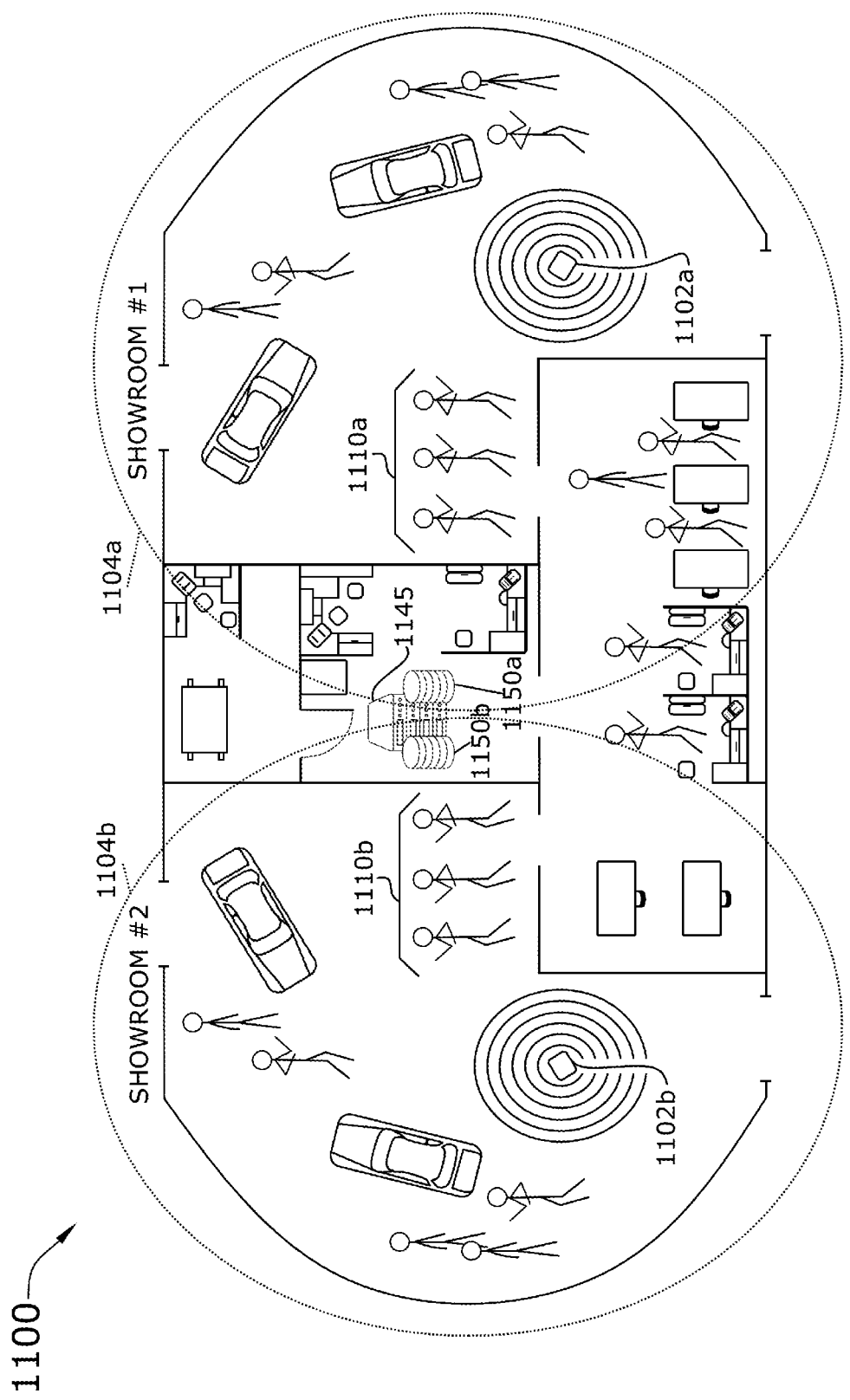
FIG. 11 conceptually illustrates a top plan view of an automobile dealership with a plurality of beacon-enabled product display and sales engagement areas served by two separate sales rotation queues in some embodiments.

Now in relation to FIG. 11, the automobile dealership 1100 shown in this figure includes two automobile showrooms, namely "SHOWROOM #1" and "SHOWROOM #2". Each showroom includes a beacon device, with "SHOWROOM #1" having beacon device 1102a and "SHOWROOM #2" having beacon device 1102b. It would be similarly possible to define a perimeter around each showroom by geofencing. However, for this example, the beacon implementation is described with the understanding that the features and functions are largely similar in relation to the spatial area technology used to create a product display and sales engagement area.

In connection with "SHOWROOM #1", the beacon device 1102a has a wireless range shown by beacon range boundary 1104a. Similarly, the beacon device 1102b in "SHOWROOM #2" has a wireless range shown by beacon range boundary 1104b. Accordingly, the beacon range boundary 1104a overlaps the product display and sales engagement area for "SHOWROOM #1" which is served by a sales rotation queue 1110a. The sales rotation queue 1110a includes a plurality of sales representatives waiting in "SHOWROOM #1" for new prospective walk-up customers. Likewise, the beacon range boundary 1104b overlaps the product display and sales engagement area for "SHOWROOM #2" which is served by a sales rotation queue 1110b. The sales rotation queue 1110b includes a plurality of sales representatives waiting in "SHOWROOM #2" for new prospective walk-up customers.

Between "SHOWROOM #1" and "SHOWROOM #2" is a server room with a sales rotation system server 1145, a first database 1150a, and a second database 1150b. The sales rotation system server 1145 manages the sales rotation queue 1110a in "SHOWROOM #1" and the sales rotation queue 1110b in "SHOWROOM #2". In connection with managing the sales rotation queues, the sales rotation system server 1145 stores, updates, and maintains ordered sales rotation queue lists for the sales rotation queues 1110a and 1110b in separate databases, namely, database 1150a and 1150b, respectively. While this example demonstrates storage of separate sales rotation queue lists in separate databases, in some embodiments, the sales rotation system includes only a single database that stores separate sales rotation queue lists for separate sales rotation queues in separate product display and sales engagement areas. In addition, some embodiments of the sales rotation system also store a master sales rotation queue list that meshes separate sales rotation queues associated with physically distinct product display and sales engagement areas. For purposes of this example, and other examples to follow, the separate databases 1150a and 1150b can be understood as being physically separate storage databases and storage hardware devices or can be understand as being logically separate databases in a single storage hardware device that is either encapsulated in a single physical device or spread over multiple physical devices and encapsulated in a single virtual device.

In some embodiments, the temporary queue departure process 800 (described above by reference to FIG. 8) for managing sales rotation queue order when a sale representative temporarily exits a product display and sales engagement area associated with the sales rotation queue is performed in auto dealerships (or, alternatively, furniture dealerships, etc.) in which there are multiple product display and sales engagement areas. In such scenarios, the temporary queue departure process is a multi-zone temporary queue departure process for managing sales rotation queue order when a sale representative temporarily exits a product display and sales engagement area associated with the sales rotation queue comprising (i) detecting when a mobile device receives different beacon UID signals, (ii) determining, in response to receiving different beacon UID signals, whether a sales representative using the mobile device joins a different sales rotation queue associated with a different product display and sales engagement area, (iii) setting a temporary exit timer when the mobile device stops receiving beacon UID signals and has not joined the different sales rotation queue associated with the different product display and sales engagement area, (iv) counting down the time of the temporary exit timer while listening for beacon UID signals, (v) determining whether any beacon UID signals are received before time expires, (vi) setting a queue status of the sales representative to de-queued when one of a new sales rotation queue is joined by the sales representative and time expires without receiving any beacon UID signals, and (vii) removing the sales representative from the sales rotation queue associated with the beacon UID when the sales representative is de-queued.

Figure 12:
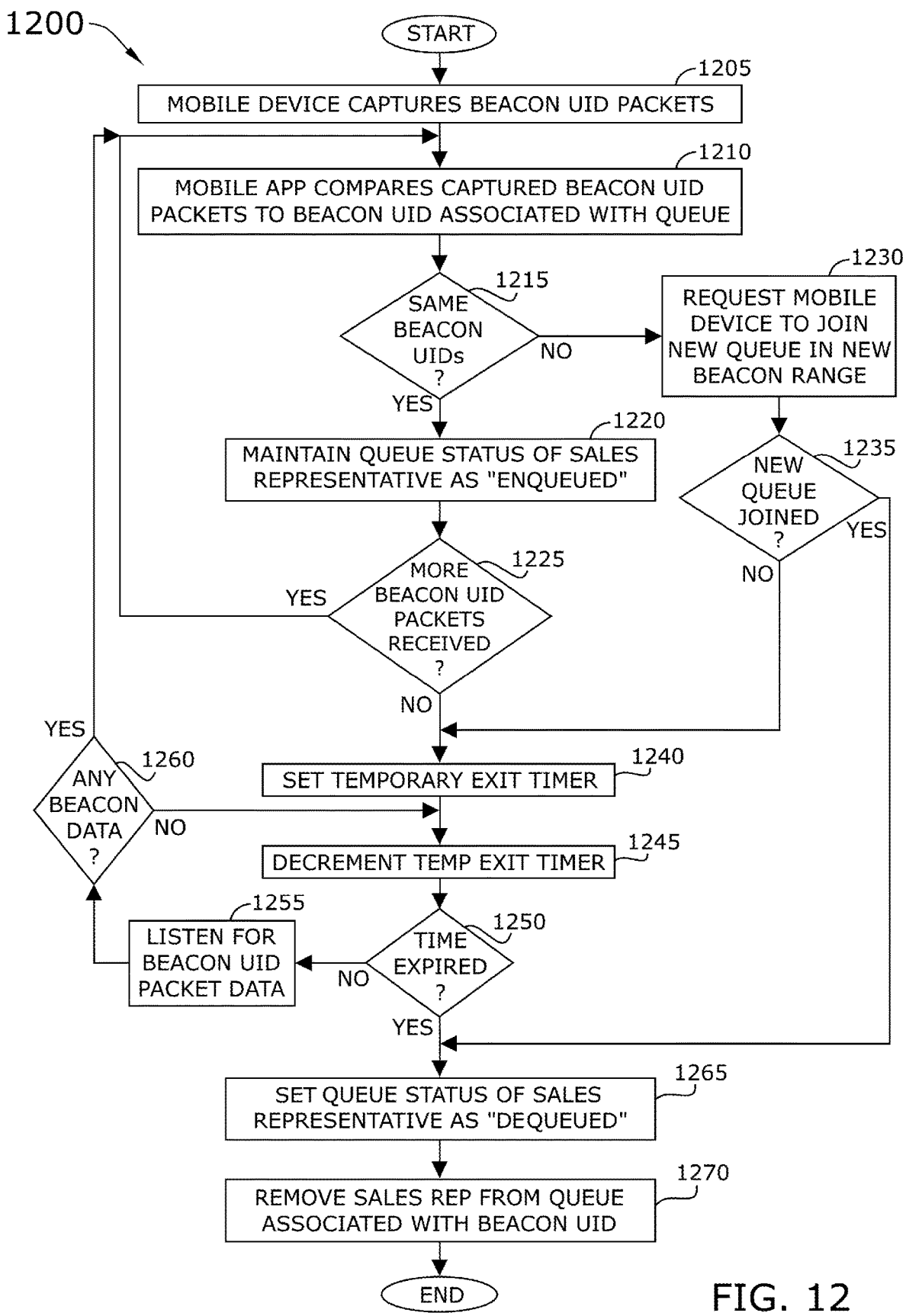
FIG. 12 conceptually illustrates a multi-zone temporary queue departure process for managing sales rotation queue order when a sale representative temporarily exits a physical area associated with the sales rotation queue in a multi-zone facility in some embodiments.

By way of example, FIG. 12 conceptually illustrates a multi-zone temporary queue departure process 1200 for managing sales rotation queue order when a sale representative temporarily exits a physical area associated with the sales rotation queue. As shown in this figure, the multi-zone temporary queue departure process 1200 starts with a mobile device or wearable device of a sales representative detecting a broadcast signal from a beacon device in a product display and sales engagement area and capturing (at 1205) the beacon UID packet data from the detected broadcast signal.

In some embodiments, the multi-zone temporary queue departure process 1200 proceeds to the next step in which the mobile app running on the mobile device compares (at 1210) the captured beacon UID data to a stored (known) beacon UID associated with the sales rotation queue. Specifically, the comparison in some embodiments is accomplished by the mobile app transmitting the beacon UID data to the server for comparison, and receiving a response from the server as to whether or not the captured beacon UID matches the stored and known beacon UID of the beacon device of the product display and sales engagement area and the corresponding sales rotation queue in which the sales representative is enqueued.

In some embodiments, the multi-zone temporary queue departure process 1200 then determines (at 1215) whether the beacon UID data sent to the server is the same as the stored/known beacon UID for the present sales rotation queue of which the sales representative is a member. Whether the sales representative is a member of a sales rotation queue associated with the present product display and sales engagement area (associated with the compared beacon UID data) or not is determined by the beacon UID data because the mobile device of the sales representative will receive beacon UID data when walking through other product display and sales engagement areas in which the sales representative is not enqueued in the corresponding sales rotation queue. In other words, it is possible for the sales representative to receive beacon signals in areas the sales representative may be interested in joining the corresponding sales rotation queues. Accordingly, the determination (at 1215) is made after the mobile app running on the mobile device of the sales representative sends the beacon UID to the server of the sales rotation system and receives back either a confirmation that the captured beacon UID data is the same as the stored/known beacon UID for the sales representative and the present sales rotation queue, or is different, and therefore, may allow the sales representative to join the sales rotation queue of the different product display and sales engagement area associated with the beacon device that is broadcasting the different beacon UID data packets.

When the beacon UID does not match with the stored beacon UID by the server's comparison, then the sales representative is not in the sales rotation queue of the present product display and sales engagement area. In some embodiments, the multi-zone temporary queue departure process 1200 thereafter requests (at 1230) the sales representative to join this different sales rotation queue via pushing a prompt request to the mobile device by the server. Then the multi-zone temporary queue departure process 1200 determines (at 1235) whether the sales representative has joined the new sales rotation queue. When the sales representative has not joined the new sales rotation queue, then the multi-zone temporary queue departure process 1200 transitions to a step in which a temporary exit timer is set (at 1240). On the other hand, when the sales representative joins the new sales rotation queue, then the multi-zone temporary queue departure process 1200 transitions to a step in which the queue status of the sales representative (in relation to the prior sales rotation queue) is set to "dequeued" (at 1265) and summarily removes the sales representative from the prior sales rotation queue associated with the expected beacon UID data, and thereafter ends.

Turning back to the determination (at 1215) of whether the sales representative is in the same sales rotation queue for the same product display and sales engagement area (as defined by the beacon device signal range), when the sales representative is affirmatively in the same sales rotation queue for the same product display and sales engagement area, as checked and confirmed by the server comparing the beacon UID data to the known/existing beacon UID data of the beacon device in the same product display and sales engagement area, then the multi-zone temporary queue departure process 1200 continues forward to maintain (at 1220) the queue status of the sales representative as "enqueued" in the sales rotation queue of the same product display and sales engagement area.

Next, the multi-zone temporary queue departure process 1200 determines (at 1225) whether more beacon UID data packets are received by the mobile device or wearable device of the sales representative. When the mobile device or wearable device of the sales representative receives more beacon UID data, then the multi-zone temporary queue departure process 1200 returns to the step at which the mobile device or wearable device compares (at 1210) the beacon UID to the beacon UID associated with the sales rotation queue by sending the beacon UID data to the server and waiting for the server's comparison results, and proceeds accordingly.

On the other hand, when more beacon UID data packets are not received, then the multi-zone temporary queue departure process 1200 sets a temporary exit timer (at 1240). In some embodiments, when there is a gap in time in which no beacon UID data is received by the mobile device or wearable device and forwarded to the server to confirm the sales representative's continued presence in the product display and sales engagement area associated with the sales rotation queue which the sales representative is presently enqueued, then a timer or countdown clock is set to allow the sales representative to make a temporary departure from the sales rotation queue without getting removed from the sales rotation queue.

After setting the temporary exit timer, the multi-zone temporary queue departure process 1200 starts decrementing (at 1245) the duration of time set for the temporary exit timer. For example, the duration of time can be decremented by counting down toward zero. Next, the multi-zone temporary queue departure process 1200 determines (at 1250) whether the duration of time set for the temporary exit timer has expired. In some embodiments, the position of the sales representative in the sales rotation queue is maintained by the server so long as the temporary departure by the sales representative is less than an amount of time set for the timer or countdown clock. Thus, when the duration of time has not expired, then the multi-zone temporary queue departure process 1200 listens for the broadcast signal of the beacon device (at 1255) to detect the beacon UID data. If the beacon UID data is detected in connection with a broadcast signal, then the mobile device of the sales representative would be affirmatively within the product display and sales engagement area of the corresponding sales rotation queue.

In some embodiments, the multi-zone temporary queue departure process 1200 determines (at 1260) whether any matching beacon UID data is captured from any broadcast signals received by the mobile device or wearable device of the sales representative. When matching beacon UID data is not captured, then the multi-zone temporary queue departure process 1200 returns to the step for decrementing the temporary exit timer (at 1245). On the other hand, when matching beacon UID data is affirmatively captured, then the multi-zone temporary queue departure process 1200 continues to the step at which the mobile device sends the beacon UID data to the server (at 1210) for checking to confirm that the sent beacon UID data matches the known beacon UID data associated with the beacon device located in the product display and sales engagement area that corresponds to the sales rotation queue in which the sales representative is enqueued.

Turning back to the determination (at 1250) of whether the duration of time set for the temporary exit timer has expired, when the duration of time has been completely counted down to zero and the temporary exit timer has affirmatively expired, then the multi-zone temporary queue departure process 1200 sets (at 1265) the queue status of the sales representative to "dequeued" and removes (at 1270) the sales representative from the sales rotation queue related to the beacon device with the associated beacon UID. Then the multi-zone temporary queue departure process 1200 ends.

While not described in the multi-zone temporary queue departure process 1200, when a sales representative is removed from a sales rotation queue due to lapsed time on a temporary exit timer, the server re-organizes the sales rotation queue accordingly, moving each remaining sales representative below the position of the "dequeued" sales representative in the sales rotation queue up one position. In this way, the sales rotation queue is managed efficiently and effectively in ways that allow sales representatives some freedom to move about to and from the product display and sales engagement area of the corresponding sales rotation queue in which the sales representative is enqueued. Additionally, in some embodiments of the sales rotation system, a master sales rotation queue list is stored that meshes separate sales rotation queues associated with physically distinct product display and sales engagement areas, and the master sales rotation queue list is re-organized accordingly. For example, a sales representative in position two of a first ordered sales rotation queue list may depart a corresponding first product display and sales engagement area to enter a different second product display and sales engagement area that is configured as a meshed product display and sales engagement area along with the first product display and sales engagement area. In this scenario, the sales rotation system may re-organize the first product display and sales engagement area and the second product display and sales engagement area in relation to the sales representative's relative positions in each product display and sales engagement area, but may ultimately maintain the position of the sales representative in the master sales rotation queue list for the meshed combination of sales representatives in the sales rotation queues for the first and second product display and sales engagement areas. Additional details about meshed product display and sales engagement areas and multi-zone facilities are described further below.

Figure 13:
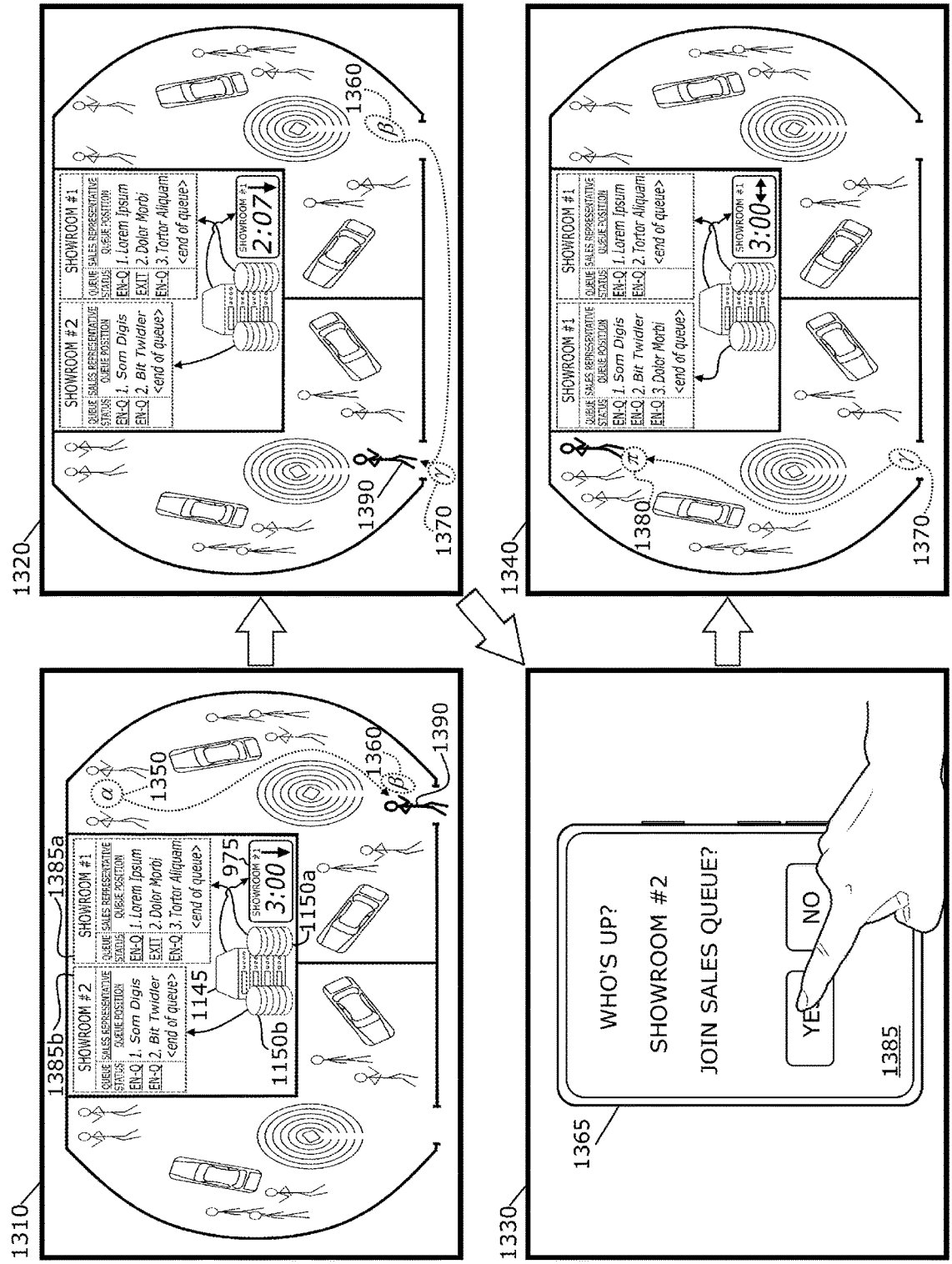
FIG. 13 conceptually illustrates a multi-zone sales representative departure phase diagram with several multi-zone departure stages that demonstrate managing sales rotation queue order when a sales representative changes from a first sales rotation queue associated with a first product display and sales engagement area to a second sales rotation queue associated with a second product display and sales engagement area in a multi-zone facility in some embodiments.

Now turning to another multi-zone example, FIG. 13 conceptually illustrates a multi-zone sales representative departure phase diagram with several multi-zone departure stages that demonstrate managing sales rotation queue order when a sales representative changes from a first sales rotation queue associated with a first product display and sales engagement area to a second sales rotation queue associated with a second product display and sales engagement area in a multi-zone facility.

As shown in this figure, the multi-zone departure stages that demonstrate managing sales rotation queue order when a sales representative changes from a first sales rotation queue associated with a first product display and sales engagement area to a second sales rotation queue associated with a second product display and sales engagement area in a multi-zone facility include a first multi-zone departure stage 1310, a second multi-zone departure stage 1320, a third multi-zone departure stage 1330, and a fourth multi-zone departure stage 1340.

During the first multi-zone departure stage 1310, a particular sales representative 1390 in a sales rotation queue departs a first position "alpha" (or symbolically, "α") 1350 located in a first beacon-enabled product display and sales engagement area and arrives at a second position "beta" (or symbolically "β") 1360 just at the outskirts of the first beacon-enabled product display and sales engagement area. A temporary exit timer 975 is started while a queue status of the particular sales representative 1390 in a first multi-zone sales rotation queue list 1385*a* retrieved by a sales rotation system server 1145 from a first database 1150*a* is set to "exit". The first multi-zone departure stage 1310 also includes a second database 1150*b* which stores a second multi-zone sales rotation queue list 1385*b* in connection with a sales rotation queue in a second beacon-enabled product display and sales engagement area.

During the second multi-zone departure stage 1320, the particular sales representative 1390 is shown as having walked over to a third position "gamma" (or symbolically "γ") 1370 in the second beacon-enabled product display and sales engagement area. The temporary exit timer 975 has started to count down from the three minutes allocated for temporary departure from the first beacon-enabled product display and sales engagement area (now showing 2:07 remaining time). Since the amount of time allocated for permissible temporary departure has not expired, the queue status of the particular sales representative 1390 remains set to "exit" in the first multi-zone sales rotation queue list 1385*a*.

During the third multi-zone departure stage 1330, however, the mobile app running on the mobile device 1365 of the particular sales representative 1390 visually outputs a multi-zone queue join request user interface 1385 in response to a push notification received from the sales rotation system server 1145 instructing the mobile app to request the user (the particular sales representative 1390) to join the sales rotation queue in a second showroom associated with the second beacon-enabled product display and sales engagement area. The particular sales representative in this example selections the "YES" button to join the sales rotation queue in the second beacon-enabled product display and sales engagement area.

Finally, during the fourth multi-zone departure stage 1340, the particular sales representative 1390 moves from the third position "gamma" (or symbolically "γ") to a fourth position "pi" (or symbolically "π"). Consequently, since the particular sales representative 1390 has joined the sales rotation queue in the second showroom associated with the second beacon-enabled product display and sales engagement area, the temporary exit timer 975 is stopped and reset while the particular sales representative 1390 is removed from the first multi-zone sales rotation queue list 1385*a* and added to the bottom of the second multi-zone sales rotation queue list 1385*b*.

V. Outdoor Geofenced Product Display and Sales Engagement Areas

Figure 14:
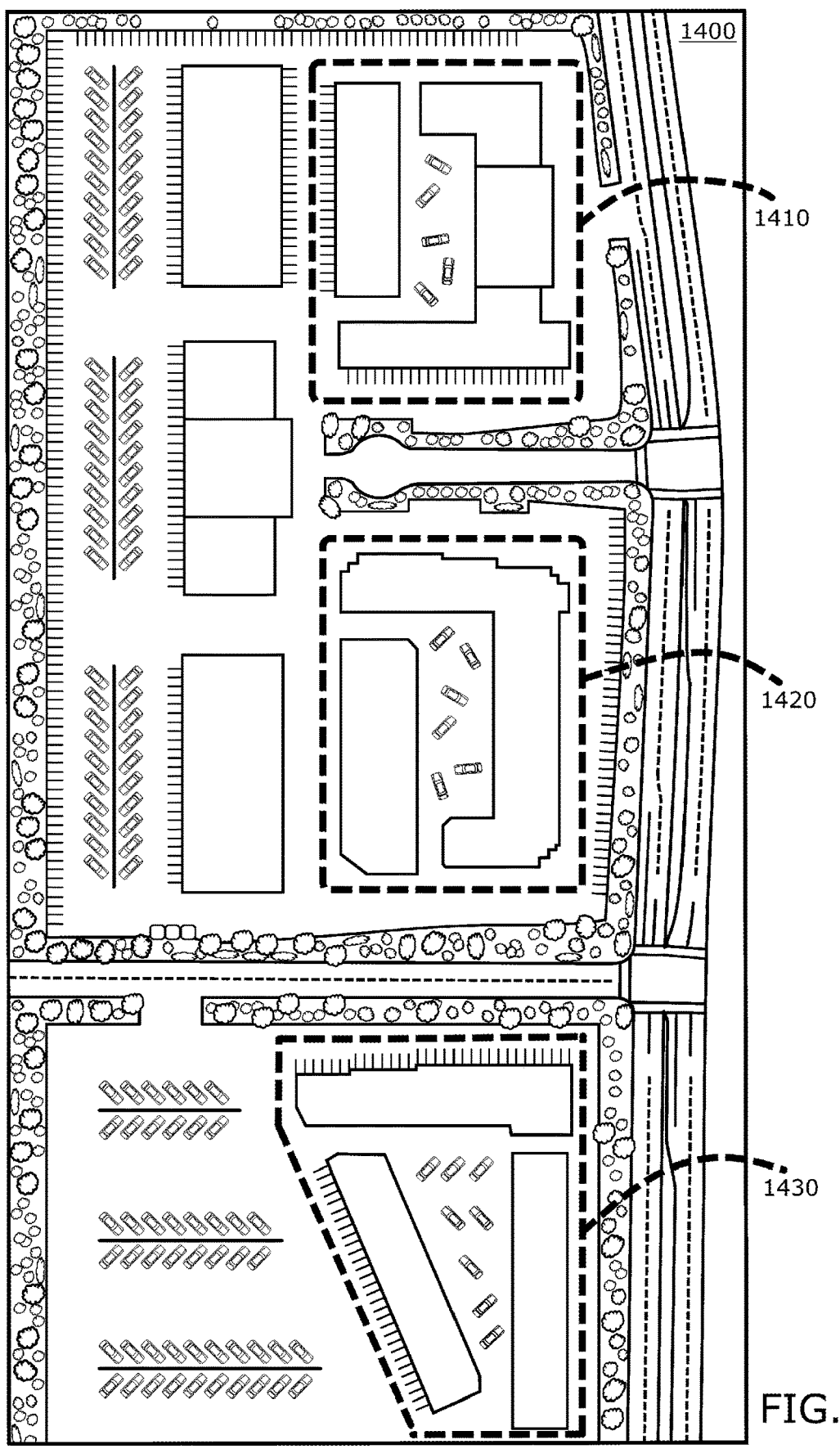
FIG. 14 conceptually illustrates a plurality of geofenced outdoor product display and sales engagement areas served by a plurality of sales rotation queues in some embodiments.

By way of example, FIG. 14 conceptually illustrates a plurality of geofenced outdoor product display and sales engagement areas defined in a physical area of a dealership 1400 served by a plurality of sales rotation queues. As shown in this figure, the plurality of geofenced outdoor product display and sales engagement areas include a first geofenced outdoor product display and sales engagement area 1410, a second geofenced outdoor product display and sales engagement area 1420, and a third geofenced outdoor product display and sales engagement area 1430. The first geofenced outdoor product display and sales engagement area 1410 is defined by a perimeter (dashed line) that surrounds two buildings and several showcase automobiles between the two buildings in an outdoor presentation area. The second geofenced outdoor product display and sales engagement area 1420 is also defined by a perimeter (dashed line) that surrounds two other buildings at the dealership 1400 and several other automobiles for display in an area between the buildings. The third geofenced outdoor product display and sales engagement area 1430 is located across a municipal street the bifurcates the dealership 1400 and is defined by the dashed line perimeter that surrounds three buildings even more automobiles to show potential customers. The dealership 1400 also includes several other buildings in which geofence areas are not defined, and several automobile lots with no geofencing perimeters defined. The other buildings (without geofenced perimeters defined) may include beacon devices located within showrooms or dealership floors in those buildings. Furthermore, the buildings that are encapsulated within the defined perimeters of any of the geofenced areas 1410, 1420, and 1430, may include beacons which would permit dual geospatial-enabled sales rotation queues, or which may work in conjunction with the geofenced perimeters to provide coverage for a particular sales rotation queue in a location where GPS location data is difficult or impossible to receive by a mobile device of a sales representative. As is described further below, a variety of configurations are possible when geofencing and beacon-enabled product display and sales engagement areas are configured and deployed, either separately or in combination. In particular, multiple geofenced and/or beacon-enabled product display and sales engagement areas can be meshed together and geofencing can be mixed with beacons, as mentioned above. In the next section, sales rotation queue management is described when a dealership configures multiple "meshed" product display and sales engagement areas.

VI. Sales Rotation Queue Management with Multi-Zone Meshing

Figure 15:
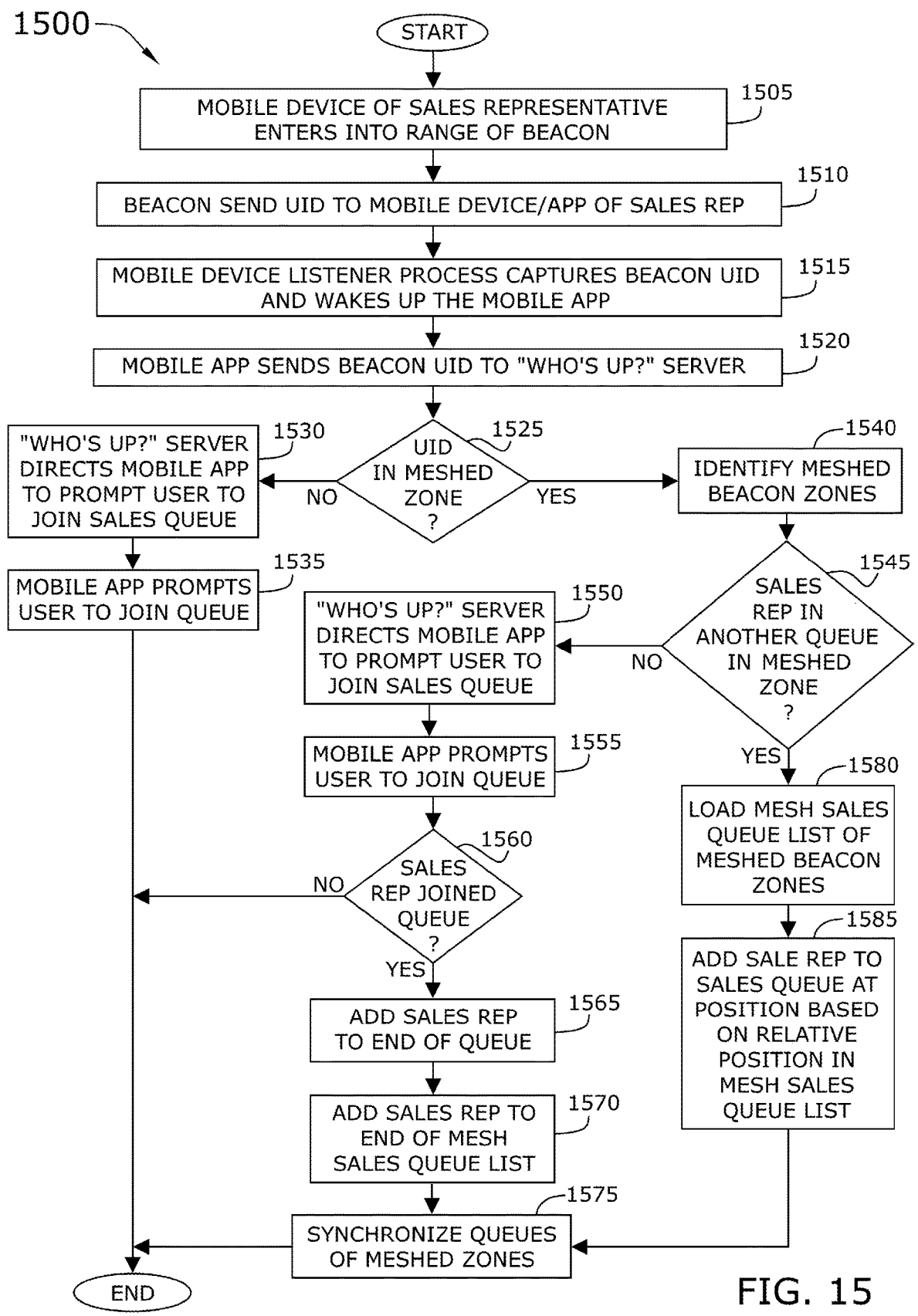
FIG. 15 conceptually illustrates a meshed-zones process for managing sales rotation queues in multiple meshed zones when adding a sales representative to a particular sales rotation queue in some embodiments.

By way of example, FIG. 15 conceptually illustrates a meshed-zone sales rotation queue management process 1500 for managing sales rotation queues in multiple meshed zones when adding a sales representative to a particular sales rotation queue. Detailed descriptions of at least some of the steps of the meshed-zone sales rotation queue management process 1500 are made by reference to FIG. 16, which conceptually illustrates a plurality of meshed and standalone beacon-enabled outdoor product display and sales engagement areas served by a plurality of sales rotation queues of a dealership 1600.

Starting first with FIG. 15, the meshed-zone sales rotation queue management process 1500 starts when a mobile device of a sales representative enters into the range of a beacon (at 1505). Again, as mentioned above, the beacon employs Bluetooth low energy technology to continually send wireless signals with its unique identification (UID) so that any mobile device with RF hardware (such as a Bluetooth receiver) will capture the signal when in the wireless range of the beacon. Thus, the meshed-zone sales rotation queue management process 1500 continues to the next step in which the beacon sends its UID (at 1510) as a broadcast signal which is able to be captured by the sales representative's mobile device with the mobile app installed. Next, a listener process on the sales representative's mobile device captures the beacon UID signal (at 1515) and wakes up the mobile app. After being awakened and upon receiving the beacon UID, which was broadcast by the beacon device and captured by the mobile device, the mobile app sends the beacon UID to the "Who's Up?" server (at 1520).

In some embodiments, the meshed-zone sales rotation queue management process 1500 then determines (at 1525) whether the beacon UID sent by the mobile app running on the sales rep's mobile device is serving a product display and sales engagement area that is meshed with one or more other product display and sales engagement areas. When the beacon UID is not associated with a meshed product display and sales engagement area, then the meshed-zone sales rotation queue management process 1500 continues to the next step whereby the "Who's Up?" server directs the mobile app on the sales rep's mobile device to prompt the sales rep user to join the sales rotation queue (at 1530), which corresponds to the present product display and sales engagement area (associated with the beacon UID). Then the mobile app running on the sales rep's mobile device prompts the user to join the sales rotation queue (at 1535). Then the meshed-zone sales rotation queue management process 1500 ends. Although the meshed-zone sales rotation queue management process 1500 ends, the activity related to the sales representative joining the sales rotation queue continues in a manner described above, by reference to FIG. 1. However, including the steps of the process for adding a sales representative to a sales rotation queue 100, as described above by FIG. 1, is redundant and would obscure the present details about adding a sales representative to a sales rotation queue when there is a meshed zone situation. Therefore, even though the present meshed-zone sales rotation queue management process 1500 ends after step 1535 when the sales representative is not in a meshed zone, reference is made back to FIG. 1 for further description of such steps.

Now turning back to the determination (at 1525), when the beacon UID is affirmatively associated with a meshed product display and sales engagement area, then the meshed-zone sales rotation queue management process 1500 identifies (at 1540) the meshed beacon zones (that is, the meshed product display and sales engagement areas).

Figure 16:
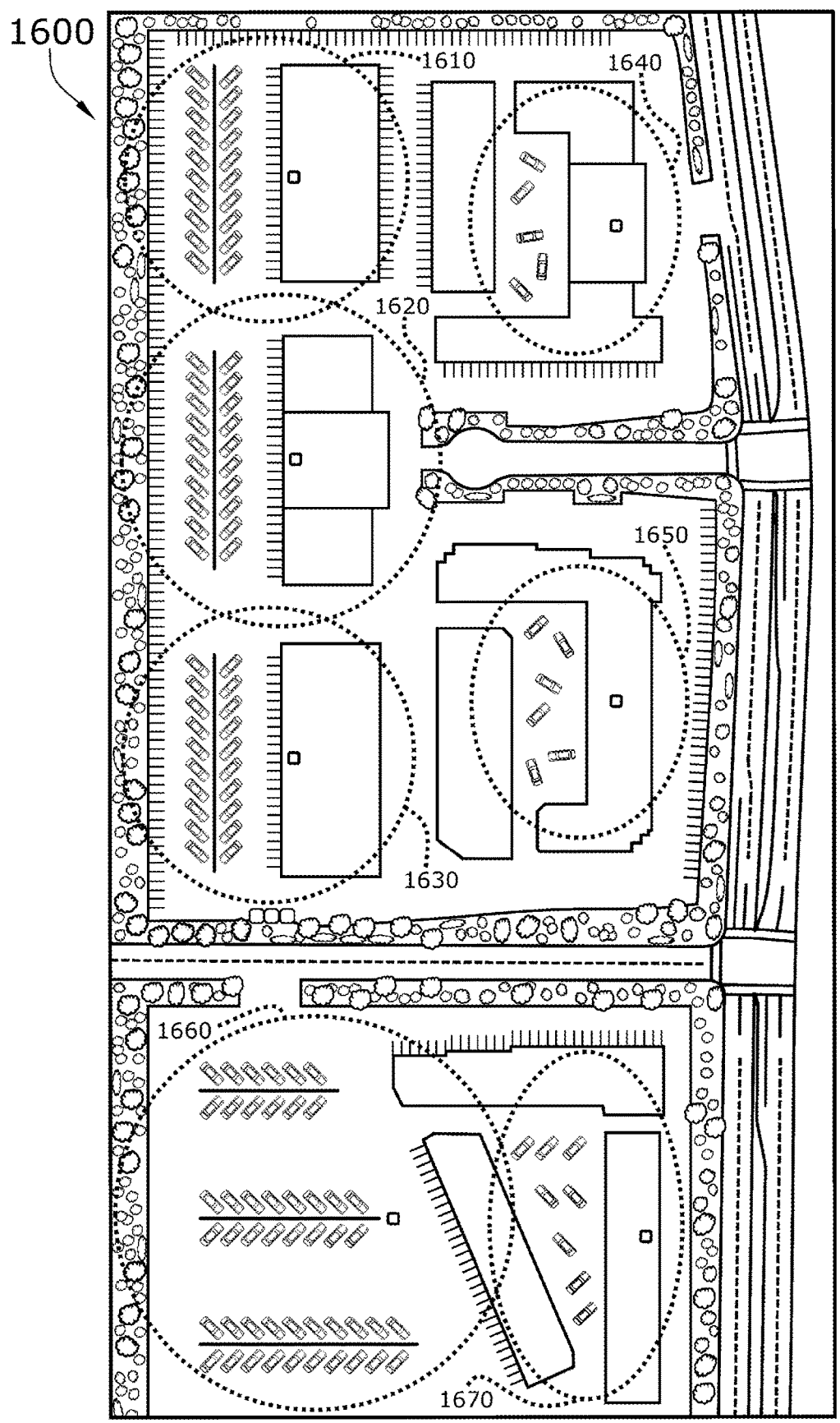
FIG. 16 conceptually illustrates a plurality of meshed and standalone beacon-enabled outdoor product display and sales engagement areas served by a plurality of sales rotation queues in some embodiments.

Turning to FIG. 16, which conceptually illustrates a plurality of meshed and standalone beacon-enabled outdoor product display and sales engagement areas served by a plurality of sales rotation queues of a dealership 1600. As shown in this figure, the dealership 1600 includes several buildings (which may include indoor showrooms that are beacon-enabled product display and sales engagement areas) as well as several outdoor product display and sales engagement areas with corresponding wireless ranges (shown in this figure as dashed line enclosures—circles or ovals in this example—that demarcate the extent of each wireless range). Each wireless range of the product display and sales engagement areas encompasses multiple automobiles and one or more buildings (partially or completely). Specifically, the dealership 1600 includes a first product display and sales engagement area with a corresponding first wireless range 1610, a second product display and sales engagement area with a corresponding second wireless range 1620, a third product display and sales engagement area with a corresponding third wireless range 1630, a fourth product display and sales engagement area with a corresponding fourth wireless range 1640, a fifth product display and sales engagement area with a corresponding fifth wireless range 1650, a sixth product display and sales engagement area with a corresponding sixth wireless range 1660, and a seventh product display and sales engagement area with a corresponding seventh wireless range 1670. The first-seventh wireless ranges 1610-1670 shown for this dealership 1600 vary in size and generally define the sizes of the first-seventh product display and sales engagement areas with which they correspond.

Generally, the fourth product display and sales engagement area and the fifth product display and sales engagement area have corresponding short wireless ranges (extending shorter distances than the wireless ranges that correspond to the other product display and sales engagement areas). In contrast, the wireless range corresponding to the first product display and sales engagement area 1610, the wireless range corresponding to second product display and sales engagement area 1620, the wireless range corresponding to third product display and sales engagement area 1630, and the wireless range corresponding to seventh product display and sales engagement area 1670 are medium sized ranges (extending more than the shorter distances of the short wireless ranges), while the wireless range corresponding to sixth product display and sales engagement area 1660 is the largest (with the wireless range extending farther than all of the other wireless ranges). The differences in the wireless ranges is due at least in part to the power and hardware capacity for broadcasting a beacon signal by each beacon device, although other factors may play into the wireless range of any particular beacon device.

Furthermore, some of the wireless ranges that correspond to product display and sales engagement areas overlap. Specifically, the second wireless range that corresponds to the second product display and sales engagement area overlaps with two other wireless ranges, namely, the first wireless range that corresponds to the first product display and sales engagement area 1610 and the third wireless range that corresponds to the third product display and sales engagement area 1630. Also, the sixth wireless range that corresponds to the sixth product display and sales engagement area 1660 overlaps with the seventh wireless range corresponding to the seventh product display and sales engagement area 1670. The overlapping wireless ranges in this example demonstrate meshed product display and sales engagement areas. Accordingly, the first, second, and third product display and sales engagement areas are meshed together in a way that the sales rotation queues which serve each individual area are managed as a meshed group by the back-end server. In this way, a sales representative present in the first product display and sales engagement area can move to the second or third product display and sales engagement area and be added into the individual sales rotation queue of the second or third product display and sales engagement area at a relative position that approximates a similar position the sales representative held in the sales rotation queue of the first product display and sales engagement area. Similarly, a sales representative in the sixth product display and sales engagement area can move to into the wireless range of the seventh product display and sales engagement area and be added to the sales rotation queue of the seventh product display and sales engagement area at a relative position that approximates the position the sales representative held in the sales rotation queue of the sixth product display and sales engagement area.

Although the example of 'meshed zones' presented in FIG. 16 is demonstrated by overlapping wireless ranges of corresponding product display and sales engagement areas, meshed zones are not defined by wireless ranges, but instead are defined and configured in the sales rotation queue management back-end server processes. In many cases, overlapping wireless ranges of separate product display and sales engagement areas allows for convenient and even logical meshing of the respective zones, but it is not an inherent requirement for defining meshed zones. For instance, the meshed zones shown in this figure demonstrate contiguous product display and sales engagement areas that are all present in a single surface, level, or floor. However, meshed zones can be defined and configured in other ways, such as non-contiguous meshed zones and meshed zones that include product display and sales engagement areas on different floors or levels (e.g., of a building or multi-level structure). Further details of meshed zones, including non-contiguous, multi-level, and mixed zones, are described below by reference to FIGS. 17-19.

Figure 21:
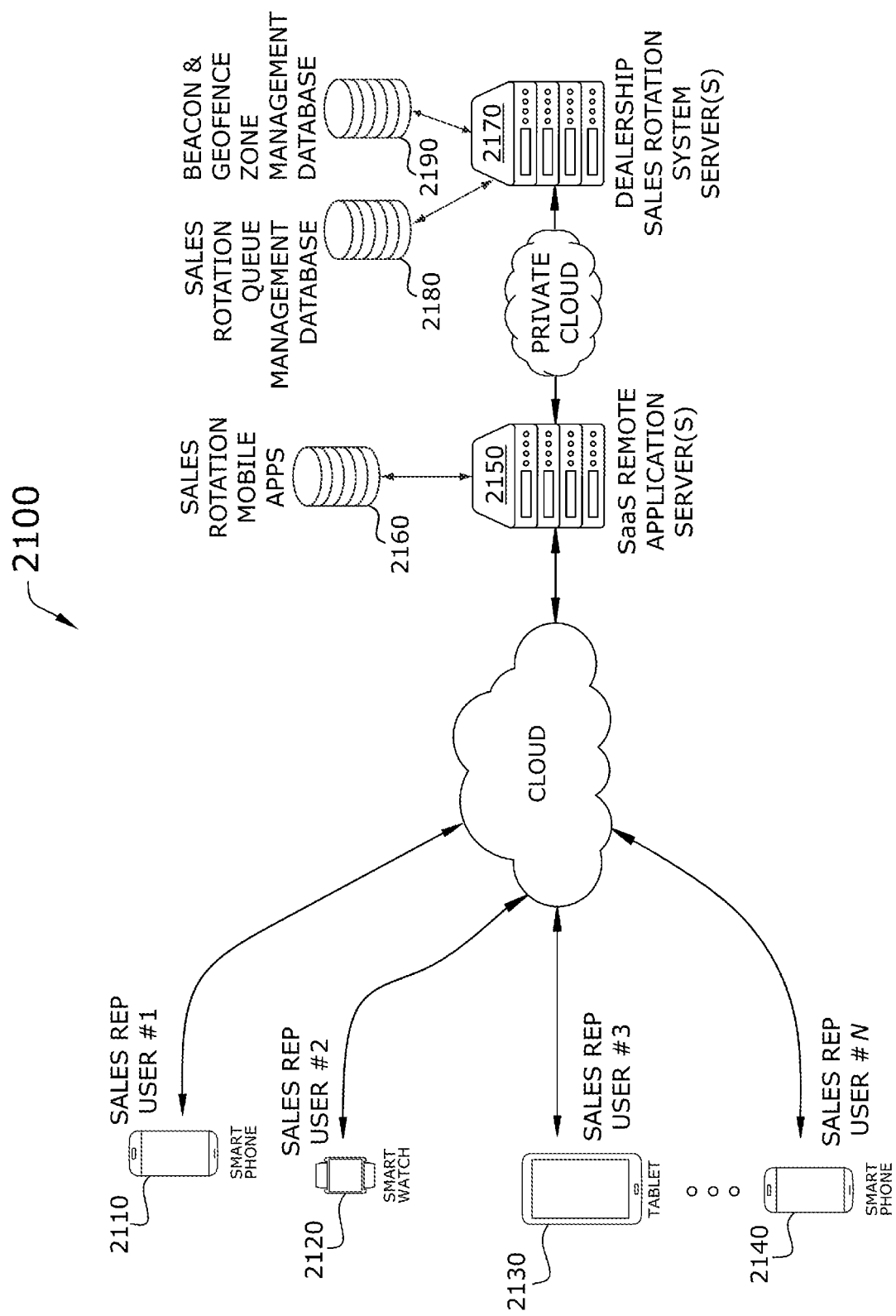
FIG. 21 conceptually illustrates a network architecture of a cloud-based multi-tenant sales rotation system that hosts a sales rotation queue management service in some embodiments.

Now turning back to FIG. 15, after determining, by checking the back-end service for product display and sales engagement area settings that are configured for meshed zones, that that UID of the beacon captured by the sales representative's mobile device/app is a beacon in a meshed zone, then the meshed-zone sales rotation queue management process 1500 identifies (at 1540) the meshed beacon zones. In some embodiments, the meshed-zone sales rotation queue management process 1500 identifies the meshed beacon zones by retrieving meshed zone records from a beacon & geofence zone management database. The beacon & geofence zone management database is further described below, by reference to FIGS. 21 and 22.

In some embodiments, after the meshed beacon zones are identified (at 1540), the meshed-zone sales rotation queue management process 1500 determines (at 1545) whether the sales representative is in another sales rotation queue of another product display and sales engagement area among the identified meshed zones. When the sales representative is determined (at 1545) to be in another sales rotation queue of another product display and sales engagement area among the identified meshed zones, then the meshed-zone sales rotation queue management process 1500 proceeds to load (at 1580) a mesh sales queue list of meshed beacon zones, which is described further below. On the other hand, when the sales representative is not in another sales rotation queue of another product display and sales engagement area among the identified meshed zones, then the meshed-zone sales rotation queue management process 1500 proceeds to the next step at which the "Who's Up?" back-end server directs the mobile app running on the sales representative's mobile device to prompt the sales rep user to join the sales rotation queue of the product display and sales engagement area served by the beacon which broadcast the beacon UID. Next, the mobile app of the sales representative's mobile device prompts the user to join the sales rotation queue (at 1555).

In some embodiments, the meshed-zone sales rotation queue management process 1500 then determines (at 1560) whether the sales representative joined the sales rotation queue. When the sales representative has not joined the sales rotation queue, the meshed-zone sales rotation queue management process 1500 ends. On the other hand, when the sales representative is determined (at 1560) to have joined the sales rotation queue, then the meshed-zone sales rotation queue management process 1500 adds (at 1564) the sales representative to the end of the sales rotation queue. The meshed-zone sales rotation queue management process 1500 also adds (at 1570) the sales representative to the end of the mesh sales queue list. Specifically, even though it has been determined that the sales representative was not in another sales rotation queue in among the identified meshed zones, the action of joining the present sales rotation queue automatically results in the sales representative being added to a queue for maintaining the relative approximate positions among the identified meshed zones, should the sales representative later move to another product display and sales engagement area among the identified meshed zones. After adding the sales representative to the end of the mesh sales queue list (at 1570), the meshed-zone sales rotation queue management process 1500 of some embodiments synchronizes (at 1575) the individual sales rotation queues of the identified meshed zones. Then the meshed-zone sales rotation queue management process 1500 ends.

Turning back to the step at which the meshed-zone sales rotation queue management process 1500 loads (at 1580) the mesh sales queue list of the meshed beacon zones, the key is to find the relative position of the sales representative in the overall queue which combines the sales rotation queues of the product display and sales engagement areas among the identified meshed zones. After identifying the relative position for the sales representative, the meshed-zone sales rotation queue management process 1500 adds (at 1585) the sales representative to the sales rotation queue associated with the beacon having the beacon UID. Specifically, the meshed-zone sales rotation queue management process 1500 adds the sales representative to the sales rotation queue at a position based on the relative position in the mesh sales queue list. For example, if a sales rep in a first position (next person up) of a first product display and sales engagement area moves to a second product display and sales engagement area with a sales rotation queue that includes two other sales representatives who have waited less than the moving sales representative and one other sales representative who has waited longer than the moving sales representative, and the first product display and sales engagement area is meshed with the second product display and sales engagement area, then the meshed-zone sales rotation queue management process 1500 would identify the second position in the second sales rotation queue of the second product display and sales engagement area as the relative position in the second sales rotation queue to add the moving sales representative.

After adding the sales representative to the sales rotation queue at the position based on the relative position in the mesh sales queue list, the meshed-zone sales rotation queue management process 1500 of some embodiments proceeds to synchronize (at 1575) the sales rotation queues of the meshed zones. For instance, the synchronization would remove the sales representative from the sales rotation queue of the other product display and sales engagement area from which the sales representative moved in order to join the sales rotation queue of the present product display and sales engagement area. Then the meshed-zone sales rotation queue management process 1500 ends.

VII. Multi-Level Showroom Floors

Many of the examples described above pertain to one or more showrooms with one or more beacon-enabled and/or geofenced product display and sales engagement areas, all of which were described as being on a same level or floor. However, the sales rotation queue system of the present disclosure supports configurations in which multi-level product display and sales engagement areas can be configured and implemented as beacon-enabled and/or geofenced areas to serve multiple sales rotation queues. Furthermore, most of the examples and description above related to auto dealerships. In the next example, a multi-level furniture showroom with several floors or levels of a building is described.

Figure 17:
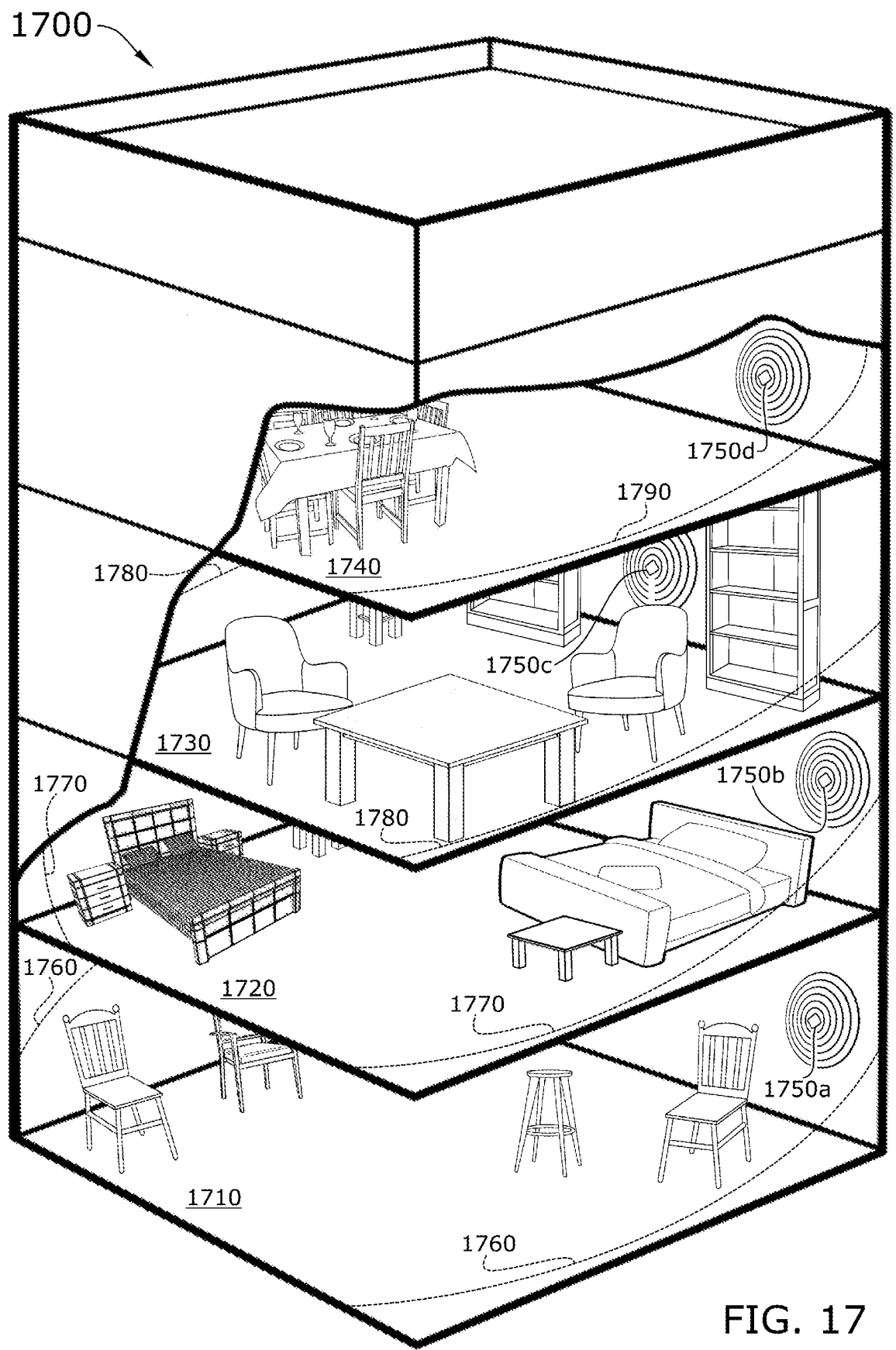
FIG. 17 conceptually illustrates a plurality of beacon-enabled product display and sales engagement areas associated with a multi-level furniture dealership with a plurality of showroom floors served by a plurality of sales rotation queues in some embodiments.

By way of example, FIG. 17 conceptually illustrates a plurality of beacon-enabled product display and sales engagement areas associated with a multi-level furniture dealership 1700. As shown in this figure, the multi-level furniture dealership 1700 includes a plurality of showroom floors which are served by a plurality of sales rotation queues. Specifically, the plurality of showroom floors include a first level floor 1710, a second level floor 1720, a third level floor 1730, and a fourth level floor 1740.

The first level floor 1710 of the multi-level furniture dealership 1700 includes a first beacon device 1750*a* whose beacon UID broadcast signal extends out to the wireless range 1760 (dashed line). The second level floor 1720 of the multi-level furniture dealership 1700 includes a second beacon device 1750*b* whose beacon UID broadcast signal extends out to the wireless range 1770. The third level floor 1730 of the multi-level furniture dealership 1700 includes a third beacon device 1750*c* whose beacon UID broadcast signal extends out to the wireless range 1780. Finally, the fourth level floor 1740 of the multi-level furniture dealership 1700 includes a fourth beacon device 1750*d* whose beacon UID broadcast signal extends out to the wireless range 1790. As can be understood from this example, a furniture sales representative can join a sales rotation queue by entering the furniture showroom of one of the floor levels. Since the wireless range of the beacon device at each floor level extends throughout the entire showroom of the corresponding floor level, the furniture sales representative will be prompted to join the sales rotation queue upon entering the furniture showroom on a particular floor level (unless already a member and entering back into the furniture showroom after taking a temporary departure within the permitted time).

Although the multi-level furniture dealership 1700 shown in this example introduces the concept of deploying a sales rotation system in a multi-level structure, the components and their working are similar to the single-level examples described above. Therefore, all processes described above apply in similar manner to scenarios involving multi-level structures with multiple product display and sales engagement area, which include beacons or may be geofenced, and which are separate or may be combined into meshed zone groups for combined mesh sales queue management. Details of a multi-level structure that mixes meshed and non-meshed product display and sales engagement areas, and in which the meshed product display and sales engagement areas include both contiguously meshed product display and sales engagement areas and non-contiguously meshed product display and sales engagement areas, is described in the next section.

VIII. Mixing Non-Meshed Zones, Contiguous Meshed Zones, and Non-Contiguous Meshed Zones By way of example, FIG. 18 conceptually illustrates a variety of mesh and non-mesh zone configurations of a multi-level furniture dealership 1800. As shown in this figure, the multi-level furniture dealership 1800 includes a plurality of beacon-enabled product display and sales engagement areas associated with a plurality of floor levels of the multi-level furniture dealership 1800. The plurality of beacon-enabled product display and sales engagement areas shown in this figure demonstrate several meshed and non-meshed zone configurations, including contiguous meshed beacon zones, non-contiguous meshed beacon zones, and non-meshed beacon zones.

Specifically, the plurality of floor levels of the multi-level furniture dealership 1800 include a first level 1810 ("Level 1"), a second level 1820 ("Level 2"), a third level 1830 ("Level 3"), a fourth level 1840 ("Level 4"), and a fifth level 1850 ("Level 5"). The first level 1810 in this example is a bed showroom and includes a first beacon 1860*a* with a wireless range the extends throughout Level 1 (shown by dashed line). The second level 1820 in this example is a bedroom storage furniture showroom and includes a second beacon 1860*b* with a wireless range the extends throughout Level 2 (shown by dashed line). The third level 1830 in this example is a chair showroom and includes a third beacon 1860*c* with a wireless range the extends throughout Level 3 (shown by dashed line). The fourth level 1840 in this example is an office and study showroom and includes a fourth beacon 1860*d* with a wireless range the extends throughout Level 4 (shown by dashed line). At the top of the multi-level furniture dealership 1800 is the fifth level 1850, which in this example is a leisure chair and sofa showroom and includes a fifth beacon 1860*e* with a wireless range the extends throughout Level 5 (shown by dashed line).

While the fourth level 1840 of the multi-level furniture dealership 1800 is configured to be a non-meshed zone 1890 (or singular, separate, independent product display and sales engagement area), a variety of meshed zone configurations are demonstrated in the multi-level furniture dealership 1800, as shown by dashed arrows conceptually illustrated outside the multi-level furniture dealership 1800. Specifically, a contiguous meshed zone 1870 is configured to include the bed showroom at the first level 1810 of the multi-level furniture dealership 1800 and the bedroom storage furniture showroom at the second level 1820 of the multi-level furniture dealership 1800.

A non-contiguous meshed zone 1880 is configured to include the chair showroom at the third level 1830 of the multi-level furniture dealership 1800 and the leisure chair and sofa showroom at the fifth level 1850 of the multi-level furniture dealership 1800. Configuring the third level 1830 chair showroom to be a meshed zone with the fifth level 1850 leisure chair and sofa showroom may be a logical decision since furniture sales representatives with emphasis on selling chairs, sofas, and other seating furniture may be managed more effectively when the sales rotation queues at each level are combined. This would allow greater flexibility and management of human resources (sales representatives), allowing management to direct sales representatives either up or down levels to join the sales rotation queues more in need of personnel to service customers. It might also be a logical decision to change the showrooms around so that the third level 1830 showroom and the fifth level 1850 showroom are stacked as contiguous levels. However, it may be far more work to move furniture around, and other considerations as to why showrooms are present at one or another floor or level may not be possible to be changed. Therefore, the sales rotation system (and in particular, the back-end server or "Who's Up?" server) provides an effective solution to managing sales representative rotation queues so that customers are not jumped on by several sales representatives at each floor and all at once, and to ensuring that sales representative human resources are effectively managed according to the needs of the dealership.

Figure 19:
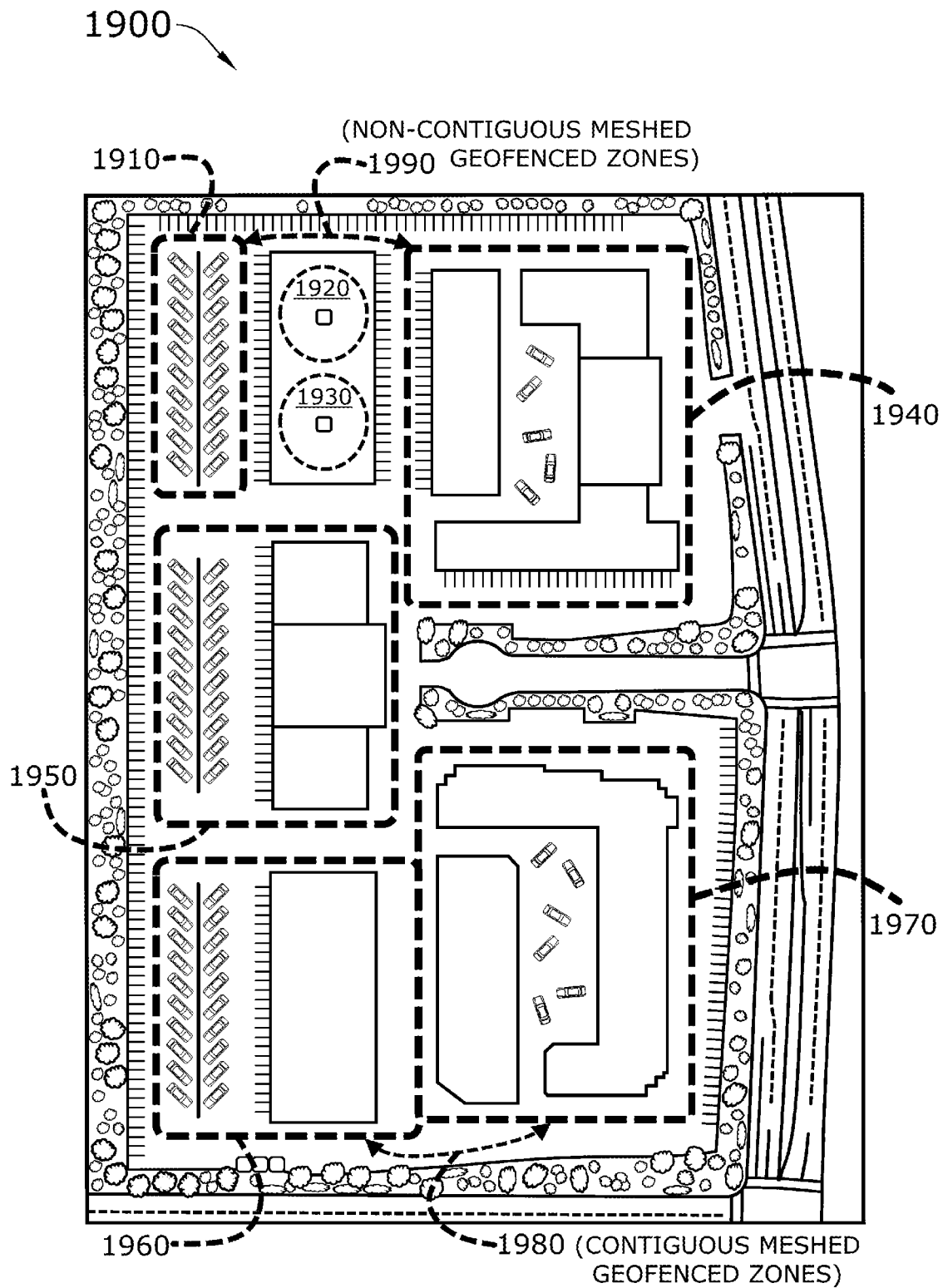
FIG. 19 conceptually illustrates a mix of product display and sales engagement area configurations including contiguous meshed geofenced zones, non-contiguous meshed geofenced zones, non-meshed geofenced zones, and non-meshed beacon zones deployed at an automobile dealership lot in some embodiments.
Figure 20:
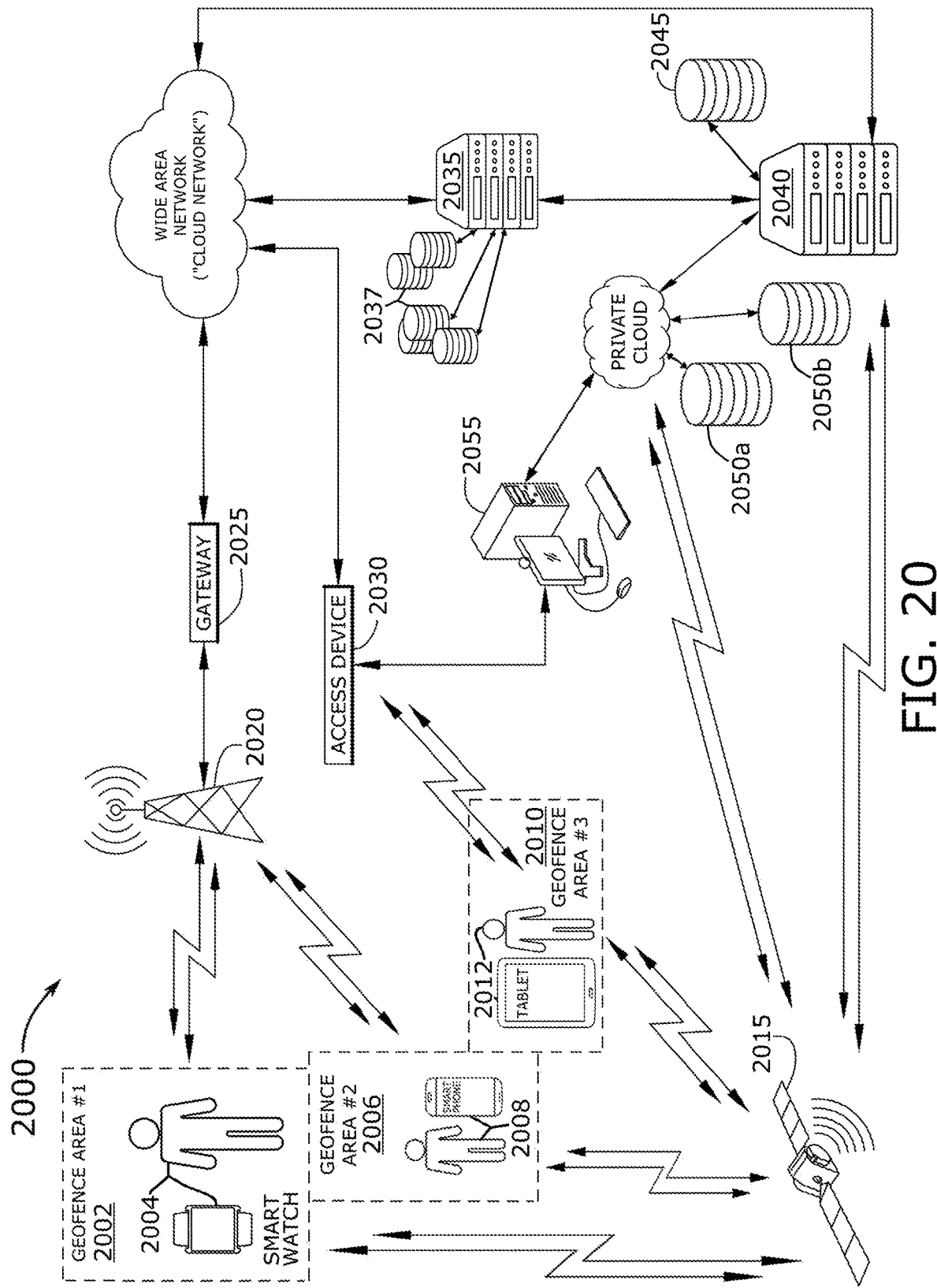
FIG. 20 conceptually illustrates a geofence-focused network architecture of a multi-tenant sales rotation cloud-computing system in some embodiments.

Now turning to another example, FIG. 19 conceptually illustrates a mix of product display and sales engagement area configurations including contiguous meshed geofenced zones, non-contiguous meshed geofenced zones, non-meshed geofenced zones, and non-meshed beacon zones deployed at an automobile dealership lot 1900. As shown in this figure, the automobile dealership lot 1900 is a single level (not a multi-level structure, even though one or more of the buildings within the boundary of the automobile dealership lot 1900 may be multi-level). Furthermore, the automobile dealership lot 1900 includes a plurality geofenced and beacon-enabled product display and sales engagement areas, some of which are configured to combine in meshed zones.

Specifically, the plurality geofenced and beacon-enabled product display and sales engagement areas include a first geofenced product display and sales engagement area 1910, a second beacon-enabled product display and sales engagement area 1920, a third beacon-enabled product display and sales engagement area 1930, a fourth geofenced product display and sales engagement area 1940, a fifth geofenced product display and sales engagement area 1950, a sixth geofenced product display and sales engagement area 1960, and a seventh geofenced product display and sales engagement area 1970. As demonstrated by dashed arrow connections between product display and sales engagement areas, the first geofenced product display and sales engagement area 1910 and the fourth geofenced product display and sales engagement area 1940 are configured as meshed zones 1990. The meshed zone 1990 is a non-contiguous meshed zone 1990. Furthermore, the sixth geofenced product display and sales engagement area 1960 and the seventh geofenced product display and sales engagement area 1970 are configured as contiguous meshed zones 1980.

Figure 18:
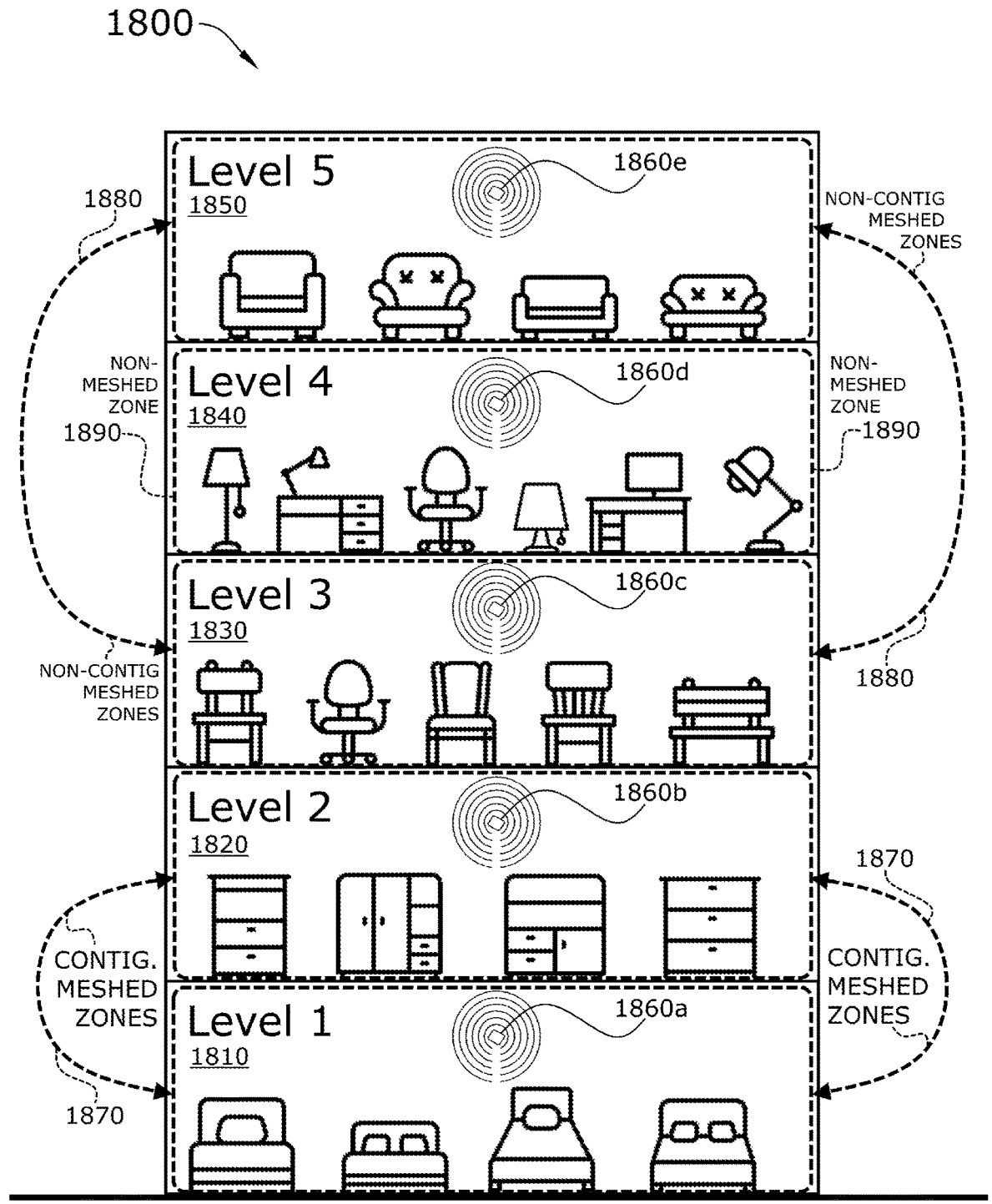
FIG. 18 conceptually illustrates a variety of mesh configurations for a plurality of beacon-enabled product display and sales engagement areas associated with a multi-level furniture dealership including contiguous meshed beacon zones, non-contiguous meshed beacon zones, and non-meshed beacon zones in some embodiments.

Thus, as demonstrated by the examples in FIGS. 18 and 19, there are a multitude of meshed and non-meshed configurations of product display and sales engagement areas that can be managed by way of the sales rotation system of the present disclosure. In the next section, a variety of network architectures for deploying a sales rotation system are described. Along with the aforementioned meshing/non-meshing options, single-level or multi-level options, and multi-showroom sales rotation queue management options, the network architectures described below by reference to FIGS. 20-22 demonstrate the flexibility of actual sales rotation system deployments.

IX. Sales Rotation System Network Architectures

In this section, several network architectures are described in which the sales rotation system may be deployed. Specifically, an example of a geofence-focused network architecture of a multi-tenant sales rotation cloud-computing system is described below by reference to FIG. 20, an example of a software-as-a-service (SaaS) network architecture of a cloud-based multi-tenant sales rotation system is described below by reference to FIG. 21, and an example of a local network architecture of an onsite sales rotation system is described below by reference to FIG. 22.

A. Geofence-Focused Network Architecture of a Multi-Tenant Sales Rotation Cloud-Computing System By way of example, FIG. 20 conceptually illustrates a geofence-focused network architecture of a multi-tenant sales rotation cloud-computing system 2000. As shown in this figure, the multi-tenant sales rotation cloud-computing system 2000 includes a plurality sales representative users (also referred to as "sales reps", "users", and "sales rep users" in this example) with mobile devices in a plurality of geofence areas, including a first geofence area 2002 with a smart watch (wearable) mobile device 2004 (associated with a first sales rep user), a second geofence area 2006 with a smart phone mobile device 2008 (associated with a second sales rep user), and a third geofence area 2010 with a tablet mobile device 2012 (associated with a third sales rep user). The multi-tenant sales rotation cloud-computing system 2000 also includes a GPS satellite 2015 that provides real-time geospatial location information to the smart watch (wearable) mobile device 2004, the smartphone mobile device 308, and the tablet mobile device 2012. Each of the smart watch (wearable) mobile device 2004, the smartphone mobile device 308, and the tablet mobile device 2012 include user-interfacing software applications (or "mobile apps") which provide an input/output (I/O) and communications interface between the sales rep user and the multi-tenant sales rotation cloud-computing system 2000. The user-interfacing software also allows the sales rep users to interact with user configuration settings and specify particular sales teams to which they may be a member and other user settings.

The user-interfacing software may further include an embedded software module that retrieves location information received by the mobile device of the user from the GPS satellite 2015. Furthermore, the embedded software module routinely transmits location information to one or more server computing devices that manage sales rotation queues in the geofence areas for the multi-tenant sales rotation cloud-computing system 2000. In this way, the sales rep user's present location is continually known by the multi-tenant sales rotation cloud-computing system 2000 and can be cross-compared to geofence areas in a geofence data repository of the multi-tenant sales rotation cloud-computing system 2000. Thus, with the real-time geospatial location information available on the mobile devices, the sales rep users can receive relevant prompts to join sales rotation queues that serve any of several geofence areas or remain in a single geofence area in which each sales rep user is already present. Also, when a sales rep user in one geofence area moves to a different geofence area, the mobile device of the sales rep user will obtain updated geospatial location information which is transmitted to the server computing device of the multi-tenant sales rotation cloud-computing system 2000 to allow the sales rep user to accept or decline joining the sales rotation queue the serves the (different) geofence area moved into by the sales rep user, and upon acceptance, to associate the mobile device of the sales rep user with the (different) geofence area.

In some embodiments, the multi-tenant sales rotation cloud-computing system 2000 includes several back-end components that enable sales rep users to actively serve customers in one or more geofenced (and non-geofenced, beacon-enabled) product display and sales engagement areas, and that ensure that sales rotation queues across several geofenced (and non-geofenced, beacon-enabled) product display and sales engagement areas are efficiently managed with suitable sales representatives. The back-end components of the multi-tenant sales rotation cloud-computing system 2000 include at least a communication tower 2020 and gateway 2025, network access device 2030, one or more sales rotation queue server systems 2035, several data sources 2037 with sales rotation queue information accessed by the sales rotation queue server systems 2035, a back-end product display and sales engagement area sales rotation management server 2040, a geofence database 2045 and one or more other sales rotation databases 2050a and 2050b.

In some embodiments, the back-end product display and sales engagement area sales rotation management server 2040 runs back-end server software that retrieves geofence data from the geofence database 2045 to determine geofence areas to associate with mobile devices of sales rep users based on received geospatial location information from the mobile devices. The back-end server software running on the back-end product display and sales engagement area sales rotation management server 2040 also retrieves information from several data sources 2037 which may or may not be used in realtime.

Additionally, some embodiments of the geofence-focused network architecture of the multi-tenant sales rotation cloud-computing system 2000 includes a manufacturer OEM computer 2055 with OEM-interfacing software that allows an original equipment manufacturer, such as an automobile manufacturer, to directly access the multi-tenant sales rotation cloud-computing system 2000 to configure any of several manufacturer settings. In some embodiments, a private cloud network may be established for a manufacturer that accesses the multi-tenant sales rotation cloud-computing system 2000 by way of the OEM-interfacing software on the manufacturer computer 2055, thereby allowing the manufacturer to check the status of any vehicles (or furniture or other commercial items) of their manufacture and delivery to the dealership/furniture mart. While only a single manufacturer computer 2055 is shown in this figure, a person skilled in the relevant art would appreciate that the manufacturer computer 2055 can be seen as a manufacturer computer for each OEM manufacturer using the multi-tenant sales rotation cloud-computing system 2000.

B. SaaS Network Architecture of a Cloud-Based Multi-Tenant Sales Rotation System By way of example, FIG. 21 conceptually illustrates a software-as-a-service (SaaS) network architecture of a cloud-based multi-tenant sales rotation system 2100 that hosts a sales rotation queue management service. As shown in this figure, the cloud-based multi-tenant sales rotation system 2100 includes a set of sales rep user mobile devices 2110-2140, a set of cloud (SaaS) remote application server computing devices 2150, a sales rotation mobile apps database 2160, a set of dealership sales rotation system servers 2170 (a server for each dealership tenant of the cloud-based multi-tenant sales rotation system 2100), a sales rotation queue management database 2180, and a beacon & geofence zone management database 2190. The set of sales rep user mobile devices 2110-2140 connect over the Internet to the set of SaaS remote application server computing devices 2150 in relation to sales rotation queues of dealerships for engaging with and interacting with potential dealership clients who enter showrooms, product display areas, etc.

At least one server computing device of the set of SaaS remote application server computing devices 2150 comprises a web server that manages sales rep user interactions, including authentication of sales rep user login attempts and provisioning of sales rotation mobile apps to sales rep user mobile devices in need of installation. When a sales rep user mobile device needs to install or update the sales rotation mobile app, the web server directly retrieves or sends a request to another server or module among the set of SaaS remote application server computing devices 2150 to retrieve a specific implementation of the sales rotation mobile app from the sales rotation mobile apps database 2160 and transmit the specific implementation of the sales rotation mobile app to the sales rep user mobile device in need of the mobile app. Examples of specific implementations of the sales rotation mobile app include, without limitation, an Android mobile operating system implementation of the sales rotation mobile app, an iOS mobile operating system implementation of the sales rotation mobile app, etc. The web server also hosts sessions for the sales rep user mobile devices 2110-2140 which connect to the set of SaaS remote application server computing devices 2150 after the sales rotation mobile app is installed and running on their respective mobile device. Examples of mobile devices supported by the cloud-based multi-tenant sales rotation system 2100 include, without limitation, smartphones (such as the smartphones of the sales rep user mobile device 2110 and the sales rep user mobile device 2140), smart wearable devices (such as the smartwatch of the sales rep user mobile device 2120), tablet computing devices (such as the tablet of the sales rep user mobile device 2130), and other such mobile computing devices. One or more of the server computing devices in the set of SaaS remote application server computing devices 2150 connects over a private cloud-network to at least one dealership sales rotation system server 2170 associated with a specific dealership that manages round robin sales rotation by way of the cloud-based multi-tenant sales rotation system 2100.

When one or more of the sales rep user mobile devices 2110-2140 is connected over the private cloud-network to a particular dealership sales rotation system server 2170, the connected sales rep user mobile device(s) send and receive geospatial location data to and from the particular dealership sales rotation system 2170 (via the SaaS remote application servers 2150), as described above. The particular dealership sales rotation system server 2170 is able to use the geospatial location data to perform sale rotation queue management by accessing and updating one or more active sales rotation queues that are associated with one or more beacon-enabled and/or geofenced product display and sales engagement areas deployed at the dealership.

In some embodiments, the dealership is able to perform product display and sales engagement area management at any time by connecting to the particular dealership sales rotation system server 2170 through the web server of the SaaS remote application servers 2150 from a mobile device or a non-mobile, network-accessible computing device (e.g., desktop computer or server) in order to update product display and sales engagement area configuration settings and records in the beacon & geofence zone management database 2190. At least some of the product display and sales engagement area management that the dealership can perform include, without limitation, decommissioning existing beacon-enabled and/or geofenced product display and sales engagement areas, activating existing standby beacon-enabled and/or geofenced product display and sales engagement areas, and setting up and deploying new beacon-enabled or geofenced product display and sales engagement areas at any time. In some embodiments, the beacon & geofence zone management database stores encapsulated records for each beacon-enabled or geofenced product display and sales engagement area associated with the dealership. The encapsulated records include at least one of a unique beacon identifier (UBID) associated with the beacon device hardware and a unique geofence identifier (UGID) associated with a particular geospatial perimeter defined for a particular geofence. The encapsulated records further include a present status indicator from a plurality of status indicator options comprising at least an active status, an inactive status, a decommissioned status, and a deployed status. The encapsulated records further include a configuration option that allows an administrator to change an active status from a beacon-enabled deployment to a geofenced deployment, or to change the active status from a geofenced deployment to a beacon-enabled deployment.

In some embodiments, an administrative mobile app is provided to allow the administrator to change the active status by a touch gesture on a screen that visually outputs a product display and sales engagement area and a zone perimeter overlay that represents either an approximate perimeter in which beacon signals can be effectively received by sales rep user mobile devices or a defined perimeter of a geofenced area. In some embodiments, the administrative mobile app enables the administrator to selectively increase or decrease a defined perimeter of a geofenced area or change a shape of the perimeter for the geofenced area by way touch gestures applied to the zone perimeter overlay.

C. Local Network Architecture of an Onsite Sales Rotation System

Figure 22:
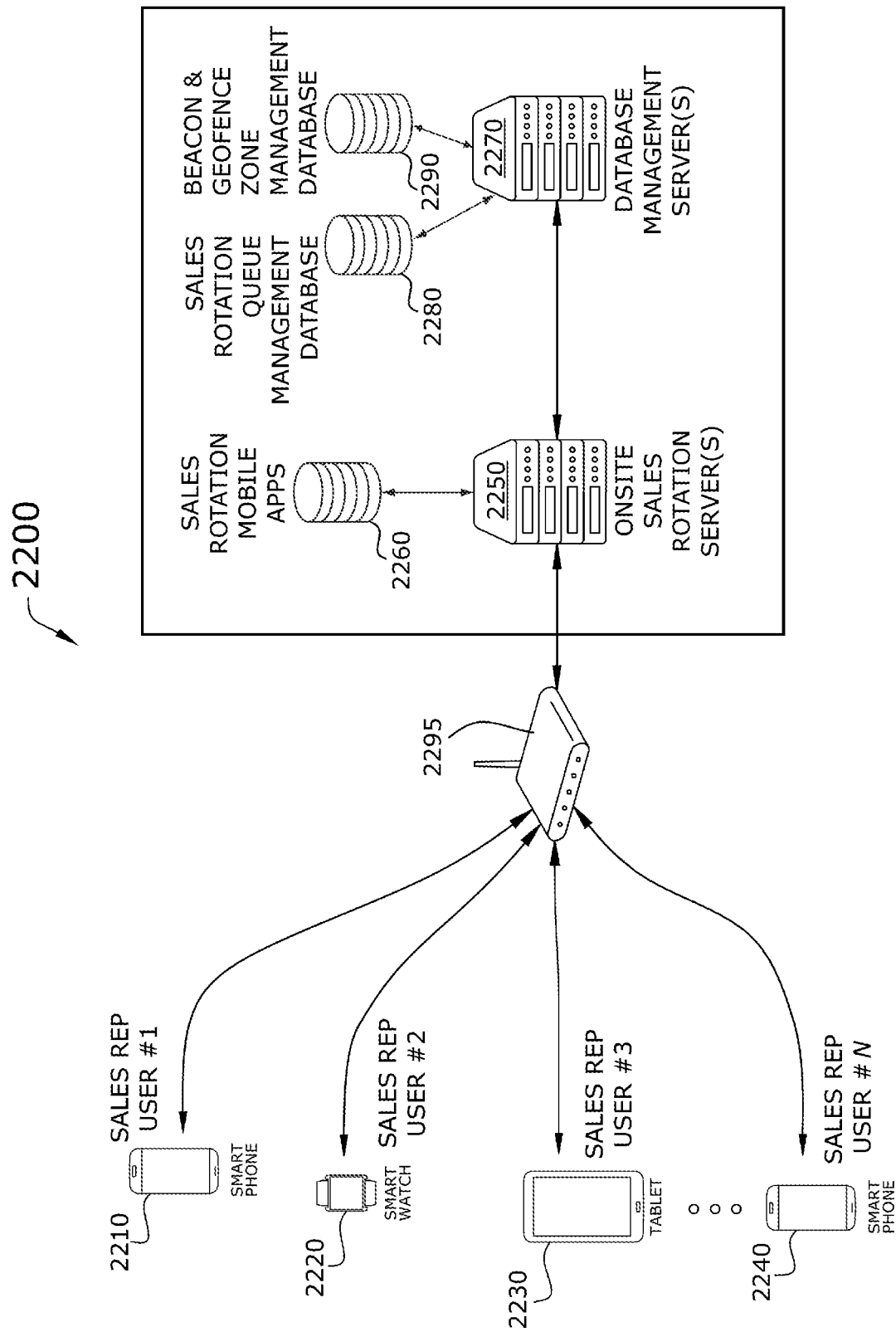
FIG. 22 conceptually illustrates a local network architecture of an onsite sales rotation system that manages sales rotation queues of beacon-enabled and geofenced product display and sales engagement areas in some embodiments.

Now, turning to another network example, FIG. 22 conceptually illustrates a local network architecture of an onsite sales rotation system 2200 that manages sales rotation queues of beacon-enabled and geofenced product display and sales engagement areas. As shown in this figure, the onsite sales rotation system 2200 includes a set of local sales rep user mobile devices 2210-2240, a set of onsite sales rotation server computing devices 2250, a sales rotation mobile apps database 2260, one or more database management server 2270, a sales rotation queue management database 2280, a beacon & geofence zone management database 2290, and a wireless network router 2295. The set of local sales rep user mobile devices 2210-2240 connect wirelessly to the wireless network router 2295 which is a defined router in a secure and private network associated with a particular dealership. The secure and private network can be a local area network deployed at the dealership, an ad-hoc personal area network set-up at the dealership or at a dealership remote location (such as at a car show, at a civic event in which the dealership is involved, at a commercial or non-commercial event in which the dealership is a sponsor, or another physical location external from the dealership's physical domain), or any other kind of secure and private network associated with the particular dealership. The dealership may be an automobile dealership, a furniture dealership, a kitchen and bath dealership, or another type of dealership in which sales representatives actively wait (in sale rotation queues) for clientele to serve.

At least one server computing device of the set of onsite sales rotation server computing devices 2250 comprises a user authentication and configuration server that manages sales representative user logins. The user authentication and configuration server also provisions sales rotation mobile apps from the sales rotation mobile apps database 2160 to the set of local sales rep user mobile devices 2210-2240 and pushes sales rotation mobile app updates to set of local sales rep user mobile devices 2210-2240 after initial installation of the mobile app and on a periodic, as-needed basis. A variety of implementations are supported for the mobile app, as described above. In this way, a first sales representative with a first smartphone mobile device that runs an Android operating system (which supports the kernel and hardware of the first smartphone mobile device), a second sales representative with a second smartphone mobile device that runs an iOS operating system (which supports the kernel and hardware of the second smartphone mobile device), and a third sales representative with a smartwatch mobile device that runs a particular wearable device operating system (which supports the kernel and hardware of the smartwatch mobile device) can operate within the same sales rotation queue(s) and in the same beacon-enabled and/or geofenced product display and sales engagement area(s) deployed at the same dealership under the singular umbrella of the sales rotation system deployed onsite at the dealership.

At least one server computing device of the set of onsite sales rotation server computing devices 2250 manages sales rep user interactions and sales rotation queue management by way of the database management server 2270 which manages round robin sales rotation in the sales rotation queue management database 2280 and according to the beacon & geofence zone management database 2290. Thus, when one or more of the local sales rep user mobile devices 2210-2240 is connected over the wireless router device 2295 to the onsite sales rotation server 2250, geospatial location data from the physical movement (into or out of a zone) and/or activity (engagement with a customer, false engagement with a customer not in need of present assistance, etc.) of the sales representative is indirectly transmitted to the database management server 2270 by the onsite sales rotation server 2250 and database updates are made in the sales rotation queue management database 2280 for each sales rotation queue that is impacted by the sales representative activity. In this way, the onsite sales rotation server 2250 by way of the database management server 2270 is able to use the geospatial location data to perform sale rotation queue management by accessing and updating one or more active sales rotation queues that are associated with one or more beacon-enabled and/or geofenced product display and sales engagement areas deployed at the dealership.

Similarly, when an administrator connects the onsite sales rotation server 2250, beacon and geofence configurations can be specified and are transmitted to the database management server 2270 via the onsite sales rotation server 2250, and accordingly updated and/or stored in the beacon & geofence zone management database 2290. As noted above by reference to FIG. 21, an administrator using the administrative mobile app can perform a multitude of beacon or geofence configuration operations including, without limitation, decommissioning existing beacon-enabled and/or geofenced product display and sales engagement areas, activating existing standby beacon-enabled and/or geofenced product display and sales engagement areas, and setting up and deploying new beacon-enabled or geofenced product display and sales engagement areas at any time. Furthermore, when the administrator performs any updates to the existing zones or creates new zones, the onsite sales rotation server 2250 directs the database management server 2270 to store encapsulated records associated with the updates (specifically, encapsulated zone configuration data) in the beacon & geofence zone management database 2290 for each beacon-enabled or geofenced product display and sales engagement area associated with the dealership. The encapsulated records include data similar to the data described above in relation to FIG. 21. Similarly, the administrative mobile app allows the administrator to change the active status by a touch gesture on a screen that visually outputs a product display and sales engagement area and a zone perimeter overlay that represents either an approximate perimeter in which beacon signals can be effectively received by sales rep user mobile devices or a defined perimeter of a geofenced area. In some embodiments, the administrative mobile app enables the administrator to selectively increase or decrease a defined perimeter of a geofenced area or change a shape of the perimeter for the geofenced area by way touch gestures applied to the zone perimeter overlay.

X. Electronic Wearable Device and Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a smartwatch, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
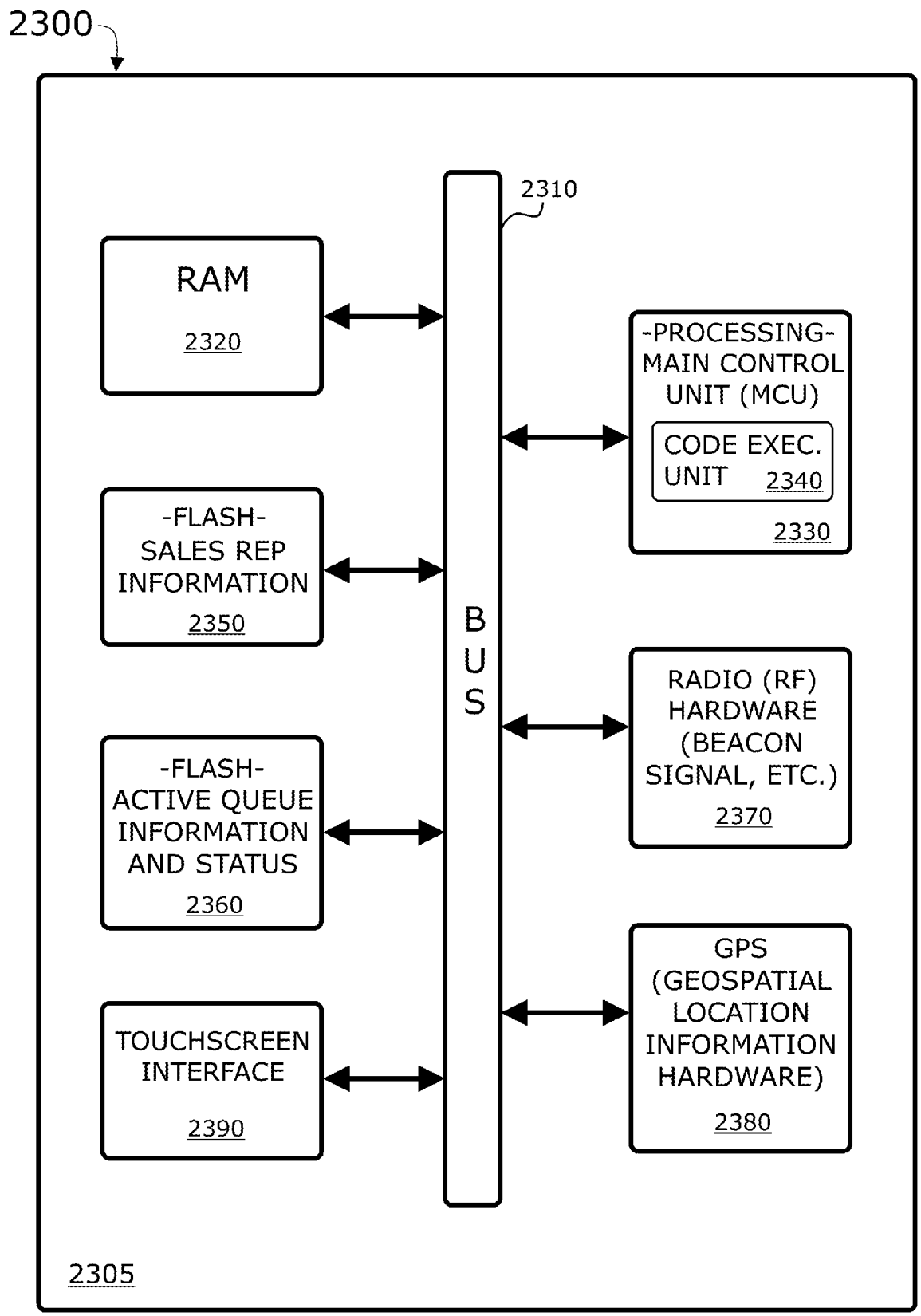
FIG. 23 conceptually illustrates a block diagram of an electronic wearable device in some embodiments.

By way of example, FIG. 23 conceptually illustrates a block diagram of an electronic wearable device 2300. An example of an electronic wearable device is a smartwatch. For example, instead of (or in conjunction with) using a smartphone mobile device, a sales representative may use a smart wearable device, such as a smartwatch that can run executable code and present interfaces that allow user input as to sales rotation queue-based activities, such as whether or not to join a particular sale rotation queue when entering into a particular beacon-enabled or geofenced product display and sales engagement area of a showroom.

As shown in this figure, the electronic wearable device 2300 includes a motherboard 2305, a bus 2310, a random access memory (RAM) 2320, a main control unit (MCU) 2330 (or CPU, hereinafter referred to as "MCU/CPU") for runtime processing of the sales rotation mobile application, a code execution unit 2340 embedded within the MCU/CPU 2330, a first persistent flash memory 2350 that stores sale representative information for a particular sales representative who wears or users the electronic wearable device 2300, a second persistent flash memory 2360 that stores sales rotation queue activity information associated with the particular sale representative, radio (RF) hardware 2370 that receives wireless beacon signals and other wireless radio signals via RF antenna, NFC antenna, and/or a Bluetooth/WLAN antenna, GPS/spatial location hardware 2380 that receives geospatial location information to use in connection with geofenced product display and sales engagement areas, and a touchscreen interface 2390.

Figure 24:
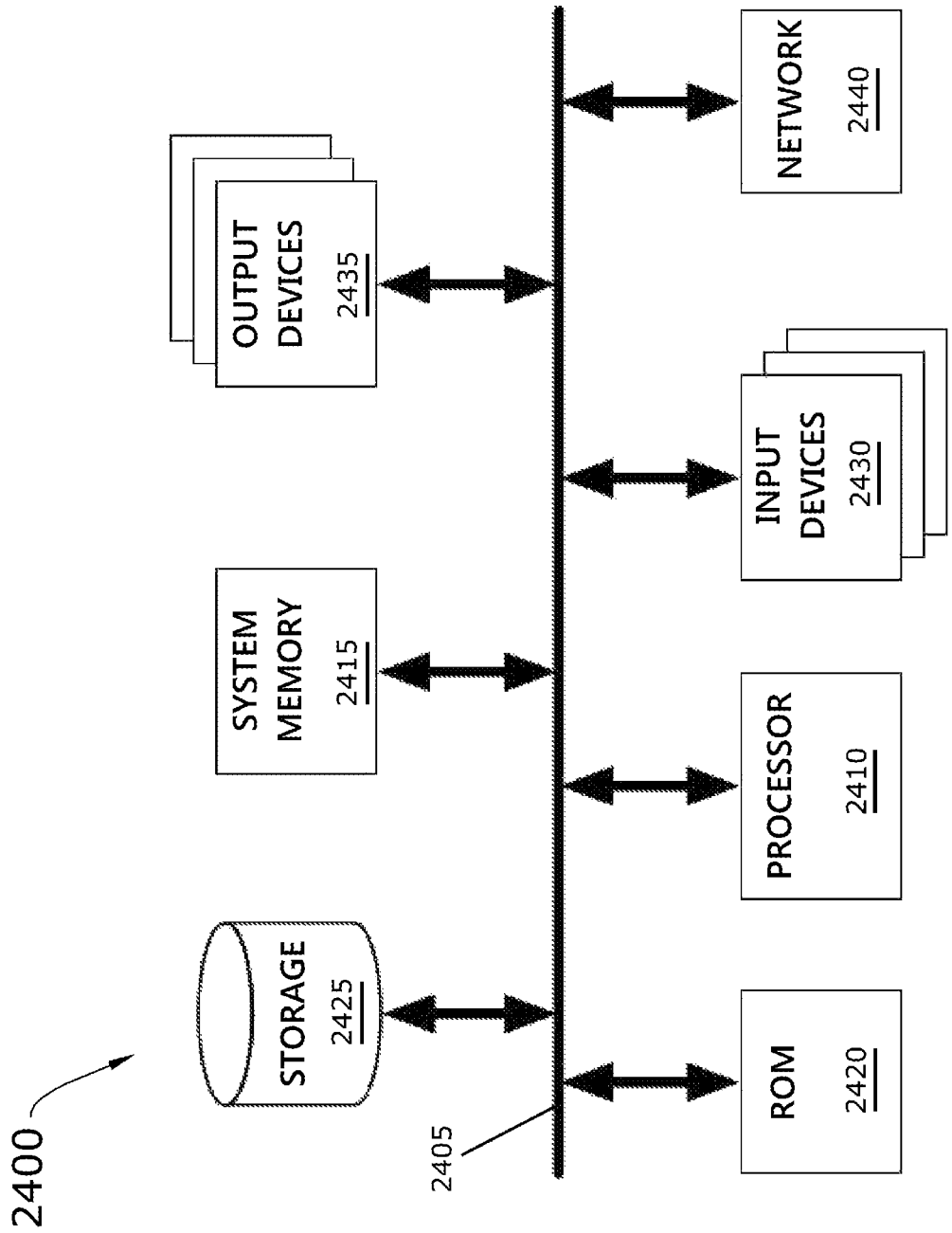
FIG. 24 conceptually illustrates an electronic system with which some embodiments of the invention are implemented.

Turning to another example of an electronic device, FIG. 24 conceptually illustrates an electronic system 2400 with which some embodiments of the invention are implemented. The electronic system 2400 may be a laptop or desktop computer, a server computer, a database management server, a smartphone mobile device, a tablet mobile computing device, or any other sort of electronic device. Such an electronic system includes various types of computer readable media and interfaces for various other types of computer readable media. Electronic system 2400 includes a bus 2405, processing unit(s) 2410, a system memory 2415, a read-only 2420, a permanent storage device 2425, input devices 2430, output devices 2435, and a network 2440.

The bus 2405 collectively represents all system, peripheral, and chipset buses that communicatively connect the numerous internal devices of the electronic system 2400. For instance, the bus 2405 communicatively connects the processing unit(s) 2410 with the read-only 2420, the system memory 2415, and the permanent storage device 2425.

From these various memory units, the processing unit(s) 2410 retrieves instructions to execute and data to process in order to execute the processes of the invention. The processing unit(s) may be a single processor or a multi-core processor in different embodiments.

The read-only-memory (ROM) 2420 stores static data and instructions that are needed by the processing unit(s) 2410 and other modules of the electronic system. The permanent storage device 2425, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2425.

Other embodiments use a removable storage device (such as a floppy disk or a flash drive) as the permanent storage device 2425. Like the permanent storage device 2425, the system memory 2415 is a read-and-write memory device. However, unlike storage device 2425, the system memory 2415 is a volatile read-and-write memory, such as a random access memory. The system memory 2415 stores some of the instructions and data that the processor needs at runtime. In some embodiments, the invention's processes are stored in the system memory 2415, the permanent storage device 2425, and/or the read-only 2420. For example, the various memory units include instructions for processing appearance alterations of displayable characters in accordance with some embodiments. From these various memory units, the processing unit(s) 2410 retrieves instructions to execute and data to process in order to execute the processes of some embodiments.

The bus 2405 also connects to the input and output devices 2430 and 2435. The input devices enable the user to communicate information and select commands to the electronic system. The input devices 2430 include alphanumeric keyboards and pointing devices (also called "cursor control devices"). The output devices 2435 display images generated by the electronic system 2400. The output devices 2435 include printers and display devices, such as cathode ray tubes (CRT) or liquid crystal displays (LCD). Some embodiments include devices such as a touchscreen that functions as both input and output devices.

Finally, as shown in FIG. 24, bus 2405 also couples electronic system 2400 to a network 2440 through a network adapter (not shown). In this manner, the computer can be a part of a network of computers (such as a local area network ("LAN"), a wide area network ("WAN"), or an intranet), or a network of networks (such as the Internet). Any or all components of electronic system 2400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium storing a program which, when executed by at least one processing unit of a computing device, dynamically adds sales representatives to a sales rotation queue, said program comprising sets of instructions for:
    detecting when a sales representative enters a product display and sales engagement area of a dealership;
    triggering a request to add the sales representative to a sales rotation queue associated with the product display and sales engagement area of the dealership;
    determining whether a present usage of a sales rotation system mobile app that is installed on a mobile device associated with the sales representative is a first usage of the sales rotation system mobile app on the mobile device;
    receiving identifying information about the sales representative from the mobile device associated with the sales representative when the present usage is the first usage of the sales rotation system mobile app on the mobile device;
    searching, in a cloud database of dealership representatives that are members of one or more dealership sales teams associated with the dealership, for information that matches the identifying information about the sales representative;
    determining, based on the search, whether the sales representative is a member of any dealership sales team associated with the dealership;
    assigning the sales representative to a particular dealership sales team associated with the dealership when a match exists between the information searched for in the cloud database of dealership representatives and the identifying information about the sales representative, wherein assigning the sales representative to the particular dealership sales teams makes the sales representative a member of the particular dealership sales team; and
    adding the sales representative to the sales rotation queue associated with the product display and sales engagement area of the dealership.

2. The non-transitory computer readable medium of claim 1, wherein the sets of instructions for detecting and triggering comprise sets of instructions for:
    capturing, by the mobile device associated with the sales representative, a unique beacon ID ("beacon UID") from a beacon signal that is broadcast by a beacon device;
    activating the sales rotation system mobile app installed on the mobile device associated with the sales representative in response to capturing the beacon UID for the present usage;
    sending, by the sales rotation system mobile app and the mobile device, the beacon UID to a sales rotation network server; and
    requesting, in response to receiving a notification from the sales rotation network server, to add the sales representative to the sales rotation queue associated with the product display and sales engagement area of the dealership.

3. The non-transitory computer readable medium of claim 1, wherein the product display and sales engagement area includes a beacon device that emits a wireless signal over a wireless signal range.

4. The non-transitory computer readable medium of claim 3, wherein the wireless signal is a Bluetooth low energy signal comprising a unique beacon ID.

5. The non-transitory computer readable medium of claim 1, wherein the product display and sales engagement area is bounded by a geofence perimeter.

* * * * *